US012794679B1

(12) United States Patent
Thangavel et al.

(10) Patent No.: US 12,794,679 B1
(45) Date of Patent: Nov. 10, 2026

(54) TECHNIQUES FOR IN-TRANSIT CONTENT PROTECTION PROTOCOLS

(71) Applicant: Amazon Technologies, Inc., Seattle, WA (US)

(72) Inventors: Naveen Kumar Thangavel, Bellevue, WA (US); Luis Romero, Bellevue, WA (US); Firas Azrai, Austin, CA (US); Temesghen Kahsai Azene, Union City, CA (US); Prakash Surendranadhan, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/980,703

(22) Filed: Dec. 13, 2024

(51) Int. Cl.
*H04L 9/30* (2006.01)
*H04L 9/08* (2006.01)
*H04L 9/32* (2006.01)

(52) U.S. Cl.
CPC ............ *H04L 9/0825* (2013.01); *H04L 9/088* (2013.01); *H04L 9/0894* (2013.01); *H04L 9/3073* (2013.01); *H04L 9/321* (2013.01); *H04L 9/3247* (2013.01)

(58) Field of Classification Search
CPC ..... H04L 9/0825; H04L 9/088; H04L 9/0894; H04L 9/3073; H04L 9/321; H04L 9/3247
See application file for complete search history.

(56) References Cited

U.S. PATENT DOCUMENTS

| | | | | |
|---|---|---|---|---|
| 2008/0052539 A1* | 2/2008 | MacMillan | ............. | G06F 21/78 713/193 |
| 2012/0060033 A1* | 3/2012 | Giuliani | ................ | H04L 9/0631 713/168 |
| 2016/0173485 A1* | 6/2016 | Popoveniuc | .......... | G06F 21/316 726/1 |
| 2017/0339118 A1* | 11/2017 | Hwang | ................. | H04L 63/061 |
| 2019/0349191 A1* | 11/2019 | Soriente | ................ | H04L 9/0844 |
| 2021/0144004 A1* | 5/2021 | Gray | ..................... | H04L 9/0891 |
| 2022/0014389 A1* | 1/2022 | Nix | ....................... | H04L 9/0838 |
| 2023/0222230 A1 | 7/2023 | Hopkins | | |

(Continued)

OTHER PUBLICATIONS

Jarecki, et al., "OPAQUE: An Asymmetric PAKE Protocol Secure Against Pre-Computation Attacks", IACR Cryptology ePrint Archive, 2018, p. 163.

(Continued)

*Primary Examiner* — Aftab N. Khan
(74) *Attorney, Agent, or Firm* — Eversheds Sutherland (US) LLP

(57) ABSTRACT

Systems, devices, and methods are provided for an in-transit content protection protocol. A sender may request an ephemeral public key. A receiver (e.g., cloud-based privacy control system) may generate a first ephemeral key pair and sign the ephemeral public key with the receiver's identity key. A sender may validate the digital signature to authenticate the receiver identity and create a second ephemeral key pair. The sender may provide its own ephemeral public key, similarly signed with the sender's identity key. The receiver may validate the digital signature to authenticate the sender identity, allowing both entities to determine a session secret. The session secret may be used to securely transmit a content encryption key from sender to receiver.

20 Claims, 28 Drawing Sheets

(56) References Cited

U.S. PATENT DOCUMENTS

| | | | | |
|---|---|---|---|---|
| 2024/0012933 | A1* | 1/2024 | Widmer | G06F 21/6245 |
| 2024/0048380 | A1* | 2/2024 | Berger | G06F 9/547 |
| 2024/0283664 | A1* | 8/2024 | Islam | H04L 9/3271 |
| 2024/0323034 | A1* | 9/2024 | Kumar | H04L 9/3268 |
| 2025/0111097 | A1* | 4/2025 | Briongos | G06F 21/78 |
| 2025/0193077 | A1* | 6/2025 | Masood | G06F 3/121 |
| 2025/0258937 | A1* | 8/2025 | Crabtree | G06N 5/02 |
| 2025/0363245 | A1* | 11/2025 | Sohum | G06F 21/6263 |

OTHER PUBLICATIONS

Ratner, et al., "Snorkel: Rapid Training Data Creation with Weak Supervision," The VLDB Journal, 23(2-3), 2019, pp. 709-730.

Bourdrez, J. (n.d.). The OPAQUE augmented PAKE protocol (PDF). Retrieved Jun. 26, 2026.

* cited by examiner

TECHNIQUES FOR IN-TRANSIT CONTENT PROTECTION PROTOCOLS

CROSS-REFERENCE TO RELATED APPLICATIONS

This application incorporates by reference for all purposes the full disclosure of co-pending U.S. patent application Ser. No. 18/980,956, filed concurrently herewith, entitled "TECHNIQUES FOR USING A PASSPHRASE TO ENROLL A DEVICE IN AN END-TO-END ENCRYPTION (E2EE) DATA PLATFORM" and co-pending U.S. patent application Ser. No. 18/980,867, filed concurrently herewith, entitled "TECHNIQUES FOR AT-REST CONTENT PROTECTION PROTOCOLS WITH BINDINGS".

BACKGROUND

In the context of computer security, establishing trust between computing devices has many challenges. In various circumstances, devices in local proximity to each other may utilize a cloud service provider to facilitate various identity and access management related functionality. With the growing prevalence of devices being utilized in use cases that are of a particularly sensitive nature, data privacy is becoming more and more important. For example, an individual that installs home security cameras may wish to have greater control of video data captured by the device. One such mechanism by which devices are secured is the use of end-to-end encryption (E2EE) capabilities. Within E2EE, entities can broadly be classified as data consumers and data producers. In many E2EE environments, a data producer device determines the privacy controls for content it produces. However, this can be computationally intensive, especially when there are a growing number of data consumers. Accordingly, there is a present desire for improved privacy controls that reduce the computational burden on producer devices.

Figure 1:
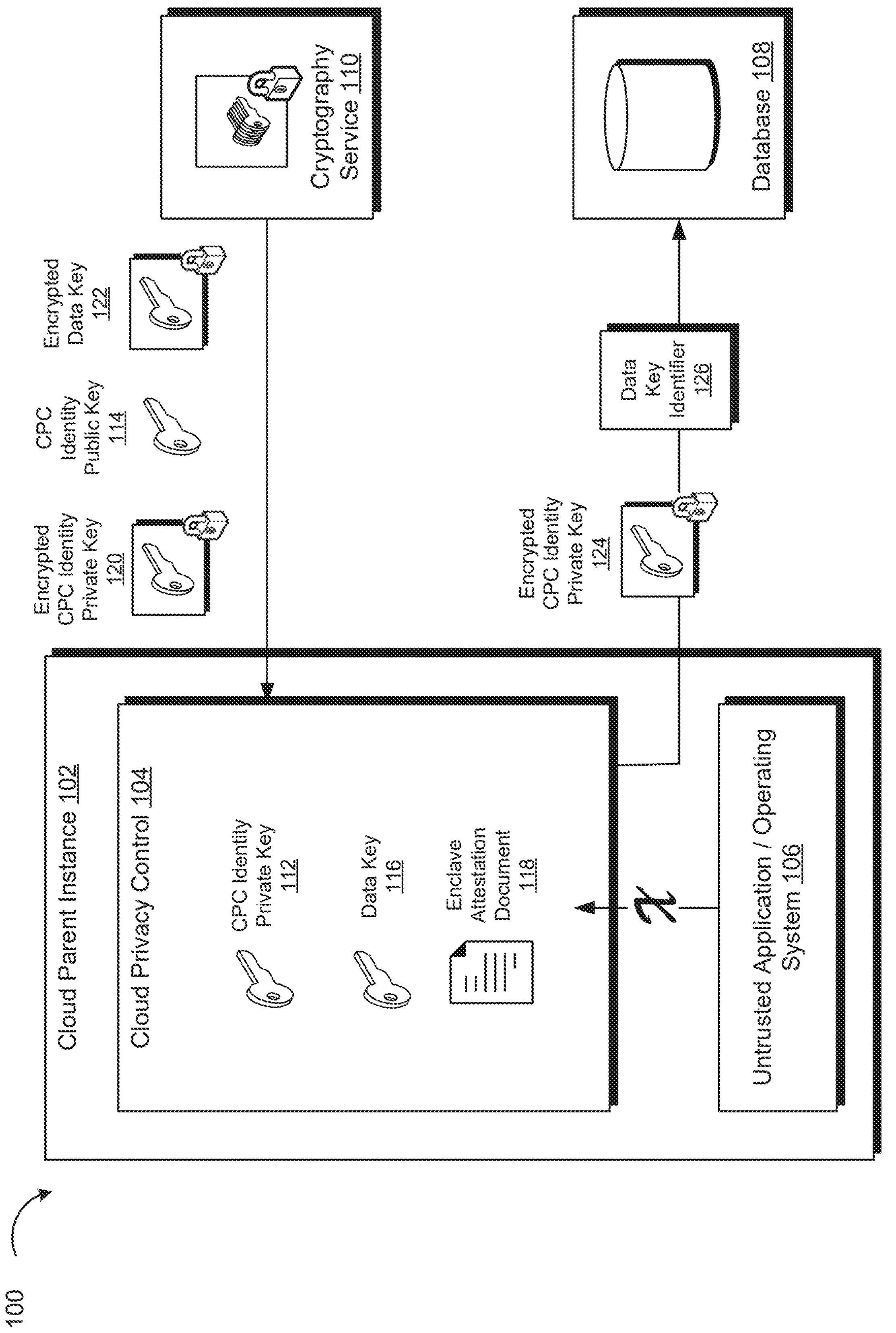
FIG. 1 illustrates a computing environment 100 depicting a cloud-based privacy control system, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Example embodiments described herein provide certain systems, methods, and devices for using a passphrase to enroll a device to a secured data platform. In various embodiments, an enrollment protocol is performed such that a user is able to manage an ecosystem of devices and/or services using a single, customer-defined passphrase. This is in contrast to various traditional systems, that generate a passphrase from a long sequence of predefined seed words (e.g., 10 words or more) or tokens. In traditional systems, there is typically a tradeoff between security and ease-of-use. For example, traditional systems may generate a passphrase from an ordered sequence of N different words selected from a predetermined dictionary. One of the reasons that passphrases are chosen in this manner—rather than, for example, allowing a user to select their own passphrase as if it were a typical website password (even a strong one)—is to ensure high entropy. Entropy—as used in the field of information theory and throughout this disclosure—refers a measure of randomness and unpredictability. Generally speaking, passphrases with higher entropy are positively correlated with greater security from various types of attacks and can be shown, through cryptanalysis, to be more secure than similar passphrases with lower entropy.

FIG. 1 illustrates a computing environment 100 depicting a cloud-based privacy control system, in accordance with one or more example embodiments of the present disclosure.

According to at least one embodiment of the present disclosure, computing environment 100 comprises: cloud parent instance 102; cloud privacy control 104; untrusted application/operating system 106; database 108; cryptography service 110; cloud privacy control identity private key 112; cloud privacy control identity public key 114; data key 116; enclave attestation document 118; encrypted cloud privacy control identity private key 120; encrypted data key 122; encrypted cloud privacy control identity private key 124; and data key identifier 126. FIG. 1 depicts an illustrative, non-limiting, example of a computing environment, and various other embodiments comprising greater or fewer components relative to those depicts in FIG. 1 are also contemplated within the scope of this disclosure. In various embodiments, techniques described in greater detail below that are applicable to FIG. 1 may be utilized in connection with other embodiments described herein, such as those discussed in connection with some or more of FIG. 2 to FIG. 28.

In various embodiments, cloud parent instance 102 refers to a host system or machine comprising cloud privacy control 104 and untrusted application/operating system 106. Cloud privacy control 104 may be utilized to implement a cloud-based privacy control system for customer content and coordinate the distribution of the customer's content to authorized entities. In various embodiments, cloud privacy control 104 comprises code and/or data within the confines of a protected execution environment. For instance, cloud privacy control 104 may be implemented within an enclave. In various embodiments, data within the enclave is not visible outside of the enclave. For example, cryptographic material inside of cloud privacy control 104 is not accessible outside of the enclave, including but not limited to secret key material, such as private keys (e.g., CPC identity private key 112, enclave attestation private key) and symmetric keys.

In various embodiments, CPC identity private key 112 and CPC identity public key 114 collectively refers to an asymmetric key pair that is uniquely associated with cloud privacy control 104. Cloud privacy control 104 may use cryptography service 110 to manage and/or create cryptographic keys. For instance, cryptography service 110 may be used to create the CPC identity key pair and/or the data key that is used by cloud privacy control 104. In various embodiments, cryptography service 110 generates CPC identity private key 112 and CPC identity public key 114. Cryptography service may encrypt the CPC identity private key 112 to produce encrypted CPC identity private key 120. In various embodiments, cloud privacy control 104 stores cryptographic key material sufficient to decipher encrypted CPC identity private key 120. In various embodiments, data key 122 is generated by cryptography service 110 and encrypted to produce encrypted data key 122. Cloud privacy control 104 may store cryptographic key material sufficient to decipher encrypted data key 122.

In various embodiments, enclave attestation document 118 is a key component in protected execution environments provided by platforms like Intel® SGX (Software Guard Extensions) and AWS Nitro Enclaves and serves as a verifiable proof of the enclave's identity and security properties, allowing external entities to trust that the code running inside the enclave has not been tampered with and that it is executing in a secure and isolated environment. In various embodiments, the enclave attestation document 118 comprises various metadata such as the enclave's identity, the host platform's identity, an attestation public key associated with cloud privacy control 104. In various embodiments, enclave attestation document 118 is signed by a trusted authority and can be validated by cryptography service 110.

In various embodiments, data key 116 is securely stored within cryptography service 110 (e.g., within a security module). The data key 116 may be a symmetric key and is associated with data key identifier 126. In various embodiments, the data key 116 can be provided by cryptography service 110 to cloud privacy control 104 (or another instance of the CPC). In some embodiments, the enclave attestation document 118 is needed for cryptography service 110 to provide the data key to the requesting entity.

In various embodiments, cloud privacy control 104 encrypts the CPC identity private key 112 using data key 116, thereby producing encrypted CPC identity private key 124. The encrypted CPC identity private key 124 may be exported from cloud privacy control 104, which is permitted as the ciphertext cannot be decrypted by untrusted entities (e.g., untrusted application/operating system 106) as they lack access to sufficient cryptographic material (i.e., data key 116) to decrypt encrypted CPC identity private key 124. Encrypted CPC identity private key 124 and data key identifier 126 may be persisted in database 108, which can be used later on for various purposes, such as a trusted retrieval process in accordance with embodiments discussed in connection with FIG. 3.

In various embodiments, multiple instances of cloud privacy control 104 can simultaneously exist across a cloud service provider. Load balancers may be used to scale up and/or scale down the number of CPC instances within the cloud service environment, for example, based on the usage rate of CPC.

Figure 2:
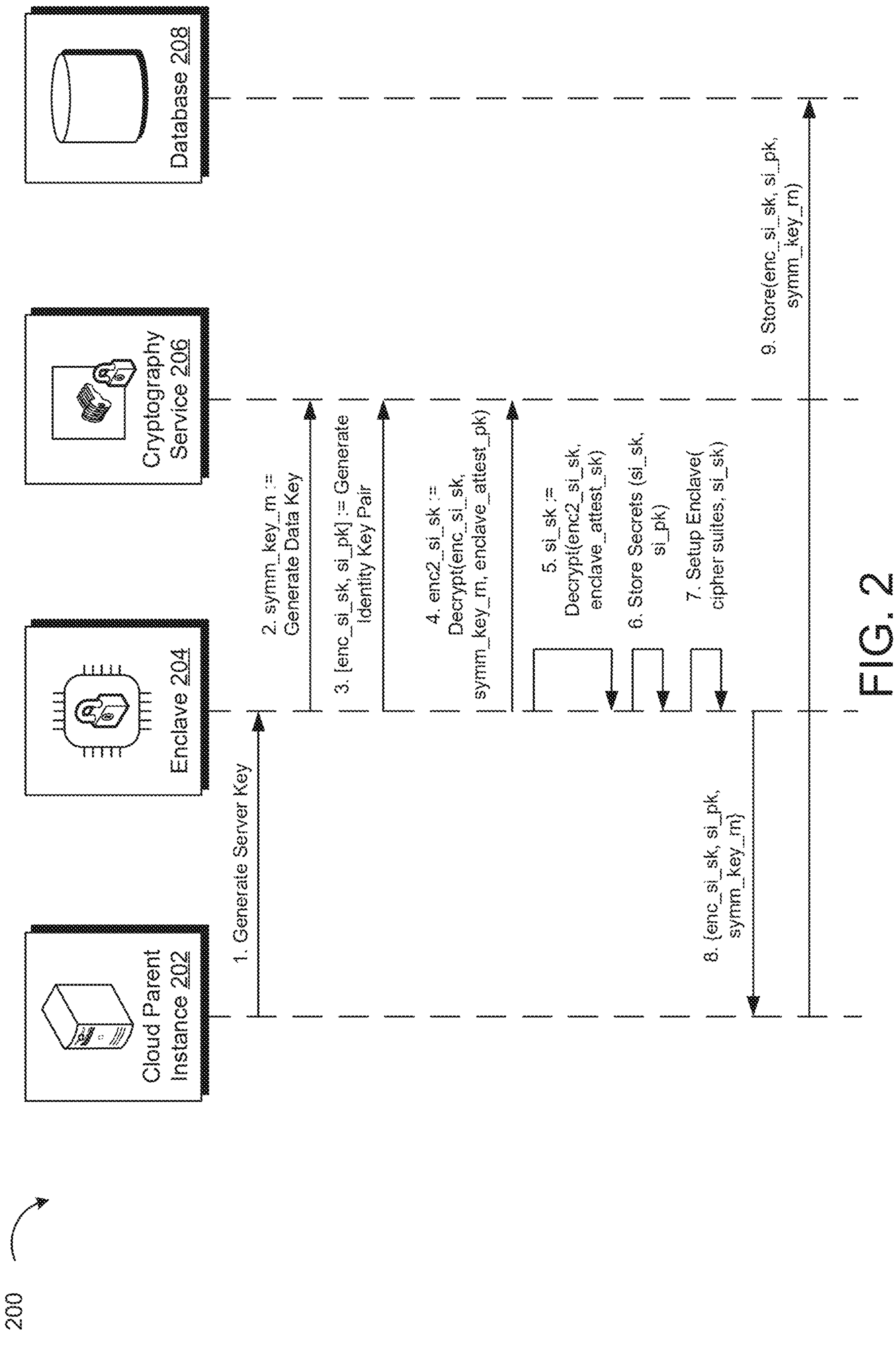
FIG. 2 illustrates a diagram 200 depicting a trusted setup process, in accordance with one or more example embodiments of the present disclosure.

FIG. 2 illustrates a diagram 200 depicting a trusted setup process, in accordance with one or more example embodiments of the present disclosure.

According to at least one embodiment of the present disclosure, a trusted setup process in accordance with diagram 200 involves the following entities: cloud parent instance 202; enclave 204; cryptography service 206; and database 208. FIG. 2 depicts an illustrative, non-limiting, example of a computing environment, and various other embodiments comprising greater or fewer components relative to those depicts in FIG. 2 are also contemplated within the scope of this disclosure.

In various embodiments, cloud parent instance 202 may refer to hardware, software, or a combination thereof. Cloud parent instance 202 may be connected with a client entity (e.g., client device) that is responsible for initiating a trusted setup process. In some embodiments, a trusted setup process is triggered by the client (e.g., an API (application programming interface) command from client to cloud parent instance 202), thereby causing cloud parent instance 202 to initiate the trusted setup process depicted in FIG. 2. In various embodiments, cloud parent instance 202 refers to a compute instance or other compute resource that is provisioned and executed in the context of a cloud service environment. In various embodiments, cloud parent instance 202 provides various compute capabilities, such as the ability to run confidential computing workloads within a protected execution environment, such as an enclave (e.g., enclave 204 depicted in FIG. 2).

In various embodiments, enclave 204 refers to a type of protected execution environment that can be used to run confidential computing workloads and protect data and/or code of such workloads while in use. As described herein, confidential computing refers to the use of a protected execution environment (e.g., enclave) to protect data while in-use. Enclave 204 may be designed to execute applications in a protected environment that separates applications and data inside the enclave from the operating system and other applications on the device hosting the enclave. For example, cloud parent instance 202 may be provisioned to run enclave 204—however, other code, such as applications and services running on cloud parent instance 202, is unprivileged to access memory or data that is utilized by enclave 204. In a cloud computing environment, a cloud-based enclave product can include cryptographic attestation for customer software, so that the customer can be sure that only authorized code is running, as well as integration with a cryptography service 206, so that only the enclave can access sensitive material. Further, the cloud-based enclave can be managed by a hypervisor that creates the isolation between an enclave and a corresponding virtual machine instance. Managing a cloud-based enclave using a hypervisor can beneficially enable the creation of enclaves with varying combinations of CPU cores and memory.

In various embodiments, enclave 204 is implemented in the context of a security module, such as a hardware security module (HSM). A security module may be programmed with executable code and then protected (e.g., locked) such that it is infeasible to change the code afterwards. In various embodiments, after an HSM-based enclave is setup, it serves as an entity that cannot be corrupted in the backup system. An HSM-based enclave may be used to perform various cryptographic computations in a cloud-based environment. In various embodiments, the enclave 204 is configured with the following assurances: (i) sensitive data (e.g., secret key material) within the enclave is not accessible outside of the enclave, even to the operating system or privileged users of the system that the enclave is running on; and (ii) the executable code for the enclave cannot be altered after setup. In various embodiments, a trusted setup process is performed wherein a process leader unpacks new modules, configures them with program code, and generates fresh key material for the enclave (where public keys are copied and secret keys remain confidential). In various embodiments, after setup, the enclave generates PCR (platform configuration register) for the EIF (Enclave Image File), ensuring that it cannot be modified after the process. In various embodiments, the public key material of the enclave is hardcoded into the client application.

In various embodiments, an enclave is used to protect (e.g., securely store) cryptographic material. An enclave may be provisioned with an enclave key. The enclave key may be unique to every instance and generated during an initial setup process. In various embodiments, the enclave key is implemented as an asymmetric key pair comprising: (i) an enclave private key that is securely stored in the enclave; and (ii) a corresponding enclave public key, that can be emitted to entities outside of the enclave and can generally be distributed to entities outside of the enclave's protected environment. As noted above, enclave keys may be unique to each instance of an enclave (e.g., each instance of a cloud-based privacy control can have its own, unique enclave key) which may be used for encryption and decryption purposes. The enclave key may be used as a medium term key for encryption and decryption.

In various embodiments, an enclave is used to protect (e.g., securely store) an enclave attestation key. The enclave attestation key may be implemented as an asymmetric key comprising an attestation private key and an attestation public key. The attestation keys may be used for signature and verification purposes. In various embodiments, the secret part of the attestation key is securely stored in the enclave and is used to internally sign an attestation document. The attestation key may be unique to every instance.

In various embodiments, the following key material is generated by the outcome of a trusted setup process: (i) a non-exportable symmetric encryption key KEnc_HSM. As will be described in further detail below, this key will be generated in cryptography service 206 and decryption operations on the key can only be called from within the enclave; and (ii) an identity key pair {si_sk, si_pk}, which is also generated using cryptography service 206, wherein the private key si_sk is confidentially shared with enclave 204. In various embodiments, the enclave can be invoked internally by a cloud privacy control, and only through certain predetermined interfaces.

In various embodiments, database 208 refers to a database or other suitable storage system that is operable to store data elements, such as those depicted in FIG. 2.

In various embodiments, cloud parent instance 202 submits an API (application programming interface) call, request, command, or otherwise invokes enclave 204 to initiate a trusted setup process. In various embodiments, enclave 204 comprises one or more entry points that allows for cloud parent instance 202 to interact with enclave 204. An enclave may be running on a machine (e.g., cloud parent instance 202) using a protected area in memory address space, such data stored in the protected area of memory is protected from external tampering, access, or monitoring. In various embodiments, an entry point to enclave 204 is exposed as an API to generate a server key.

In various embodiments, enclave 204 receives, via an entry point, a request to generate a server key. Within the context of the enclave, a confidential computing workload may be executed to generate a server key. In various embodiments, enclave 204 submits a web service API call to cryptography service 206 to generate a data key. In various embodiments, the cryptography service 206 will generate the requested data key in any suitable manner. For example, the cryptography service 206 may programmatically generate a new symmetric key or assign a pre-generated key to enclave 204. In various embodiments, cryptography service 206 generates a data key and assigns a unique resource name (RN) or identifier to the generated key, and provides the resource name or identifier in response to the enclave request. For purposes of discussion, the resource name or identifier of the data key described above may be referenced as “symm_key_rn” hereinbelow. In various embodiments, symm_key_rn is returned by cryptography service 206 to enclave 204 in an API response. In an illustrative, non-limiting example implementation, enclave 204 communicates with cryptography service 206 for key generation and passes an attestation document along with the enclave public key. In turn, cryptography service 206 may generate a secret (e.g., symmetric key or private portion of an asymmetric key pair), encrypt it to the enclave public key in the attestation document, and pass the resulting ciphertext to the enclave. Upon receipt, the enclave is able to use its corresponding enclave private key to decrypt the ciphertext and determine the requested key material.

In various embodiments, enclave 204 submits a web service API call to cryptography service 206 to generate an identity key pair. As described herein, a key pair may refer to a pair of cryptographic material intended for use in an asymmetric cryptography protocol. The key pair is often referred to as a private key and a public key. The public key may be used for encryption, whereas the private key may be used for decryption. In various embodiments, the cryptography service 206 will generate the requested identity key pair in any suitable manner. For example, the cryptography service 206 may programmatically generate a new asymmetric key pair or assign a pre-generated key pair to enclave 204. In various embodiments, cryptography service 206 generates an identity key pair and assigns a unique resource name (RN) or identifier to the generated private key and/or the generated public key. In some embodiments, the unique resource name or identifier is associated with the key pair. In various embodiments, the response to the enclave's request will comprise a plaintext of the identity key pair's public key and a ciphertext of the data key pair's private key. For purposes of discussion, the plaintext of the public key described above may be referenced as “si_pk” hereinbelow. In various embodiments, the private key described above is encrypted using the symmetric data key described above to produce a ciphertext of the private key, which may be referenced as “enc_si_sk” hereinbelow. In various embodiments, enc_si_sk and si_pk are returned by cryptography service 206 to enclave 204 in an API response.

In various embodiments, cryptography service 206 supports cryptographic attestation for enclaves. In various embodiments, confidential computing workloads that support enclaves can call various cryptographic operations supported by cryptography service 206 with a signed attestation document for the enclave. In various embodiments, if these APIs are called, the attestation document will be verified as having been emitted by an enclave supported or otherwise known by the cryptography service. In such cases, instead of returning plaintext data in their responses, these APIs will encrypt the plaintext with a public key from the attestation document and return ciphertexts that can be decrypted only by the corresponding private key in the enclave.

Accordingly, in various embodiments, enclave 204 will receive enc_si_sk encrypted under the symmetric key symm_key_rn which enclave 204 is not able to directly access. However, as discussed above, cryptographic attestations of a supported enclave can be used to decrypt ciphertexts. According to at least one embodiment, enclave 204 submits to cryptography service 206 a request to decrypt enc_si_sk, the request comprising enc_si_sk, symm_key_rn, and an attestation document associated with enclave 204. This attestation document may comprise or otherwise encode a public key associated with enclave 204, which will herein after be referred to as “enclave_attest_pk”.

An illustrative, non-limiting example of an attestation document is presented below:

```
{
  “module_id”: “EnclaveImage-hash”,
  “digest”: “sha256:digest-value”,
  “pcr”: {
    “0”: “pcr0-hash-value”,
    “1”: “pcr1-hash-value”,
    “2”: “pcr2-hash-value”,
    “3”: “pcr3-hash-value”,
    “4”: “pcr4-hash-value”,
    “5”: “pcr5-hash-value”,
    “6”: “pcr6-hash-value”,
    “7”: “pcr7-hash-value”
  },
  “public_key”: “enclave-public-key-base64”,
  “enclave_id”: “enclave-instance-id”,
  “image_digest”: “sha256:image-digest-value”,
  “signer_id”: “signer-id”,
  “mrenclave”: “mrenclave-hash”,
  “mrsigner”: “mr-signer-hash”,
  “user_data”: “base64-encoded-user-data”,
  “nonce”: “nonce-value”,
  “timestamp”: “2024-08-21T12:34:56Z”,
  “issuer”: “Confidential Computing Hypervisor”,
  “signature”: “base64-encoded-signature”
}
}
```

Returning to FIG. 2, upon receiving a decryption request with enc_si_sk, symm_key_rn, and attestation document, cryptography service 206 can verify that the requestor is a supported enclave by performing one or more cryptographic verifications with the attestation document. Once the attestation has been cryptographically verified, cryptography service 206 can retrieve the symmetric key referenced by symm_key_rn, use it to decrypt enc_si_sk to produce si_sk, and then encrypt si_sk using enclave_attest_pk to produce a ciphertext. This ciphertext may be provided to enclave 204 in a response to the decrypt request. This ciphertext may be referred to as "enc2_si_sk".

In various embodiments, enclave 204 receives a ciphertext in response to the aforementioned decrypt request, and uses the private key corresponding to the attestation's public key to decrypt enc2_si_sk. In various embodiments, the private key is referred to as "enclave_attest_sk". Once the ciphertext is decrypted using enclave_attest_sk, the plaintext si_sk is available to enclave 204. Accordingly, both portions of the data key pair generated in step 3 are now available to enclave 204 in plaintext. Both si_sk and si_pk may be now be stored or persisted locally within the secure confines of enclave 204.

Accordingly, downstream steps for setting up the enclave 204 for secure usage, such as collecting, storing, and/or retrieving sensitive data, may be performed using the generated key pair. Accordingly, the trusted setup process allows for enclave 204 to securely obtain a cryptographic key pair. For example, various functionality may be performed by enclave 204 as part of implementing cloud-based privacy controls upon the provisioning of si_sk and si_pk within the enclave environment, such as those described in connection with FIG. 10 to FIG. 28. In various embodiments, a cipher suite is specified during instance setup, which may be used to establish cryptographically protected communications sessions (e.g., TLS session) with enclave 204.

In various embodiments, enclave 204 exports, from its secure environment, the following set of information via one or more predefined exit points (e.g., an OCALL): enc_si_sk, si_pk, and symm_key_rn. These data elements may be provided to cloud parent instance 202, at which point it can then be uploaded to database 208 to be persisted and/or shared with other enclave instances. For example, these data elements may be retrieved at a later point in time as part of a trusted retrieval process by another enclave instance. In various embodiments, the cryptographic data elements {enc_si_sk, si_pk, symm_key_rn} are persisted in a key-value store, wherein a key can be used to retrieve the same cryptographic data elements at a later point in time. In various embodiments, the cryptographic data elements {enc_si_sk, si_pk, symm_key_rn} are mapped to a value that is hardcoded in the enclave and providing a unique identity to the enclave. In various embodiments, enc_si_sk may act as a unique identifier and for later retrieval of the cryptographic data elements.

Figure 3:
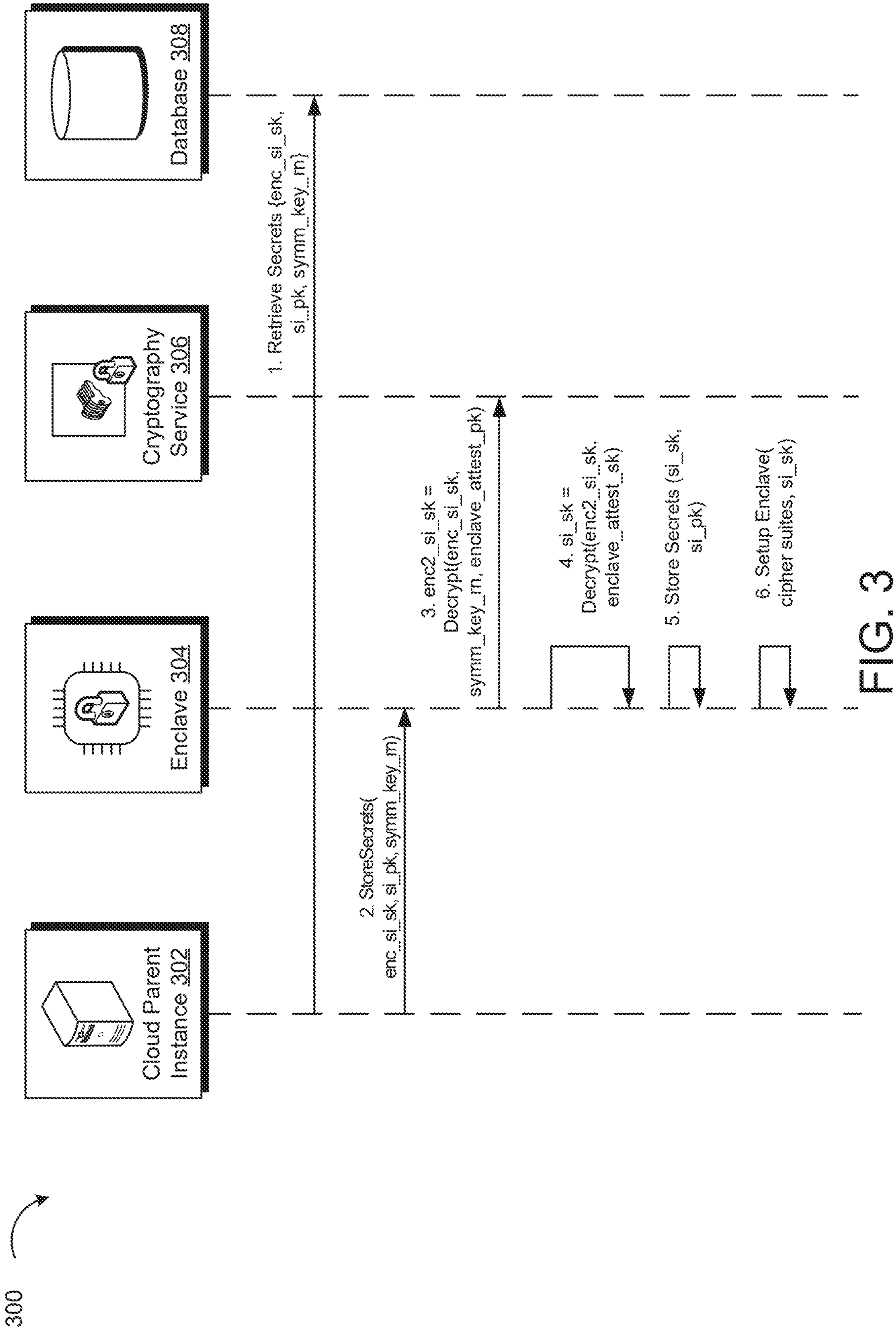
FIG. 3 illustrates a diagram 300 depicting a trusted retrieval process, in accordance with one or more example embodiments of the present disclosure.

FIG. 3 illustrates a diagram 300 depicting a trusted retrieval process, in accordance with one or more example embodiments of the present disclosure.

According to at least one embodiment of the present disclosure, a trusted setup process in accordance with diagram 300 involves the following entities: cloud parent instance 302; enclave 304; cryptography service 306; and database 308. FIG. 3 depicts an illustrative, non-limiting, example of a computing environment, and various other embodiments comprising greater or fewer components relative to those depicts in FIG. 3 are also contemplated within the scope of this disclosure.

In various embodiments, a trusted retrieval process that is discussed in connection with FIG. 3 may be implemented in the context of a trusted setup process, for example, as discussed in connection with FIG. 2 In various embodiments, cloud parent instance 302, enclave 304, cryptography service 306, and/or database 308 is implemented in accordance with the techniques described in connection with FIG. 2. For example, in FIG. 2, a database is used to store cryptographic data elements {enc_si_sk, si_pk, symm_key_rn}. In various embodiments, the same database is referenced in FIG. 3 and is utilized to retrieve those cryptographic data elements. In various embodiments, cryptography service 306 is the same cryptography service referenced in FIG. 2. Generally speaking, cryptography service 306 does not necessarily need to be the same cryptography service, but would still need to be able to resolve symm_key_rn and perform cryptographic operations (e.g., decryption) using the underlying symmetric key referenced by symm_key_rn.

In various embodiments, cloud parent instance 302 may be different from the cloud parent instance referenced in FIG. 2. Cloud parent instance 302 may be associated with the same customer or client as referenced in FIG. 2 above. In various embodiments, cloud parent instance 302 refers to hardware, software, or a combination thereof that hosts a protected execution environment, such as enclave 304 depicted in FIG. 3. In various embodiments, a trusted retrieval process may be performed to allow for multiple enclave instances to be provisioned with the same cryptographic material {si_sk, si_pk}, which can provide for various technical benefits. For example, multiple enclaves can be setup to perform parallelized computing and/or processing workloads.

In various embodiments, enclave 304 refers to a protected computing environment in which confidential computing workloads can be executed. In various embodiments, the enclave 304 is different from the enclave referenced in FIG. 2, as that enclave, upon completion of the trusted setup process, would already have access to the cryptographic material {si_sk, si_pk}. In various embodiments, a trusted retrieval process is able to be performed after a trusted setup process to allow for several trusted enclave instances to be provisioned and operable to run the same or different confidential computing workloads that rely on the use of cryptographic material {si_sk, si_pk}.

In various embodiments, cloud parent instance 302 submits a request to database 308 to obtain the stored cryptographic data elements {enc_si_sk, si_pk, symm_key_rn}. In various embodiments the cryptographic data elements {enc_si_sk, si_pk, symm_key_rn} are retrieved from a key-value store. In various embodiments, upon retrieval of cryptographic data elements {enc_si_sk, si_pk, symm_key_rn}, cloud parent instance 302 may invoke an entry point to enclave 304 and provide the cryptographic data elements {enc_si_sk, si_pk, symm_key_rn} to the enclave 304.

Upon receiving the cryptographic data elements {enc_si_sk, si_pk, symm_key_rn}, enclave 304 may utilize cryptography service 306 to unwrap enc_si_sk, as it is in a ciphertext format that enclave 304 is unable to decipher, owing to enc_si_sk being encrypted under a cryptographic key that enclave 304 lacks access to.

In various embodiments, cryptography service 306 supports cryptographic attestation for enclaves. In various embodiments, confidential computing workloads that support enclaves can call various cryptographic operations supported by cryptography service 306 with a signed attestation document for the enclave. In various embodiments, if these APIs are called, the attestation document will be verified as having been emitted by an enclave supported or otherwise known by the cryptography service. In such cases, instead of returning plaintext data in their responses, these APIs will encrypt the plaintext with a public key from the attestation document and return ciphertexts that can be decrypted only by the corresponding private key in the enclave.

Accordingly, in various embodiments, enclave 304 will receive enc_si_sk encrypted under the symmetric key symm_key_rn which enclave 304 is not able to directly access. However, as discussed above, cryptographic attestations of a supported enclave can be used to decrypt ciphertexts. According to at least one embodiment, enclave 304 submits to cryptography service 306 a request to decrypt enc_si_sk, the request comprising enc_si_sk, symm_key_rn, and an attestation document associated with enclave 304. This attestation document may comprise or otherwise encode enclave_attest_pk.

Upon receiving a decryption request with enc_si_sk, symm_key_rn, and attestation document, cryptography service 306 can verify that the requestor is a supported enclave by performing one or more cryptographic verifications with the attestation document. Once the attestation has been cryptographically verified, cryptography service 306 can retrieve the symmetric key referenced by symm_key_rn, use it to decrypt enc_si_sk to produce si_sk, and then encrypt si_sk using enclave_attest_pk to produce a ciphertext enc2_si_sk. This ciphertext may be provided to enclave 304 in a response to the decrypt request.

In various embodiments, enclave 304 receives a ciphertext in response to the aforementioned decrypt request, and uses the private key corresponding to the attestation's public key to decrypt enc2_si_sk. In various embodiments, the private key is referred to as "enclave_attest_sk". Once the ciphertext is decrypted using enclave_attest_sk, the plaintext si_sk is available to enclave 304. Both si_sk and si_pk may now stored or persisted locally within the secure confines of enclave 304.

Accordingly, downstream steps for setting up the enclave 304 for secure usage, such as collecting, storing, and/or retrieving sensitive data, may be performed using the generated key pair. Accordingly, the trusted setup process allows for enclave 304 to securely obtain a cryptographic key pair. For example, various functionality may be performed by enclave 304 upon provisioning of si_sk and si_pk within the enclave environment, such as those described in connection with FIG. 10 to FIG. 28 [E2E encryption figures]. In various embodiments, a cipher suite is specified during instance setup, which may be used to establish cryptographically protected communications sessions (e.g., TLS session) with enclave 304.

In various embodiments, the trusted retrieval process depicted in FIG. 3 can be used to instantiate multiple enclave instances with the same identity key pair {si_sk, si_pk}, which ensures that users cannot get locked out of their backup even if one of the enclaves breaks. In various embodiments, each of the enclaves provisioned in this manner are configured to coordinate their state changes via a consensus protocol, ensuring that each enclave behaves the same for a given user. For purposes of this disclosure, and without a loss of generality, and unless otherwise specified, a set of enclaves may be treated as a single, logical enclave entity.

Figure 4:
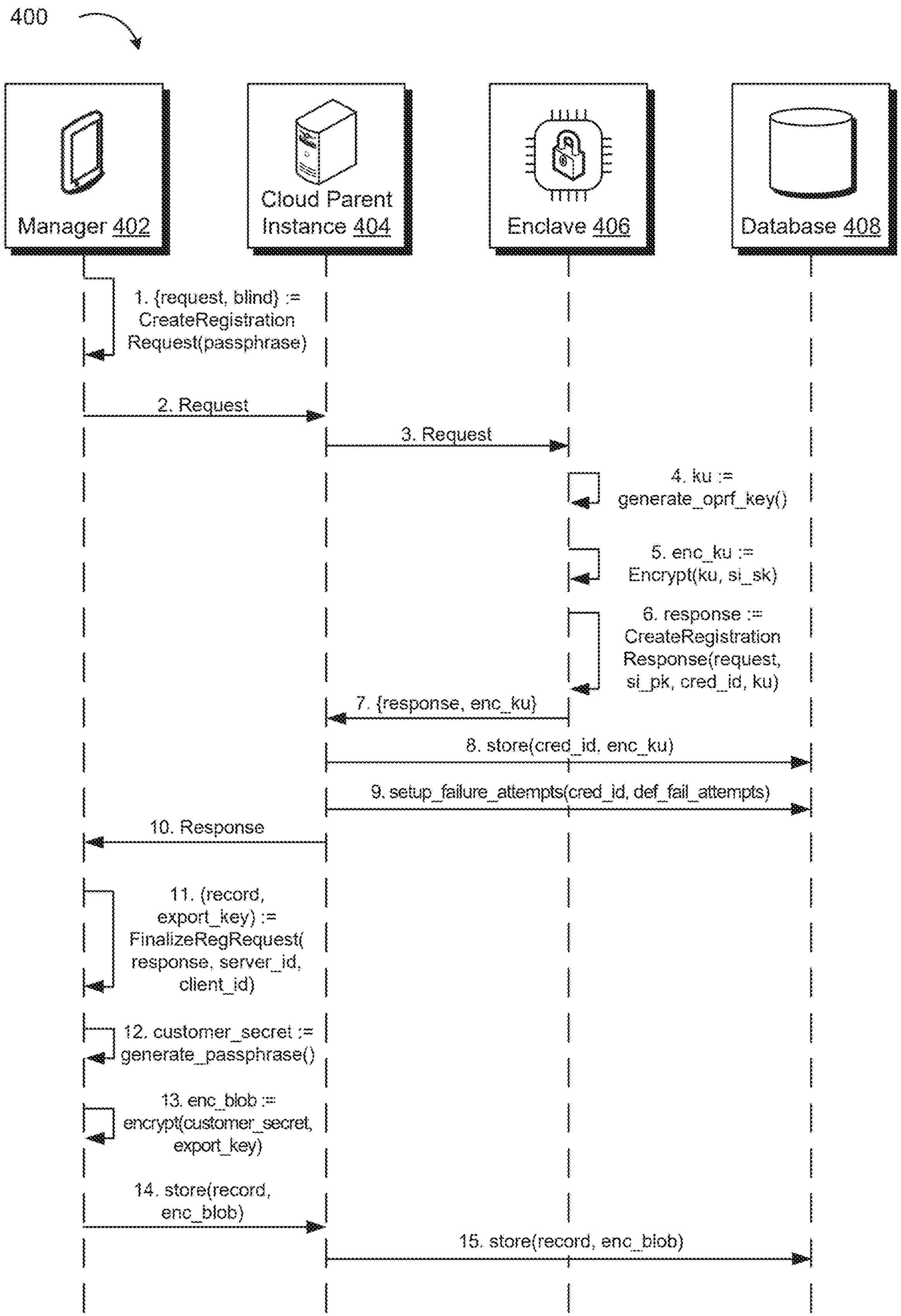
FIG. 4 illustrates a diagram 400 depicting a backup registration protocol, in accordance with one or more example embodiments of the present disclosure.

FIG. 4 illustrates a diagram 400 depicting a backup registration protocol, in accordance with one or more example embodiments of the present disclosure.

According to at least one embodiment of the present disclosure, a backup registration protocol in accordance with diagram 400 involves the following entities: manager 402; cloud parent instance 404; enclave 406; and database 408. FIG. 4 depicts an illustrative, non-limiting, example of a computing environment, and various other embodiments comprising greater or fewer components relative to those depicts in FIG. 4 are also contemplated within the scope of this disclosure. In various embodiments, some or all of the components depicted in FIG. 4 may be utilized in connection with embodiments discussed elsewhere in this disclosure. For example, the client, the cloud parent instance, enclave, and/or database discussed in connection with the key recovery protocol of FIG. 5 may be utilized in connection with FIG. 4.

An illustrative, non-limiting example of an implementation of a password-authenticated key exchange (PAKE) protocol registration is depicted in FIG. 4, and in accordance with one or more embodiments of the present disclosure. In various embodiments, a PAKE protocol registration may comprise the following steps: (i) user chooses a passphrase and client creates and enrollment authority CA signing key (EA-SK); (ii) client creates a customer secrets encryption key and uses that to bundle the EA-SK (e.g., in PKCS #12 format); (iii) the cloud privacy control initialization phase is executed—to this end, the client runs the OPAQUE protocol with the enclave, which takes the passphrase from the client and a oblivious pseudorandom function (OPRF) key "Ku" from the enclave as inputs; and (iv) customer secrets encryption key is encrypted using an ExportKey derived using both the customer-defined passphrase and Ku and generated at client after step (iii) and server stores the encrypted backup customer secrets encryption key, the encrypted OPRF key Ku, and a counter ctr initialized with N that tracks passphrase guessing attempts.

In various embodiments, a registration protocol or phase is executed for the first time to activate backups, for example, as part of an out-of-box experience (OOBE) when a customer purchases and provisions a device, such as a home security camera or other headless device. Manager 402 may refer to a client computing device that is owned or otherwise controlled by a customer, with network connectivity that allows the customer to connect the client device to a cloud privacy control service.

In various embodiments, manager 402 is a client owned/controlled device or application that is under the control of a customer. In various embodiments, the customer, via manager 402, specifies a passphrase. The passphrase may, for example, may allow the customer to choose a passphrase of their own liking. In some embodiments, the customer may be prompted to generate a password having certain requirements, such as having a minimum character length, include a combination of upper and/or lower case letters, numbers, and/or symbols. This customer-defined passphrase may be contrasted to traditional systems where a random passphrase is generated as a sequence of N different words selected from a predetermined dictionary.

In various embodiments, the customer-defined passphrase is allowed to have a lower entropy than what is required in traditional system. For instance, the customer-defined passphrase having 8 characters, letters, or symbols may be permitted. Such a password may have an entropy that is calculated as:

$$E=\log_2(R^L)$$

Where E is the entropy of the passphrase, R stands for the possible characters within the password, and L stands for the number of characters in the password. Accordingly, a password of 8 characters in length and using the full ASCII character set including special characters (character set size=94), the entropy of such passwords is approximately 65.5 bits. In contrast, traditional systems typically require much larger password entropies. For example, a 12-word phrase from a BIP-39 dictionary of 2048 words has 2048^12 possible combinations and provides approximately 128 bits of entropy. As will be described in greater detail below, security of the password can be maintained using various techniques, while still allowing for customer-defined passphrases that are easier for customers to remember. The customer-defined passphrase may be kept secret from other entities, such as cloud parent instance 404, enclave 406, and/or database 408.

In various embodiments, a cryptographically protected communications channel is established between manager 402 and cloud parent instance 404. An example of a cryptographically protected communications channel is a TLS session. In various embodiments, the cryptographically protected communications session provides cryptographically verifiable assurances of confidentiality, authenticity, and/or integrity. In various embodiments, confidentiality refers to assurances that only authorized entity are able to determine the contents transferred via such communications channels, authenticity refer to assurances that a message was created by a party purporting to be the author of the message and integrity refers to assurances that a received message was not modified either intentionally (e.g., by a malicious party) or unintentionally (e.g., as a result of signal loss during transmission) from its original form when the message was transmitted.

Manager 402 may submit a protocol registration request to cloud parent instance 404 and cloud parent instance 404 may, in turn, submit a protocol registration request to an enclave 406 hosted by the cloud parent instance 404. In various embodiments, the enclave receives the request at an entry point, and various operations performed within the enclave 406 (e.g., steps 4-6 depicted in FIG. 4) are done so within a protected execution environment that prevent external entities from accessing or modifying data and/or code associated with the enclave.

In various embodiments, enclave 406 is provisioned with an identity key pair {si_sk, si_pk}, wherein si_sk refers to a private key and si_pk refers to a public key. In various embodiments, enclave 406 is provisioned with the identity key pair in accordance with a trusted setup process and/or a trust retrieval process.

Returning to FIG. 4, enclave 406 may generate a random oblivious pseudorandom function (OPRF) key "ku" for each user and then encrypt the generated ku using the server identity key. In various embodiments, the OPRF key ku is encrypted using the server identity key. For instance, the encrypted OPRF key—referred to hereinafter as "enc_ku"—may be determined by encrypting the OPRF key ku using the private key si_sk. In various embodiments, the OPRF key ku is encrypted using asymmetric encryption using the identity key pair. In various embodiments, the OPRF key is a long term random key that is resident to and only accessible from within the enclave 406. In various embodiments, the OPRF key acts as a secret salt value that ensures the infeasibility of pre-computation attacks.

Once the encrypted OPRF key enc_ku is determined, a response may be created. In various embodiments, a response is created based at least in part on the request, the identity key pair's public key si_pk, a credential identifier—referred to hereinafter as "cred_id"—and the OPRF key ku. In various embodiments, si_sk and/or ku are secret quantities that are programmatically unexportable from the enclave 406.

In various embodiments, enclave 406 emits a response to the request submitted by cloud parent instance 404. In various embodiments, a response and the encrypted OPRF key enc_ku are emitted by enclave 406 and allowed to exit the confines of the enclave's protected execution environment. In various embodiments, the response comprises the server identity public key si_pk and/or the credential identifier cred_id. In various embodiments, the cloud parent instance 404 submits to database 408 a request to store cred_id and enc_ku.

In various embodiments, as part of the protocol registration process, cloud parent instance 404 will provide to database 408 a default failure attempts. The default failure attempts may be a predetermined value, or may be specified in the enclave's response, or may be defined in any other suitable value. In various embodiments, the default failure attempts are initialized to the number of retry attempts remaining, and is associated with cred_id.

In various embodiments, upon successful completion of steps 1-9, a response will be sent by cloud parent instance 404 to manager 402 indicating a successful registration request. Then, manager 402 may generate a record and export key based at least in part on the response provided by cloud parent instance 404, a server identity, and a client identity. The record may be in accordance with those described in "OPAQUE: An Asymmetric PAKE Protocol Secure Against Pre-Computation Attacks" to Jarecki, Krawczyk, and Xu, the contents of which is hereby incorporated by reference in its entirety. In various embodiments, the export key derived using both the customer-defined passphrase and the OPRF key ku. In various embodiments, manager 402 runs an OPAQUE protocol with the customer-defined passphrase to determine the export key, referenced as "export key" in FIG. 4. In various embodiments, customer_secrets_key depicted in FIG. 4 is created by the client and bundled with an enrollment authority CA signing key (EA-SK) in PKCS #12 format. The customer secrets key may then be encrypted using a symmetric export key to yield a ciphertext enc_blob. In various embodiments, the export key encrypts a credential (e.g., a randomly generated 256-bit key for the account). In various embodiments, the record determined in step 11 and enc_blob are submitted to cloud parent instance 404 which in turn stores record and enc_blob in database 408. In various embodiments, cryptographic techniques to ensure data integrity and/or authenticity are implemented to ensure that the record and enc_blob sent by manager 402 are identical to the versions persisted in database 408.

Figure 5:
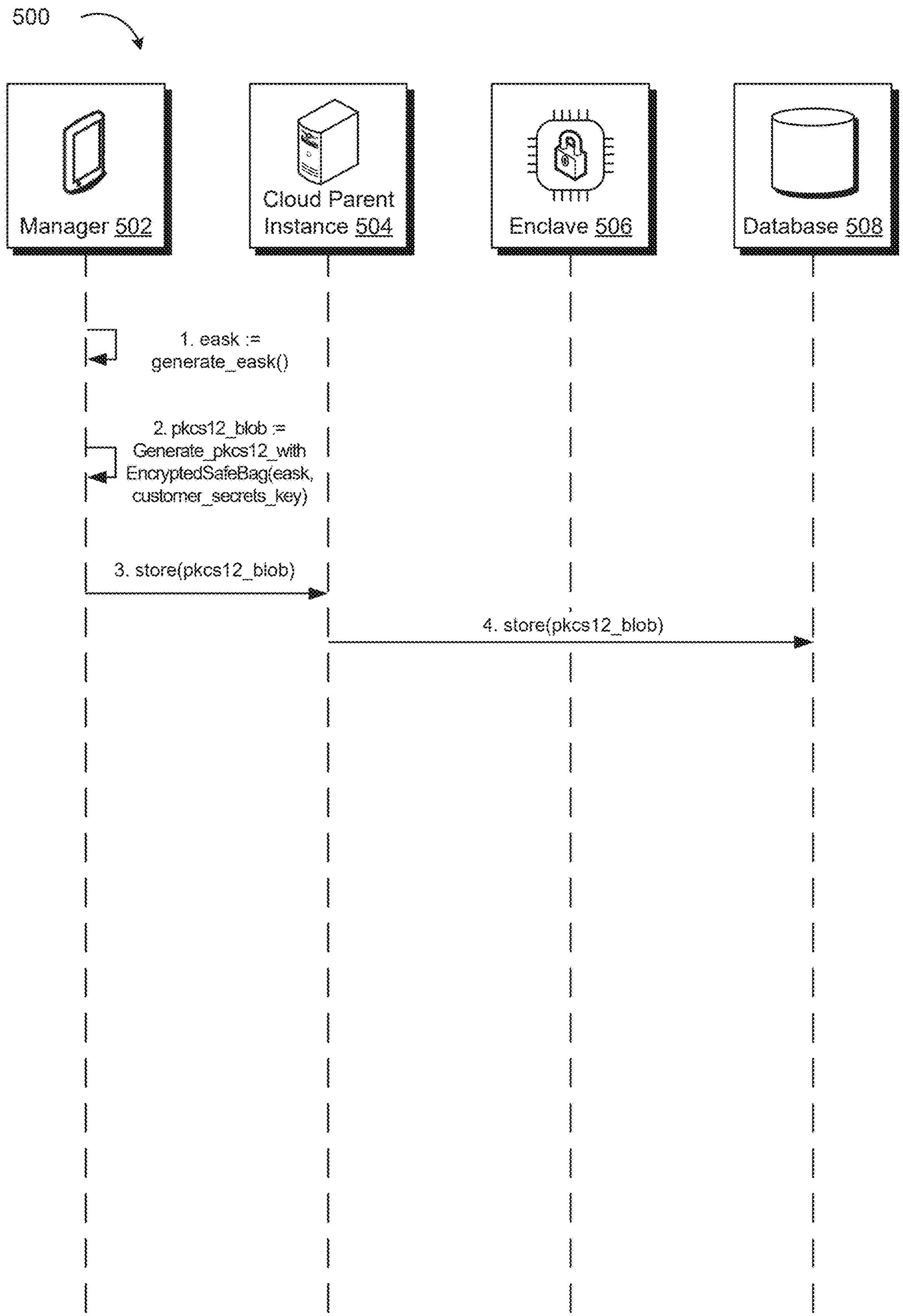
FIG. 5 illustrates a diagram 500 depicting a secret backup protocol, in accordance with one or more example embodiments of the present disclosure.

FIG. 5 illustrates a diagram 500 depicting a secret backup protocol, in accordance with one or more example embodiments of the present disclosure.

According to at least one embodiment of the present disclosure, a secret backup protocol in accordance with diagram 500 involves the following entities: manager 502; cloud parent instance 504; enclave 506; and database 508. FIG. 4 depicts an illustrative, non-limiting, example of a computing environment, and various other embodiments comprising greater or fewer components relative to those depicts in FIG. 5 are also contemplated within the scope of this disclosure. In various embodiments, some or all of the components depicted in FIG. 5 may be utilized in connection with embodiments discussed elsewhere in this disclosure. For example, the client, the cloud parent instance, enclave, and/or database discussed in connection with the PAKE protocol registration of FIG. 5 may be utilized in connection with FIG. 4.

In various embodiments, an enrollment authority CA signing key (EA-SK) secret backup protocol may be performed in connection with FIG. 5. In various embodiments, an EA-SK is generated by manager 502. In various embodiments, manager 502 refers to a client computing entity that is owned by and/or under the control of a customer. In various embodiments, a PKCS #12 blob is generated with an encrypted safe bag using the EA-SK and customer secret key as inputs. Manager 502 may then transmit the PKCS #12 blob to cloud parent instance 504, which in turn persists the PKCS #12 blob in database 508.

Figure 6:
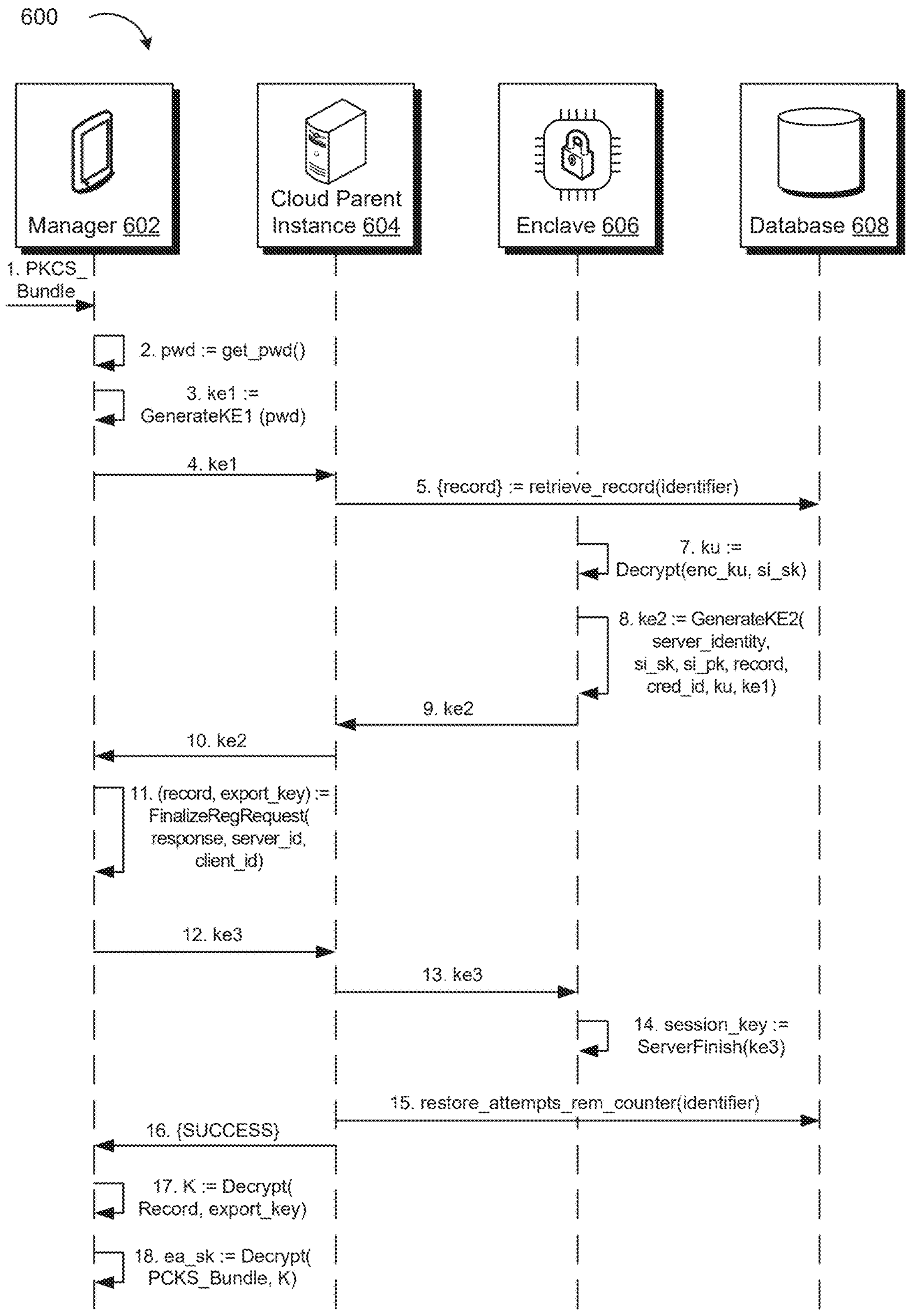
FIG. 6 illustrates a diagram 600 depicting a key recovery protocol, in accordance with one or more example embodiments of the present disclosure.

FIG. 6 illustrates a diagram 600 depicting a key recovery protocol, in accordance with one or more example embodiments of the present disclosure.

According to at least one embodiment of the present disclosure, a key recovery protocol in accordance with diagram 600 involves the following entities: manager 602; cloud parent instance 604; enclave 606; and database 608. FIG. 6 depicts an illustrative, non-limiting, example of a computing environment, and various other embodiments comprising greater or fewer components relative to those depicts in FIG. 6 are also contemplated within the scope of this disclosure. In various embodiments, some or all of the components depicted in FIG. 6 may be utilized in connection with embodiments discussed elsewhere in this disclosure. For example, the client, the cloud parent instance, enclave, and/or database discussed in connection with the PAKE registration protocol of FIG. 4 may be utilized in connection with FIG. 6.

An illustrative, non-limiting example of an implementation of a key recovery protocol is depicted in FIG. 6, and in accordance with one or more embodiments of the present disclosure. In various embodiments, a key recovery protocol may comprise the following steps: (i) user enters a purported passphrase—a verification process will be performed to determine whether the purported passphrase matches the passphrase that was used as part of the corresponding registration; (ii) the client and enclave will engage in the key exchange phase of the OPAQUE protocol, to this end, the client uses the purported passphrase as an input and the enclave contributes the values of OPRF key ku and env as established during the registration/initialization phase; (iii) if the purported passphrase entered by the client is equal to the passphrase from the registration, the OPAQUE protocol guarantees that (1) the client recovers the former export key and (2) both client and enclave derive the same value session key—however, if the first purported passphrase and second actual passphrase from the registration phase do not match, the client will be forced to abort instead, the and enclave will decrement the counter that tracks the number of attempts remaining (or increments a counter for the number of consecutive failed attempts). If the run of the OPAQUE protocol is successful, namely, the server validates the message ke3 received from the client, the enclave will learn that the purported passphrase was indeed correct and resets the counter tracking the number of attempts remaining, number of failed attempts, etc, and sends the stored ciphertext c to the client. Finally, the client can use the derived export key to decrypt the ciphertext c and recover the backup key K; (iv) the export key is used by the client to decrypt the envelope to get the customer secrets encryption key. The customer secrets encryption key can then be used to decrypt the enrollment authority CA signing key EA-SK from the PKCS #12 bundle.

In various embodiments, manager 602 receives, retrieves, requests, or otherwise obtains a PKCS #12 bundle. In various embodiments, manager 602 refers to a client computing entity that is owned by and/or under the control of a customer. In various embodiments, the PKCS #12 bundle is generated from an EA-SK and a customer secrets key. In various embodiments, the PKCS #12 blob or bundle is retrieved from database 608. Manager 602 obtains a passphrase, for example, by having a user enter a password into a physical or touchscreen keyboard. A verification process (e.g., according to an OPAQUE-based protocol) may be performed to determine whether the passphrase provided by the user matches the passphrase that was used during a prior registration process. In various embodiments, a key exchange function—referenced as GenerateKE1( ) in FIG. 6—may be used by manager 602 to determine a first key exchange data ke1 based at least in part on the purported passphrase. In an illustrative, non-limiting example implementation, a client (e.g., manager 602) initiates an OPAQUE-based registration process and performs an input preparation that comprises a customer selecting a passphrase and choosing a blinding factor. In various embodiments, the blinding factor is a scalar and suitable for use with an OPAQUE-based blinding function. A blinding function may be used, in conjunction with the blinding factor and the customer-defined passphrase to produce a blinded passphrase. The blinding function may convert an input (e.g., passphrase) into an element of an OPRF group, which is randomized by the blinding factor. The client (e.g., manager 602) may further generate or otherwise determine an ephemeral key pair. The first key exchange data ke1, in at least one embodiment, comprises or is otherwise determined based on: the blinded passphrase, the client's ephemeral public key, and optional metadata (e.g., protocol versions, cryptographic algorithm identifiers, nonces, or other cryptographic material that may be used to facilitate an OPAQUE-based setup). In various embodiments, this data ke1 is transmitted by manager 602 to cloud parent instance 604. In various embodiments, cloud parent instance 604 retrieves a record from database 608. In various embodiments, the record is retrieved based at least in part on credential identifier. In various embodiments, the record is formatted in accordance with an OPAQUE-based protocol. For instance, a record may comprise a client public key and an envelope structure that embeds credentials that can include cryptographic key material of the client (e.g., manager 602) and/or server (e.g., enclave 606). In various embodiments, an OPAQUE-based protocol will use P256-SHA256 as the OPRF cipher suite. In various embodiments, an OPAQUE-based protocol will use HKDF, HMAC (hash-based message authentication code), and SHA-512 as the KDF (key derivation function), MAC, and hash functions, respectively. In various embodiments, an OPAQUE-based protocol will use Scrypt as the KSF. In various embodiments, an OPAQUE-based protocol will use ristretto255 as the group mode. In various embodiments, an OPAQUE-based protocol will use TripleDH as the key exchange.

In various embodiments, ke1, record, and enc_ku (encrypted OPRF key) are provided to enclave 606. The recipient (e.g., enclave 606) may perform a verification process on ke1 to validate the format of the blinded passphrase and the client's ephemeral public key (e.g., ensuring that it is on the expected curve if elliptic curve cryptography is being used). In various embodiments, enclave 606 is provisioned with private key si_sk. In various embodiments, si_sk is used to decrypt enc_ku to obtain the plaintext OPRF key ku. In various embodiments, a key exchange function—referenced as GenerateKE2( ) in FIG. 6—may be used by enclave to determine second key exchange value ke2 data based at least in part on the server identity, si_sk, si_pk, record, cred_id, ku, and ke1. In an illustrative, non-limiting example implementation, a recipient (e.g., enclave 606) computes or otherwise determines, using an OPAQUE evaluation function, an OPRF result for the blinded passphrase and based at least in part on the OPRF key. The recipient (e.g., enclave 606) may continue with generating or otherwise determining its own ephemeral key pair. A shared secret may be determined using the enclave's own ephemeral public key along with the client's ephemeral public key (e.g., provided in connection with ke1). The server may derive, using the shared secret, a session key and an authentication key. A second key exchange value k2 may be determined as comprising or based on: the OPRF result, the enclave ephemeral public key, a message authentication code (MAC) or other authentication data computed over the transcript to authenticate the server and using the authentication key. Upon determination of the second key exchange data ke2, the value may be emitted from the enclave 606 to cloud parent instance 604 and then to manager 602.

Upon receiving the second key exchange data ke2, manager 602 may perform one or more verifications that the received second key exchange data ke2 matches an expected second key exchange data that is locally computed. For instance, the client (e.g., manager 602) may receive an OPRF result and perform an unblinding function to recover an OPRF output. The server ephemeral public key (e.g., included in ke2) may be used by the client (e.g., manager 602) in connection with the client's ephemeral public key to produce the same session key and authentication key that the server used. Authentication data (e.g., a MAC) included in the ke2 payload may be validated to ensure that the computed MAC matches the received MAC. If the two match, then manager 602 may generate a message comprising third key exchange data ke3 and transmit ke3 to cloud parent instance 604, and ke3 is routed to enclave 606. In at least one embodiment, the client generates a MAC to authenticate itself to the server (e.g., enclave 606) using the authentication key that was securely shared between the two. The server may similarly generate a MAC over a transcript to authenticate itself, transmit ke3 comprising said MAC to the server, and the server is able to use its authentication key to compute its own MAC and verify that the computed MAC and received MAC are matching. In various embodiments, enclave 606 will derive session key based at least in part on ke3 and perform a verification that will succeed if the purported passphrase matches the actual passphrase. If they match, then enclave 606 will be able to successfully derive the session key, but if they do not match, then enclave 606 will fail the session key derivation. If session key derivation succeeds, then a success indicator will be provided to manager 602. Manager 602 may be provided with a ciphertext c and manager 602 can use the derived export key to decrypt the ciphertext c and recover the backup key K. The export key may be used to decrypt the envelope to get the customer secrets key, which can in turn be used to decrypt the EA-SK from the PKCS #12 bundle. In some embodiments, cloud parent instance 604 will update a counter that is used to track password attempts and/or failures, for example, to reset a password attempts counter in database 608 that is associated with an identifier of enclave 606.

However, if a determination is made that the session key derivation failed, then cloud parent instance 604 may send an indication of failure to manager 602. In some embodiments, cloud parent instance 604 will update a counter that is used to track password attempts and/or failures, for example, to decrement a number of password attempts available or increment a number of failed password attempts, for example, stored in database 608. In various embodiments, restrictive actions may be taken when the number of failed attempts exceeds a threshold. For example, the account may be locked, throttled, or otherwise restricted from further recovery attempts (e.g., to prevent brute force style attacks), further authentication may be required to make additional recovery attempts, and so on and so forth.

Figure 7:
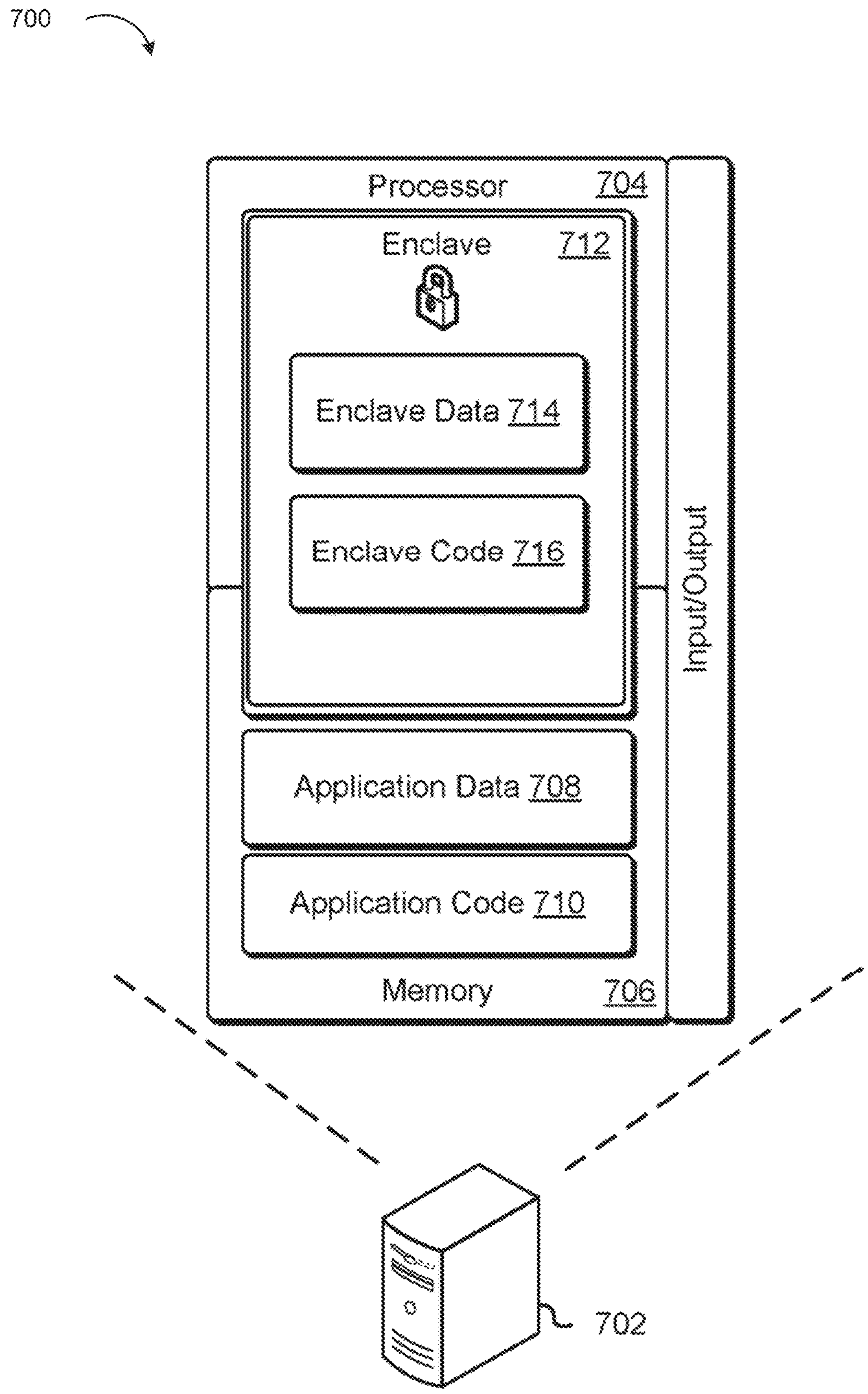
FIG. 7 illustrates a computing environment 700 depicting one way in which a protected execution environment can be provided for confidential computing, in accordance with one or more example embodiments of the present disclosure.

FIG. 7 illustrates a computing environment 700 depicting one way in which a protected execution environment can be provided for confidential computing, in accordance with one or more example embodiments of the present disclosure.

As illustrated in FIG. 7, the environment 700 may include a computer system 702 comprising one or more processors 704, memory 706, application data 708 and application code 710, and an enclave 712 supporting enclave data 714 and enclave code 716. The processor 704 may support enclave functionality, such as support for Intel® Software Guard eXtensions (SGX), a module such as a trusted platform module (TPM), system microcode or combinations of these and/or other supported capabilities, for instantiating an enclave 712. The enclave 712 may be implemented in the context of a computer system with an input/output module that can be used to communicate with entities external to the computer system via a virtual or physical network.

In at least some embodiment, a protected execution environment can be executed within the context of a security module such as a hardware security module (HSM). An HSM may refer to a physical computing device that safeguards cryptographic keys by storing them within a tamper-resistant physical device. HSMs provide cryptographic key generation and storage, and perform cryptographic operations for authorized clients of the HSM. In some embodiments, a HSM includes a processor to execute code wholly within the context of the HSM to implement a protected execution environment. In at least some embodiments, cryptographic keys that are stored in a HSM are not exposed in a plaintext format outside of the HSM.

An enclave 712—also referred to as a secure enclave or encrypted enclave—is a protected area in memory address space of a computer system that provides confidentiality and integrity for applications and data within the protected area, in accordance with at least one embodiment. An enclave 712 can be used to operate as a protected execution environment—that is, the enclave prevents applications external to the enclave, even privileged applications such as virtualization monitors, basic input/output systems, operating systems, external processes running at high privilege levels, and even other enclaves, from accessing the enclave memory address space, but applications executing within the enclave may access executable instructions and data internal to the enclave. An enclave may provide cryptographically verifiable assurance of confidentiality for data and/or executable code used in the context of the enclave's protected execution environment. An enclave 712 may prevent access to unencrypted enclave data (i.e., data resident within the enclave) by applications external to the enclave, and when the data is written to the memory address space, the data is automatically encrypted.

In various embodiments, a computer program executes application code 710 or a portion thereof outside the context of an enclave 712. A process, as part of executing the application code 710, may access application data 708 stored in various types of volatile memory such as registers, caches, and main memory (e.g., DRAM). The application code 710 may, at a point in execution, include an entry point to the enclave 712—for example, to perform an operation using private data that is not to be exposed outside the context of the enclave 712, even to privileged system code such as a hypervisor or operating system. The entry point may be a function call that transitions execution of a computer program from the application code 710 to enclave code 716 in a protected execution environment. When execution is transitioned to the protected execution environment, the enclave 712 has access to enclave data 714, enclave code 716, etc. Enclave code 716 may be executed and the processor executing the code may have access to the enclave data 714 as well as application data 708 in a non-secure region of memory. Upon completion of at least a portion of enclave code, data (e.g., result(s) of execution of the enclave code) may be passed back to the application code 710 which may resume execution in the non-secured region. Information exiting the enclave 712 may be cleansed of data referring to the enclave's protected memory addresses to prevent external software from determining the location of enclave-protected data in memory. The enclave 712 may be used to perform various cryptographic operations.

In at least some embodiments, entry points to the enclave 712 are pre-defined—for example, at compile time. An enclave entry point may be a trusted function that transitions execution of a computer program from a non-secured computing environment outside the context of an enclave 712 to a protected execution environment within the enclave 712. As an example, Intel® SGX supports enclave calls (ECALLs) as a type of pre-defined function which can be used to pass data and/or parameters to the enclave. Enclave data 714 and/or enclave code 716 may be stored in a specific region of trusted memory that is encrypted. In some embodiments, enclave data and enclave code is stored in an enclave page cache (EPC), encrypted under a cryptographic key generated by a physical processor on boot. Memory pages stored in the EPC may be decrypted only within a physical processor core.

In various embodiments, within the protected execution environment, an outcall (OCALL) can be invoked to transfer data from within the protected execution environment to untrusted applications or the external environment generally. In various embodiments, a set of predetermined OCALL can be used to emit certain data from the protected execution environment. Generally speaking, data that is emitted by OCALL is not sensitive. For example, OCALLs are typically not used to export cryptographic secrets in plaintext. However, generally public information can sometimes be emitted, such as public keys. However, in some cases, even emitting public keys from OCALLs is prohibited, such as when an identity associated with the public key should be kept confidential. In various embodiments, data elements are encrypted prior to being exported from an enclave. For example, sensitive data elements can be encrypted using a cryptographic key resident to the enclave, thereby producing encrypted sensitive data elements, the encrypted sensitive data elements may then be exported via an OCALL in a manner that preserves the confidentiality of the underlying sensitive data elements.

Enclave functionality may be provided to a system through software, such as under the control of a hypervisor or a kernel of an operating system that allows virtualized user space instances, or through hardware by a specialized instruction set, such as Intel® Software Guard eXtensions (SGX), a module such as a trusted platform module (TPM), system microcode or combinations of these. Enclave functionality allows programmatic instantiation of an enclave, which may comprise initializing of an enclave control structure, allocating enclave memory, loading of enclave contents (e.g., applications and/or data loaded into the enclave) into the enclave memory, measuring of the enclave contents, and establishing an enclave identity. Enclave functionality may also include the ability to protect applications and/or data within the enclave from malicious software attacks, by detecting integrity violations of protected applications and/or data and preventing access to protected applications and/or data that fail integrity checks. It should be noted that an "application" as described herein may refer, based on the context of the description, to a computer program that both a non-secured portion running outside the context of an enclave, a secured portion that runs within the context of an enclave, or a combination of the two.

A characteristic of an enclave is an ability to provide remote attestation as to the state of the enclave. For example, the enclave may have a set of functions that, when executed by a processor, provide a measurement indicating the current state of executable code and/or data within the enclave. Another characteristic of an enclave is that it has a root of trust separate and protected from outside entities. That is, the enclave may have cryptographic keys resident within the enclave for digitally signing data output from the enclave, and, by verifying the digital signature, applications external to the enclave may be configured to trust the output data. Cryptographic keys resident within the enclave may be inaccessible to applications and systems external to the enclave.

Enclave code may include, for example, computer-readable executable instructions that, as a result of execution by one or more processors, performs at least a portion of a process, such as any processes in accordance with those described in connection with FIGS. 1-6 and 8-13. The processor 704 may include any suitable processing device capable of supporting enclaves, including processing devices based on Intel® Software Guard eXtensions. The memory 706 may include a number of types of memory, such as described below in connection with FIG. 28.

Application data 708 may include data structures, memory structures, and various other types of data that may be utilized in the course of the execution of application code 710. Application code may include, for example, computer-readable executable instructions that, as a result of execution by one or more processors, performs at least a portion of a process, such as any processes in accordance with those described in connection with FIGS. 1-6 and 8-20. For example, application code may be configured to execute portions of processes described in connection with FIGS. 1-6 and 8-13 that are outside of the enclave. In general, an application may have instructions in the form of application code and data that is utilized in the execution of the instructions in the form of application data. In some cases, an enclave 712 stores enclave data and/or enclave code within a protected execution environment so that the enclave data is not available to processes outside of the protected execution environment. As noted, the enclave 712 may be a protected execution environment provided by supporting hardware or software on the computer system such as by a specialized instruction set, such as Intel® Software Guard eXtensions (SGX), a module such as a trusted platform module (TPM), system microcode, a hypervisor configured to manage a virtualization of protected execution environments or combinations of these and/or other supported capabilities. In this manner, a protected execution environment (e.g., an enclave) may be configured such that enclave data within the protected execution environment is protected from entities outside the protected execution environment.

Application code 710 may include computer executable instructions that may be executed on a computer system, including an operating system, system and hardware drivers, business applications, entertainment applications, web browsers, e-mail clients, and anti-virus and other anti-malware applications. In some embodiments, enclave code runs one or more routines that may be instantiated within the enclave 712 on the computer system. As noted, the enclave 712 may be a protected execution environment provided by supporting hardware or software on the computer system such as by a specialized instruction set, such as Intel® Software Guard eXtensions (SGX), a module such as a trusted platform module (TPM), system microcode, a hypervisor configured to manage a virtualization of protected execution environments or combinations of these and/or other supported capabilities. One characteristic of a protected execution environment is the ability to provide remote attestation as to the state of the protected execution environment. For example, the protected execution environment may have a set of functions that, when executed by a processor, may provide a measurement indicating the current state of executable code and/or data within the enclave. Another characteristic of a protected execution environment is that it has a root of trust separate and protected from outside entities. That is an entity (e.g., an application running on a device operated by a user), may be configured to trust the protected execution environment because the protected execution environment may have cryptographic keys, such as a private key of a public-private key pair, not visible to outside entities, and outside entities can verify (e.g., trust) information coming from the protected execution environment because the information may be verified as digitally signed with the private key of the enclave. In this manner, a protected execution environment (e.g., an enclave) may be configured such that enclave code within the protected execution environment is protected from entities outside the protected execution environment.

The enclave 712 may be provided by selecting computer systems being configured to support the instantiation of enclaves and causing the enclave 712 to be instantiated. The computer systems may support the instantiation of enclaves based on the hardware capabilities of the system. For example, enclave functionality may be provided to a system by a specialized instruction set, such as Intel® Software Guard eXtensions, a module such as a trusted platform module, system microcode or combinations of these and/or other supported capabilities. As an example, the enclave 712 may be provided by selecting a computer system, such as from a web-based management console, from computer systems configured to support enclave functionality.

Enclave functionality may include functionality for creating, deprovisioning, measuring (e.g., gathering metrics from), and populating enclaves. Enclave functionality may further include generating keys and/or sending and receiving data. Access to such enclave functionality may be provided by a code library, an interface, web service, application programming interface (API), or other access methodology. In response to receiving a request through one of the methods of accessing enclave functionality, a computing resource service provider may provide that access to a user of a computer system. Note that the providers of enclave functionality, the types of enclave functionality, and the methods of providing access to enclave functionality described are for illustrative purposes and, as such, other providers of enclave functionality, types of enclave functionality and methods of providing access to enclave functionality as would be contemplated by a person having ordinary skill in the art may be considered as within the scope of the present disclosure.

In some embodiments, upon instantiation or upon request, instructions executed within the enclave 712 by a processor may generate a set of cryptographic keys for encrypting, decrypting, and performing integrity validation of data passing between the enclave 712 and another entity. In some cases, the set of cryptographic keys may be a key-pair based on an asymmetrical public-private cryptographic scheme, and instructions executed within the enclave 712 by a processor may provide the public key of the key-pair to a trusted entity and retain the private key of the key-pair securely within the enclave 712 where it may not be accessible to outside entities. Subsequently, the trusted entity may encrypt data and/or instructions using the public key and provide the encrypted data and/or instructions to the enclave 712, whereupon instructions executed within the enclave 712 by a processor may decrypt the data and/or instructions using the private key held within the enclave 712. Alternately or additionally, instructions executed within the enclave 712 by a processor may digitally sign results of processing or execution using the private key within the enclave 712 to provide assurance to the trusted entity that the output has not been tampered with or forged.

In other embodiments usable in combination with other embodiments, the trusted entity may generate a set of cryptographic keys for encrypting, decrypting, and performing integrity validation of data passing between the enclave 712 and another entity. In some cases, the set of cryptographic keys may be a key-pair based on an asymmetrical public-private cryptographic scheme, and the trusted entity may provide the public key of the key-pair to the enclave 712 and retain the private key of the key pair. Subsequently, instructions executed within the enclave 712 by a processor may encrypt data and/or results of processing or execution using the public key before providing the data and/or results to the trusted entity, whereupon the trusted entity may decrypt the encrypted data and/or results using its private key. Alternately or additionally, the trusted entity may digitally sign data and/or instructions provided to the enclave 712 using the private key of the trusted entity to provide assurance to the enclave 712 that the data and/or instructions have not been tampered with or forged. Alternately or additionally, in a technique referred to as enveloping, instructions executed within the enclave 712 by a processor may provide the trusted entity with a session key encrypted using the public key of the trusted entity. Subsequently, instructions executed within the enclave 712 by a processor may provide encrypted data and/or results of processing of execution, whereupon the trusted entity may decrypt the encrypted data and/or results using the session key.

A computer system for hosting enclaves may be a distributed system with multiple hosts, may be a single system with virtual machine instances or may be a networked combination of such systems. A computer system may provide access to such as users, customers, modules, applications, services, processes, programs, operating systems, and controlling domains. Some of the access provided by the computer system to these entities may include providing access to confidential data and/or privileged applications. A computer system may also provide data storage regions to the customer, including memory, disk storage, virtual memory and virtual disk storage. Consequentially, some of the data storage regions provided by the computer system may be configured to store confidential and/or otherwise significant data.

A computer system for hosting enclaves may also run entities (e.g., applications, processes, services, modules, etc.) configured to access and/or manipulate such confidential data. A computer system may also run applications from a computing resource service provider that may utilize privileged code or perform operations on confidential data. Additionally, a computer system may include operating systems, privileged users, and controlling domains having full access to the computer system resources, such as direct access to the computer memory 706, processors, data storage, and the network. A customer may wish to secure confidential data, and any applications configured to access such confidential data, by preventing access to the data and/or applications by entities without proper credentials, even those entities that are typically trusted entities such as operating systems, privileged users, and controlling domains. Similarly, a computing resource service provider may be configured to secure such confidential data and any applications configured to access the confidential data by preventing access to the confidential data and applications by any entity without proper credentials.

An entity, such as a service or operating system running on the computer system, the controlling domain, a guest domain running a virtual machine instance, or a service or operating system of the controlling domain or a guest domain, may provide an interface to enclave functionality. An entity (e.g., a user operating a device running applications) with access to a virtual machine instance on the computer system may use that interface to the enclave functionality to, for example, create an enclave, populate the enclave, and/or obtain keys.

In an illustrative example, a computer system may provide enclave functionality, as noted, via the SGX instruction set that may be enabled on the CPU of the computer system, although the scope of the present disclosure extends to other enclaves. The physical hardware of the computer system may be any device or equipment configured to execute instructions for performing data computation, manipulation or storage tasks, such as a computer or server. The computer system may be equipped with processors 704, including a CPU, a graphics processing unit (GPU), and a digital signal processor (DSP). The computer system may further include memory 706, including static and dynamic volatile memory, and non-volatile persistent storage such as optical and magnetic storage disks, tape, and flash memory. The computer system may also include additional hardware such as buses, input/output modules, and networking equipment compliant with any handshaking, communications or data transfer protocol.

As noted, a host computer system may provide enclave functionality through instructions made to the processors 704 configured to support a protected execution environment, such as SGX, TPM or a hypervisor configured to support management of protected execution environments. The enclave functionality may be provided to various other services running on the host computer system. For example, a virtual computer system service of a computing resource service provider running on the host computer system may provide enclave functionality to a virtual machine instance running under the control of the virtual computer system service. Similarly, other services, such as block-level data storage services, cryptography services, on-demand data storage services, archival storage services, notification services, authentication services, policy management services, billing services and task services, may also access the enclave functionality to provide that functionality to resources associated with those services. Enclave functionality may also be provided to customers of the computing resource service provider. For example, an entity with access to a service and/or access to the resources served by that service may use enclave functionality to further secure data and/or applications associated with that service. In an illustrative example, a virtual computer system service and/or a virtual machine instance associated with that virtual computer system service may use the enclave functionality to create an enclave, populate the enclave with data and/or applications, obtain keys for decrypting results from the enclave, start the applications within the enclave and receive updates.

The measurements may indicate a current state of the enclave 712 and/or contents within the enclave 712. The measurements may be evaluated within the enclave 712 or may be sent outside the enclave 712. Enclaves may be configured such that measurements are performed entirely within a secure portion of the processors 704 and may also be configured so that the measurements are signed by secret materials provided by the processors 704, such as, for example, microcode running on the processors 704 or a private key. In this way, measurements may be verified as correct by trusted users using the functionality provided with the enclave. Measurements may be verified by, for example, an application programming interface, which may provide information usable to determine the state of the processors 704.

The measurements may be based on measurements obtained from host computer system hardware, such as, for example, measurements obtained by utilizing SGX instructions supported by the processors 704 of the host computer system. In order to obtain the measurement, the enclave 712 may first need to be paused or frozen by halting the execution of applications running within the enclave 712 and/or by placing the applications in a certain determined state. By pausing and/or freezing the applications and/or placing the applications in a determined state, external verification that the enclave 712 and its contents have not been tampered with may be made by comparing the measurements with predicted values. Measurements may include, in some embodiments, verification and/or validation that the measurements were performed by a trusted, verified and/or validated source. For example, measurements performed by the processors 704 executing the appropriate SGX instructions may be digitally signed by the processors 704 and thereby verified as coming from the particular processors 704. Likewise, measurements coming from a TPM may include a similar verifiable signature with the measurements as an assurance that the measurements were performed by the TPM and/or a process running thereon.

Application code and/or data installed in the enclave 712 may include applications to provide access to and/or process other types of confidential data. For example, a payment processing application running as a web service on a host computer of a computing resource service provider may be executed in the enclave 712 by first measuring the application, encrypting the application, injecting the application into the enclave 712, and finally decrypting and running the application within the enclave 712. Note that the methods of providing access to enclave functionality described are for illustrative purposes and, as such, other methods of providing access to enclave functionality as would be contemplated by a person having ordinary skill in the art may be considered as within the scope of the present disclosure.

In some embodiments, the enclave functionality may be provided as an application, process or module, and may, in some cases, be implemented as a single instance on a computer system providing enclave functionality for virtual machine instances. The application, process or module so configured may also operate on a remote machine and/or may provide enclave functionality in a distributed and/or hierarchical manner. Said application, process or module may further be configured to start automatically when a machine and/or virtual machine is started, or, alternately, may be started as needed (e.g., when a client entity requests access to the enclave functionality).

In at least one embodiment, enclave 712 is used to control the data flowing into or out of a computer system and/or perform authorization logic for a customer of a computing resource service provider without confidential data, such as unencrypted passwords or decryption keys, being made available to the computing resource service provider. Entities outside of the enclave 712, including the operating system, other applications and/or users, may not access the data stored in the enclave 712. In some embodiments, data and application code may be provided to the enclave 712 in encrypted form. In some embodiments, data and/or results of the processing of applications may be output from the enclave 712 in encrypted form. The enclave 712 may receive stored data, for example, from a computer system, process the data according to a particular request from an entity, such as a user, customer, service or application, utilizing executable instructions running within the enclave 712. The stored data may be received in encrypted form, and the processing may include decrypting the stored data using a decryption key held within the enclave 712. Instructions executed within the enclave 712 by a processor may determine whether to provide the data or a subset of the data to the requestor and, based on the determination, may or may not transform the data into another form before providing the data to the requestor. The transformation of the data may entail encrypting the data with the same key as it may have been encrypted with before the enclave 712 received it, encrypting or re-encrypting with a different key, and/or some other transformation of the data, such as censored (e.g., redacted) portions of the data.

In at least one embodiment, a customer provides an enclave 712 with data to be stored in a data store, such as a data store on the data server of the data storage service. In some of these embodiments, the customer may request that the enclave 712 encrypt the data before storing the data. In some of these embodiments usable in combination with other embodiments, instructions executed within the enclave 712 by a processor may encrypt the data by default before storing the data. In a variation of such an embodiment, the customer may ensure that the data is encrypted by the enclave 712 by specifying, for example through an application programming interface call, that the data should pass through an enclave 712 configured for encrypting the data in this manner before being stored to the data store. In another variation of said embodiments, instructions executed within the enclave 712 by a processor may encrypt data by default unless the customer specifies that the data not be encrypted before storing in the data store.

Figure 8:
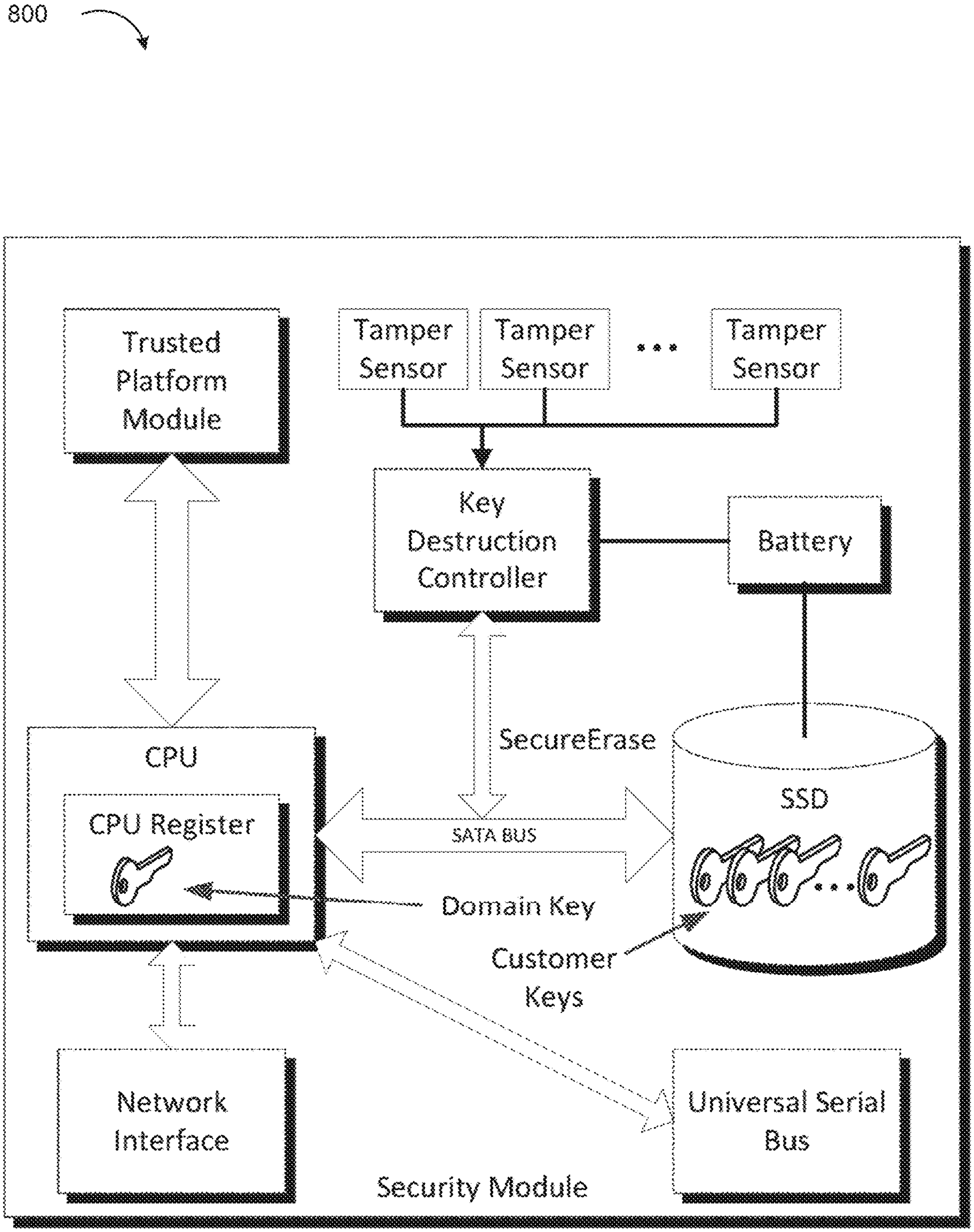
FIG. 8 illustrates a computing environment 800 depicting one way in which customer keys may be rendered inaccessible, in accordance with one or more example embodiments of the present disclosure.

In an embodiment, the security module is configured such that activation of one or more of the tamper sensors causes customer keys to become inaccessible. Causing customer keys to become inaccessible may be performed in various ways in accordance with the various embodiments. For example, FIG. 8 depicts a non-limiting, illustrative example of a computing environment 800 in which customer keys may be rendered inaccessible. In particular, as illustrated in FIG. 8, the tamper sensors are communicatively connected with a key destruction controller which may be hardware (e.g., circuitry including a processor) configured to issue an erase command to the SSD to erase customer keys when appropriate. In an embodiment, the key destruction controller's processor(s) is/are separate from the CPU, e.g. as part of a data storage subsystem, such that, even if the CPU is inoperable, the key destruction controller is able to operate as described below. For example, in an embodiment, the key destruction controller is electrically connected to the SATA bus such that, when a need to erase customer keys is detected by the key destruction controller, the key destruction controller issues a SecureErase command over the SATA bus to the SSD, thereby causing the SSD to securely erase the customer key stored thereon. In other embodiments, such as where different types of storage devices are used, a different type of command causing lost access to customer keys may be used. In the embodiment illustrated in the figure, the key destruction controller may be electrically connected to the SATA bus in any suitable manner. For example, the key destruction controller may be connected with the SATA bus such that any commands issued simultaneously with the erase command do not conflict, potentially causing the erase command to be unfulfilled by the SSD. For example, the key destruction controller may be configured to break one or more circuits between the SSD and the CPU to disable the CPU's ability to transmit a conflicting command to the SSD. Other techniques for avoiding conflicting commands may also be used.

The key destruction controller may also perform other operations. For example, in an embodiment, the key destruction controller may generate a certificate that states that the SecureErase operation was completed correctly. The certificate may state metadata about the SecureErase operation, such as the time the operation was completed. The security module may, upon reboot or other events, perform a self-test routine to confirm that the SecureErase command was successfully completed. Failure of the self-test may cause the security module to perform one or more predefined operations, such as issuing a SecureErase command again.

Further, as illustrated in FIG. 8, the security module includes a battery, comprising one or more battery cells, to which at least the key destruction controller and SSD are connected. The battery may be rechargeable (e.g., comprising one or more lithium ion or other rechargeable cells) and may be charged during normal operation of the security module by charging circuitry of the security module (not shown). By use of a battery, if a main power supply to the security module is cut off, the battery provides enough power to the key destruction controller and the SSD to enable the key destruction controller to issue the SecureErase command and enable the SSD to fulfill the SecureErase command and securely render the customer keys inaccessible.

It should be noted that the particular configuration of components and the security module are provided for the purpose of illustration and that numerous other components may be used. For example, while FIG. 8 shows an SSD used in accordance with various embodiments, any data storage device may be used. In addition, in other embodiments, customer keys may be stored in volatile memory such that intrusion events and/or a loss of power may cause customer keys to be rendered inaccessible despite the loss of power (from the main power supply). In some embodiments, a volatile memory is separate from the CPU, although, in other embodiments, as noted above, some or all customer keys may be stored in the CPU register. Other variations are also considered as being within the scope of the present disclosure. For instance, in some embodiments, customers are able to specify the type of storage in which keys are to be stored. A customer may, for instance, request that one key be stored in persistent memory (e.g., in one or more SSDs) and another key be stored in volatile memory. Such requests may be part of a request to create a key and/or may be submitted after a key is created. In the latter case, the request may identify key(s) by its/their KeyID.

In an embodiment, a security module operates in a plurality of modes. The plurality of modes, in an embodiment, include a service mode and a use mode. In the service mode, the security module does not store customer keys and does not store a domain key. For example, the security module may be configured to destroy its access to the domain key and customer keys upon detection of entry into security mode (or, alternatively, upon detection of leaving use mode). Access may be destroyed in any suitable manner, such as through a SecureErase command issued to an SSD storing customer keys, removal of power to volatile memory (e.g., CPU register) storing the domain key and/or one or more customer keys, encrypting the domain key and/or one or more customer keys with another key and then losing access to the other key, overwriting (with random, pseudorandom, or other data) memory locations storing the domain key and/or one or more customer keys and/or destroying access in other ways. In security mode, however, an administrative interface is enabled to allow the security module to receive code updates and to perform other administrative functions. The administrative interface may include a secure shell (SSH) console login, a remotely accessible desktop and/or other functionalities. In an embodiment, the security module transitions between the two modes, although, in other embodiments, the security module may have more than two modes.

In use mode, in an embodiment, the security module is configured to store a domain key and one or more customer keys, to use the domain key and/or one or more customer keys such as described in more detail below. For example, when in use mode, a security module may receive requests to perform cryptographic operations using a customer key identified by a KeyID, perform the requested cryptographic operations, and provide results of the performed cryptographic operations in response to the requests. In use mode, however, some or all administrative interfacing abilities of the security module are disabled. For example, in use mode some or all functionalities available through an administrative interface may be blocked while in use mode, although, in some embodiments, a limited number of administrative capabilities may be allowed. For example, in some embodiments, functions using the simple network management protocol (SNMP) may be available in use mode and/or in other modes. As such, in various embodiments, when in use mode, a security module cannot receive code updates. Other capabilities may also be disabled when in use mode.

In an embodiment, some or all components of a security module are implemented using commodity hardware (e.g., a commodity processor, commodity storage device, commodity TPM; commodity motherboard; commodity sensors, commodity cooling fans and/or other commodity hardware components). Commodity hardware may be hardware configured to operate in accordance with a standard, which may be defined by the international Organization for Standardization or another organization and which may be an open standard. Example standards include industry standard architecture (ISA), peripheral component interconnect (PCI), PCI Express, Universal Serial Bus (USB), Serial ATA (SATA) and other standards. As such, a commodity hardware component of a security module that operates in accordance with a standard may be replaceable by another component, possibly of a different manufacture, that operates according to the same open standard. In other words, commodity hardware components may be replaced by other components without affecting the operation of the security module. Commodity hardware components may also lack specialization. For example, commodity hardware components may be obtained from a mass producer of the hardware components without need to specialize the hardware components. In some embodiments, a security module comprises solely commodity hardware. Thus, embodiments of the present disclosure provide numerous technical advantages as they allow the use of commodity hardware (which is obtainable at substantially lower costs than non-commodity hardware) while still ensuring data security.

Security modules in accordance with the present disclosure may be configured to maintain various security measures. For example, in various embodiments, security modules are configured such that customer secrets (e.g., customer keys) may exist in plaintext only in volatile memory. Customer secrets in non-volatile memory must be stored in encrypted form, the encryption performed using a key to which only security modules in the same cryptography domain have access. Further, in various embodiments, security modules are configured such that operators have access to a security module only when the security module itself lacks access to customer secrets in plaintext form. Thus, in such embodiments, a security module cannot be logged into by an operator, although a security module's software stack may provide mechanisms for extracting logs, but will not permit on-box debugging. Logging mechanism that could expose the contents of volatile memory (or generally that could expose customer secrets in plaintext form) are disabled while the security module has access to the customer secrets in plaintext form. In some embodiments, security modules provide verifiable shredding (destruction) of customer secrets by a quorum mechanism combined with master-key rotation (i.e., rotation of the domain key). Further, in various embodiments, security modules are configured to be unable to make API calls to one another. A cryptography service using such security modules may be configured to coordinate all information transfer among security modules of a cryptographic domain. In various embodiments, security modules are FIPS-compliant and/or have gone through FIPS validation, as discussed above. A security module may use a FIPS validated crypto library and minimize dependencies to ease the validation process.

Cryptographic material and other information stored in a security module may be said to be programmatically unexportable if there is no legitimate way to programmatically cause (e.g., through an interface of the security module) the security module to provide the information. Information, such as customer keys or other sensitive data, may be maintained such that there is no request mechanism (e.g., application programming interface (API) call) for causing hardware, with access to the information in plaintext form, to reveal the information in plaintext form. As an example, the security module may be configured to lack an ability to provide a copy of some or all of its memory such that the copy includes the information in plaintext form. It should be noted however, that while information for which there is no legitimate way of obtaining the information in plaintext form is used throughout the disclosure for the purpose of illustration, some information may be maintained such that the information is obtainable through a limited number of authorized uses, which may require various security protocols to be employed and able to prevent unauthorized access to the information in plaintext form. Generally, programmatically unexportable information is information (e.g., one or more cryptographic keys) for which extraordinary measures must be taken to obtain the information in plaintext form, if it is possible at all to obtain the information in plaintext form. As a result, absent extraordinary computational effort, a device lacking access to cryptographic material securely stored within a security module is unable to perform various cryptographic operations such as decrypting ciphertexts, generating digital signatures or authentication tags, etc.

Figure 9:
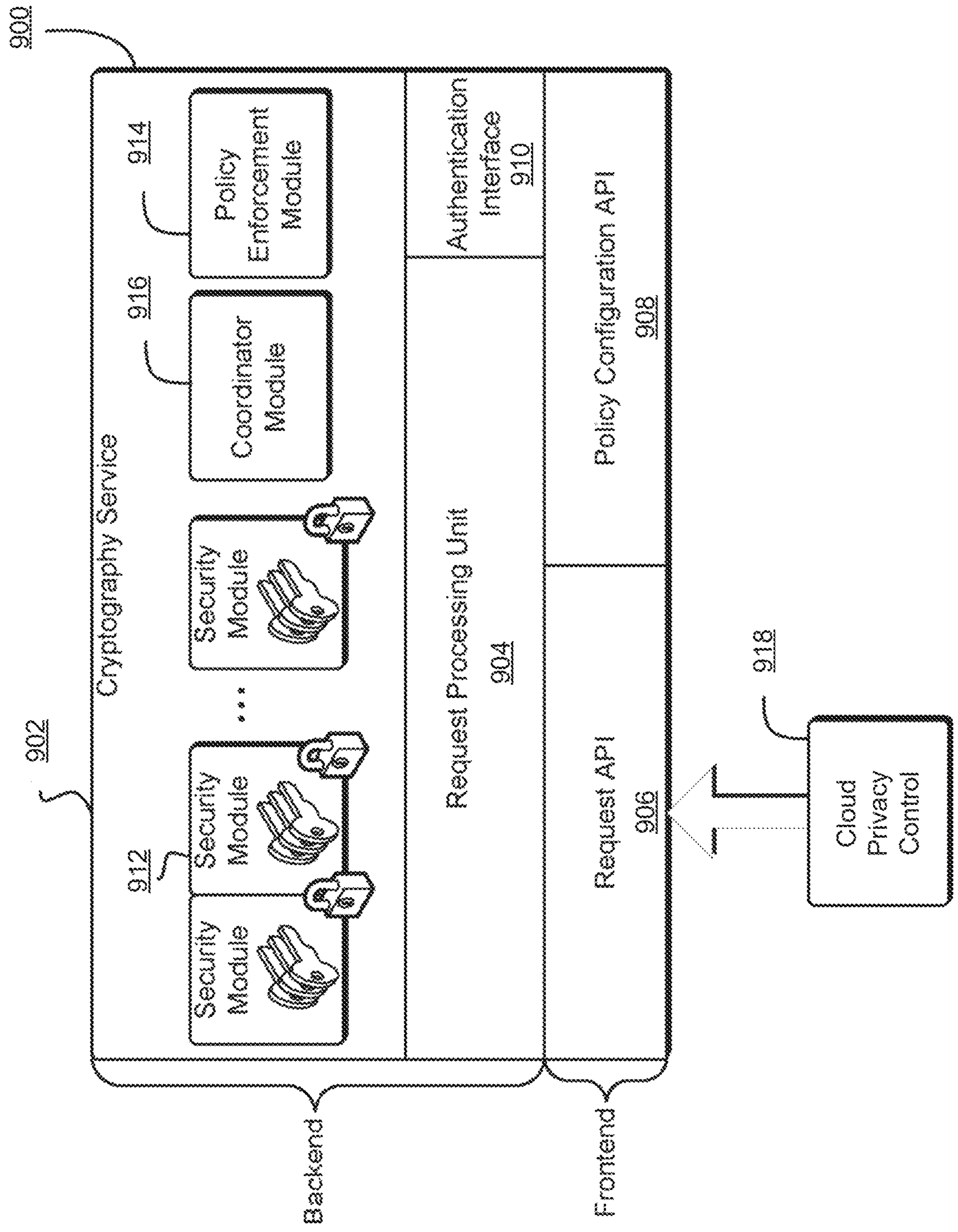
FIG. 9 illustrates a computing environment depicting a cryptography service 900, in accordance with one or more example embodiments of the present disclosure.

FIG. 9 accordingly shows an illustrative example of a cryptography service 900 in accordance with various embodiments. As illustrated in FIG. 9 and as discussed above, the cryptography service 900 is logically comprised of a frontend system and a backend system. Both the frontend system and the backend system may be implemented by one or more computer systems configured to perform operations described herein. For example, as illustrated in FIG. 9, the frontend system of the cryptography service 900 implements a request API and a policy configuration API. The request API, in an embodiment, is an API configured for requesting cryptographic and other operations to be performed by the cryptography service. Thus, requests may be made to the frontend system via the request API in order for such cryptographic operations to be performed by the cryptography service.

The request API may be configured with the following example, high-level, requests available, which may include different sets parameters (e.g., plaintext data integrity values and/or plaintext data integrity value types), some of which may be optional parameters, such as described above in connection with the description of the above figures:

CreateKey(KeyID)

Encrypt(KeyID, Data, [AAD])

Decrypt(KeyID, Ciphertext, [AAD])

ReEncrypt(Ciphertext, SourceKeyID, DestinationKeyID, [AAD])

Shred(KeyID)

ReKey(Ciphertext, OldKeyID, NewKeyID)

A CreateKey(KeyID) request, in an embodiment, causes the cryptography service to create a key identified by the KeyID identified in the request. Upon receipt of a request, the cryptography service may generate a key and associate the key with the KeyID. It should be known that KeyID's may be but are not necessarily unique identifiers. For instance, a KeyID may identify a family of keys. For example, in some embodiments, key rotation is performed. Key rotation may involve replacing keys with other keys to prevent collection of enough decrypted data to allow practical cracking of a cipher used. If performed in the direction of an entity different from the cryptography service, use of the CreateKey(KeyID) request may cause the cryptography service to create a new key to replace an old key identified by the KeyID. The old key may remain identified by the KeyID, but may, for instance, be only used for decryption (of data that has already been encrypted using the old key) and not for future encryption. As another example, in some embodiments, users of the cryptography service provide their own key identifiers and there is a possibility that two different customers may provide the same identifier. In such instances, the identifier may not uniquely identify a key or even uniquely identify a family of keys. Various measures may be in place to address this. For example, an identity or other information associated with a user of the cryptography service may be used to identify the proper key or family of keys. In still other embodiments the cryptographic service may assign a KeyID randomly, sequentially, or using any other method.

It should be noted that, when a KeyID does not uniquely identify a key, various systems may be in place to enable proper functionality. For example, in various embodiments, a family of keys identified by a KeyID is finite. If a decryption operation using a key identified by a KeyID is requested, additional data (e.g., a time stamp of when the encryption was performed) may enable determining the proper key to use. In some embodiments, ciphertexts may include information indicating a key version. In some embodiments, all possible keys are used to provide different decryptions of the data. Since there are a finite number of keys, the proper decryption may be selected from those provided. In some embodiments, decryption with a key is performed in a manner that enables the cryptographic service to detect that the ciphertext was not generated based at least in part on the key, such as by using authenticated encryption. Other variations are also considered as being within the scope of the present disclosure.

An Encrypt(KeyID, Data, [AAD]) request may be used to cause the cryptography service to encrypt the specified data using a key identified by the KeyID. Additional Authenticated Data (AAD) may be used for various purposes and may be data that is not necessarily encrypted, but that is authenticated, e.g., by an electronic signature, a message authentication code or, generally, a keyed hash value included with the AAD. In some embodiments, the ciphertext is generated including at least a portion of the AAD. In some other embodiments, the AAD is provided separately during decryption. In some other embodiments, the AAD is generated at decryption time based at least in part on the request and or other metadata such that decryption will only succeed when the metadata passes. In some embodiments, policy may constrain whether a cryptographic operation can be performed with respect to particular AAD. Processing of Encrypt(KeyID, Data, [AAD]) requests may require, by programming logic and/or policy enforced by the cryptography service, both that the AAD contain particular values and that the AAD be authentic (e.g., not modified since original transmission). Similarly, a Decrypt(KeyID, Ciphertext, [AAD]) request may be used to cause the cryptography service to decrypt the specified ciphertext using a key identified by the KeyID. The AAD in the Decrypt(KeyID, Ciphertext, [AAD]) request may be used such as described above. For instance, processing of the Decrypt(KeyID, Ciphertext, [AAD]) may require, by programming logic and/or policy enforced by the cryptography service, both that the AAD contain particular values and that the AAD be authentic (e.g., not modified since original transmission).

A ReEncrypt(Ciphertext, SourceKeyID, DestinationKeyID, [AAD]) request may be used to cause the cryptography service to decrypt a ciphertext and then re-encrypt it entirely within the cryptography service. In various embodiments, the cryptography service decrypts the specified ciphertext using a key identified by the SourceKeyID. In various embodiments, an AAD in the re-encrypt request may be used such as described above. For instance, processing of the ReEncrypt(Ciphertext, SourceKeyID, DestinationKeyID, [AAD]) request may require, by programming logic and/or policy enforced by the cryptography service, both that the AAD contain particular values and that the AAD be authentic (e.g., not modified since original transmission). Additional Authenticated Data (AAD) may be used for various purposes and may be data that is not necessarily encrypted, but that is authenticated, e.g., by an electronic signature, a message authentication code or, generally, a keyed hash value included with the AAD. In various embodiments, upon determination of the underlying plaintext, the cryptography service encrypts the plaintext using a key identified by the DestinationKeyID. In some embodiments, a particular destination encryption algorithm can be specified as a request parameter. In this way, a second ciphertext may be generated including at least a portion of the AAD. In some embodiments, policy may constrain whether a cryptographic operation can be performed with respect to particular AAD. As part of performing the re-encryption, the plaintext is never exported from the confines of the cryptography service, according to at least one embodiment of the present disclosure.

The Shred(KeyID), in an embodiment, may be used to cause the cryptography service to electronically shred a key or family of keys identified by the specified KeyID. Electronic shredding may include making the key no longer accessible. For example, use of the Shred(KeyID) request may cause the cryptography system to command one or more hardware devices to perform a SecureErase operation on one or more keys identified by the specified KeyID. Generally, the key(s) identified by the KeyID may be electronically shredded in any suitable manner, such as by overwriting data encoding the key with other data (e.g., a series of zeroes or ones or a random string). If the key(s) are stored encrypted under a key, the key used to encrypt the keys may be electronically shredded, thereby causing a loss of access to the key(s). In some embodiments, the shred operation may cause decrypt operations indicating the shredded KeyID to fail at some determined point in the future. Other manners of securely and permanently destroying any possible access to the key(s) may be used.

The ReKey(Ciphertext, OldKeyID, NewKeyID) request, in an embodiment, may be used to cause the cryptography service to encrypt ciphertext under a different key. When the cryptography service receives a ReKey(Ciphertext, OldKeyID, NewKeyID) request, it may use a key identified by the OldKeyID to decrypt the specified ciphertext and then use a key identified by the NewKeyID to encrypt the decrypted ciphertext. If a key identified by the NewKeyID does not yet exist, the cryptography service may generate a key to use and associate the generated key with the specified NewKeyID, such as described in connection with the Create (KeyID) request described above. In some embodiments, the ReKey operation may be operable to cause data to be transferrable between isolated instances of a cryptography service. In some embodiments, a policy might permit a rekey operation to be performed on a ciphertext but might not permit the same requestor to directly decrypt the ciphertext. In some embodiments, ReKey might support rekeying a ciphertext from a key identified by a first KeyID within a first account to a key identified by a KeyID within a second account.

Similarly, the frontend system may implement a policy configuration API which, in an embodiment, enables users to submit requests for configuring policies for the performance of cryptographic operations and for other policy-related operations. Policies may be associated with keys, groups of keys, accounts, users, and other logical entities in various embodiments. Example policies, which may be configured via the policy configuration API, are provided below. In an embodiment, the cryptography service policy configuration API includes the following requests:

SetKeyPolicy(KeyID, Policy)
Suspend(KeyID, Public Key)
Reinstate(KeyID, Private Key)

In an embodiment, the SetKeyPolicy(KeyID, Policy) request may be used to cause the cryptography service to store a policy on the key (or family of keys) identified by the KeyID. A policy may be information that is determinative of whether a requested cryptographic operation can be performed in a particular context. The policy may be encoded in a declarative access control policy language, such as eXtensinble Access Control Markup Language (XACML), Enterprise Privacy Authorization Language (EPAL), Amazon Web Services Access Policy Language, Microsoft SecPol, or any suitable way of encoding one or more conditions that must be satisfied for a cryptographic operation to be performed. Policies may define what operations can be performed, when the operations can be performed, which entities can make authorized requests for operations to be performed, which information is required for a particular request to be authorized, and the like. In addition, policies may be defined and/or enforced using access control lists, privileges associated with users, and/or operation bitmasks in addition to or instead of the examples given above. Example policies appear below.

In some embodiments the cryptographic service may support a suspend operation, e.g., using a Suspend(KeyID, Public Key) API call. A suspend operation enables the customer of the cryptographic service to deny the operator of the cryptographic service use of or access to a key. In some embodiments, a suspend operation might include receiving a public key from a customer and encrypting the key specified by a given KeyID with the received public key and shredding the key specified by the KeyID, such that the provider is not able to access the suspended key unless the private key associated with the public key is provided, e.g., using a Reinstate(KeyID, Private Key) API call that both specifies the KeyID and includes the private key. In some other embodiments, a suspend operation might involve encrypting a key associated with a specified KeyID using another key managed by the cryptographic service, including without limitation one created for the purpose of the instant suspend operation. The ciphertext produced by this operation can be provided to the customer and not retained within the cryptographic service. The original key identified by the KeyID can then be shredded. The cryptographic service may be operable to receive the provided ciphertext and re-import the suspended key. In some embodiments, the ciphertext may be generated in a manner that will prevent the cryptographic service from returning a decrypted version to the customer.

As illustrated in FIG. 9, the cryptography service 900 includes a backend system 902 that itself comprises various components in some embodiments. For example, the backend system in this example includes a request processing system (unit) 904 which may be a subsystem of the cryptography service 900 that is configured to perform operations in accordance with requests received through either the request API 906 or the policy configuration API 908. For example, the request processing component may receive requests received via the request API and the policy configuration API determines whether such requests are authentic and are therefore fulfillable and may fulfill the requests. Fulfilling the request may include, for example, performing and/or having performed cryptographic operations. The request processing unit may be configured to interact with an authentication interface 910 which enables the request processing unit to determine whether requests are authentic. The authentication interface may be configured to interact with an authentication service such as described above. For example, when a request is received by the request processing unit, the request processing unit may utilize the authentication interface to interact with an authentication service which may, if applicable, provide authentication proof that may be used in order to cause a performance of cryptographic operations.

The backend system of the cryptography service 900 also, in this illustrative example, includes a plurality of a security modules 912 (cryptography modules), a policy enforcement module 914, and a coordinator module 916. One or more of the security modules may be hardware security modules although, in various embodiments, a security module may be any suitable computer device configured according to have capabilities described herein. Each security module in an embodiment stores a plurality of keys associated with KeyIDs. Each security module may be configured to securely store the keys so as to not be accessible by other components of the cryptography service 900 and/or other components of other systems. In an embodiment, some or all of the security modules are compliant with at least one security standard. For example, in some embodiments, the security modules are each validated as compliant with a Federal Information Processing Standard (FIPS) outlined in FIPS Publication 140-1 and/or 140-2, such as one or more security levels outlined in FIPS Publication 140-2. In addition, in some embodiments, each security module is certified under the Cryptographic Module Validation Program (CMVP). A security module may be implemented as a hardware security module (HSM) or another security module having some or all capabilities of an HSM. In some embodiments, a validated module is used to bootstrap operations. In some embodiments, customers can configure some keys that are stored in and operated on only by validated modules and other keys that are operated on by software. In some embodiments, the performance or cost associated with these various options may differ.

The security modules may be configured to perform cryptographic operations in accordance with instructions provided by the request processing unit. For example, the request processing unit may provide ciphertext and a KeyID to an appropriate security module with instructions to the security module to use a key associated with the KeyID to decrypt the ciphertext and provide in response the plaintext. In an embodiment, the backend system of the cryptography service 900 securely stores a plurality of keys forming a key space. Each of the security modules may store all keys in the key space; however, variations are considered as being within the scope of the present disclosure. For example, each of the security modules may store a subspace of the key space. Subspaces of the key space stored by security modules may overlap so that the keys are redundantly stored throughout the security modules. In some embodiments, certain keys may be stored only in specified geographic regions. In some embodiments, certain keys may be accessible only to operators having a particular certification or clearance level. In some embodiments certain keys may be stored in and used only with a module operated by a particular third party provider under contract with the provider of data storage services. In some embodiments, constructive control of security modules may require that lawful orders seeking to compel use of keys other than as authorized by the customer to involve either additional entities being compelled or additional jurisdictions compelling action. In some embodiments, customers may be offered independent options for the jurisdiction in which their ciphertexts are stored and their keys are stored. In some embodiments, security modules storing keys may be configured to provide audit information to the owner of the keys, and the security modules may be configured such that the generation and providing of audit information not suppressible by the customer. In some embodiments, the security modules may be configured to independently validate a signature generated by the customer such that the provider (e.g., hosting the security modules) is not able to perform operations under keys stored by the security modules. In addition, some security models may store all of the key space and some security modules may store subspaces of the key space. Other variations are also considered as being the scope of the present disclosure. In instances where different security modules store different subspaces of the key space, the request processing unit may be configured such as with a relational table or other mechanism to determine which security module to instruct to perform cryptographic operations in accordance with various requests.

In an embodiment, the policy enforcement module is configured to obtain information from a request processing unit and determine, based at least in part on that information, whether the request received through the API may be performed. For example, when a request to perform cryptographic operation is received through the request API, the request processing unit may interact with the policy enforcement module to determine whether fulfillment of the request is authorized according to any applicable policy such as policy applicable to a specified KeyID in the request and/or other policies such as policy associated with the requestor. If the policy enforcement module allows fulfillment of the request, the request processing unit may, accordingly, instruct an appropriate security module to perform cryptographic operations in accordance with fulfilling the request.

As with all figures described herein, numerous variations are considered as being within the scope of the present disclosure. For example, FIG. 9 shows the policy enforcement module separate from security modules. However, each security module may include a policy enforcement module in addition to or instead of the policy enforcement module illustrated as separate. Thus, each security module may be independently configured to enforce policy. In addition, as another example, each security module may include a policy enforcement module which enforces policies different from policies enforced by a separate policy enforcement module. Numerous other variations are considered as being within the scope of the present disclosure.

Cryptographic operations that may be performed in various embodiments include, but are not limited to digital signature generation, digital signature verification, encryption, decryption, and random number generation. Operations that utilize cryptographic keys include, but are not limited to, public key and/or private key cryptographic algorithms. For example, as discussed, numerous variations utilize symmetric and/or asymmetric cryptographic primitives. Symmetric key algorithms may include various schemes for performing cryptographic operations on data including block ciphers, stream ciphers, and digital signature schemes. Example symmetric key algorithms include, but are not limited to, the advanced encryption standard (AES), the data encryption standard (DES), triple DES (3DES), Serpent, Twofish, blowfish, CASTS, RC4, and the international data encryption algorithm (IDEA). Example modes of block ciphers include, but are not limited to, the cipher-block chaining (CBC) mode, propagating cipher-block chaining (PCBC) mode, cipher feedback mode (CFB), output feedback (OFB) mode, counter (CTR) mode, and other modes, such as authenticated encryption modes such as eXtended Ciphertext Block Chaining (XCBC) mode, Integrity Aware CBC (IACBC) mode, Integrity Aware Parallelizable (IAPM) mode, Offset Codebook (OCB) mode, EAX and EAX Prime modes, Carter-Wegman+CTR (CWC) mode, Counter with CBC-MAC (CCM) mode, and Galois/Counter (GCM) mode. Symmetric key algorithms may also include those used to generate output of one way functions and include, but are not limited to algorithms that utilize hash-based message authentication codes (HMACs), message authentication codes (MACs) in general, PBKDF2, and Bcrypt. Asymmetric key algorithms may also include various schemes for performing cryptographic operations on data. Example algorithms include, but are not limited to, those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme, and the ECQV implicit certificate scheme. Other algorithms and combinations of algorithms are also considered as being within the scope of the present disclosure and the above is not intended to be an exhaustive list.

As illustrated in FIG. 9, a cloud privacy control 918 (or other service(s)) may utilize the request API 906 provided by the cryptography service 900 to cause the cryptography service 900 to perform cryptographic operations, such as described above. The cloud privacy control 918 may provide a web service or other API through which cloud privacy controls are programmatically manageable.

As part of management of a cloud privacy control 918, an operation may be to utilize encryption for data. To accomplish such encryption, the cloud privacy control 918 may submit API calls to the cryptography service 900 to cause the performance of various cryptographic operations. For example, a cloud privacy control 918 may be provisioned with a cryptographic key provided by the cryptography service using appropriate API calls, such as described above.

Various workflows may be used to provision data storage devices in accordance with various embodiments. For example, in some embodiments, a cloud privacy control 918 is provisioned with an identifier of a cryptographic key and an encrypted data key usable to encrypt data stored on the cloud privacy control 918. The encrypted data key may be obtained such as by causing, via API call, the cryptography service 900 to generate the data key, encrypt the data key, and provide the encrypted data key without providing the data key in plaintext form, such as described above. A management subsystem of the cloud privacy control 918 may authenticate such an API call for the cryptography service 900 and may have a first level of privileges (e.g., sufficient to cause the cryptography service to generate a data key and provide the generated data key in encrypted form and insufficient to obtain the data key in plaintext form).

End-to-end encryption (E2EE) is utilized to protect content in a wide variety of scenarios. For example, a customer of a cloud platform can setup consumer and producer devices in using end-to-end encryption. In such scenarios, a cloud service can be used to distribute data generated by consumers to producers in a confidential manner—for example, a customer can setup a home security camera and use a cloud security service provider to distribute the camera's video feed to various data consumers, such as a mobile application on the customer's smartphone. The use of E2E encryption provides the customer with peace-of-mind that sensitive content (e.g., video feed from security camera) is kept private and inaccessible to other entities—including the cloud security service provider.

While an E2EE scheme described above allows a customer to securely produce and consume data on his/her own devices with assurances of confidentiality, there may be cases where the customer wishes for other entities to consume the content. For example, in the case of a home security camera, a customer may wish to have the video feed of the camera analyzed using computer vision machine-learning (CVML) to perform object detection, event detection, etc. In doing so, privacy considerations may arise—a customer may wish for greater assurances that any sensitive content that is provided to a cloud service provider is not misused. Accordingly, techniques for providing accessibility to content while providing privacy are desired.

Figure 10:
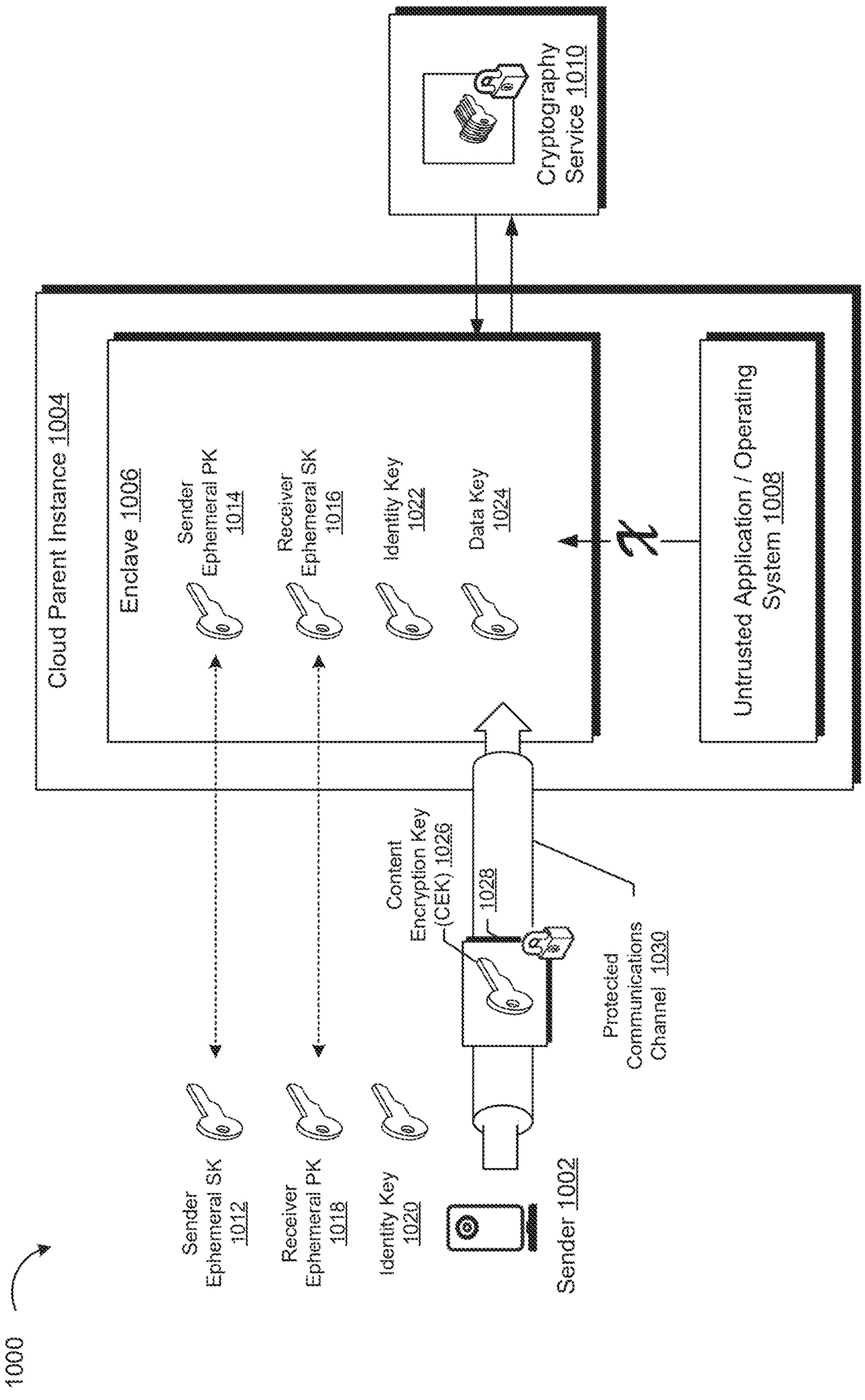
FIG. 10 illustrates a computing environment 1000 depicting the use of an in-transit content protection protocol, in accordance with one or more example embodiments of the present disclosure.

FIG. 10 illustrates a computing environment 1000 depicting the use of an in-transit content protection protocol, in accordance with one or more example embodiments of the present disclosure.

According to at least one embodiment of the present disclosure, a computing environment 1000 for implementing an in-transit content protection protocol that comprises: sender 1002; cloud parent instance 1004; enclave 1006; untrusted application/operating system 1008; cryptography service 1010; sender ephemeral private key 1012; sender ephemeral public key 1014; receiver ephemeral private key 1016; receiver ephemeral public key 1018; identity key 1020; identity key 1022; data key 1024; sensitive content (e.g., in the form of a content encryption key 1026); encrypted content 1028; and protected communications channel 1030. FIG. 10 depicts an illustrative, non-limiting, example of a computing environment 1000, and various other embodiments comprising greater or fewer components relative to those depicts in FIG. 10 are also contemplated within the scope of this disclosure.

Techniques described herein relate to protocols for cryptographically protecting in-transit content (e.g., content 1026), according to at least one embodiment of the present disclosure. In various embodiments, techniques described herein can be utilized to allow customers to grant authorization to a cloud service to perform various workloads in a confidential manner, such that the cloud service itself—outside of a protected execution environment with a pre-defined set of capabilities for performing the desired workload—is unable to access the customer's data. As an illustrative, non-limiting example, a customer may have a home security camera that acts as a data producer. The customer can grant authorizations to data consumers to access content generated by the data producers. In this example, the home security camera (e.g., a data producer) may generate a video feed (e.g., content) that is distributed to the customer's smartphone applications (e.g., a data consumer) where the customer can view the feed, remotely interact with a delivery agent, and more. In various embodiments, cloud-based data consumers are able to provide various capabilities. For example, within a cloud service provider environment, there may be additional computing resources that can be leveraged to perform various tasks for the customer. One such example is the ability to perform computer vision machine-learning (CVML) workloads, leveraging highly complex artificial intelligence (AI) models to perform various tasks. For instance, a customer's home security camera may send a video feed to a cloud-based data consumer that analyzes the video feed to determine the occurrence of various events, such as to determine if a package has been delivered, if a pet has walked across the lawn, and more. In various embodiments, AI models can be used to identify when a known individual (e.g., a child or relative) has arrived. Accordingly, it may be the case that providing additional context around these events is beneficial—however, customers may also wish to have assurances that when a cloud-based data consumer is authorized, the content that it receives from data producers is not misused, mishandled, or divulged, either intentionally or by accident. One such way of ensuring the confidentiality of content is to encrypt the content using cryptographic material that is kept secret from unauthorized entities.

To this end, this disclosure provides techniques to implement in-transit protocols that allow for content (e.g., content encryption key 1026) to be securely shared between a sender 1002 device (e.g., home security camera) and a receiver, which is depicted in FIG. 10 as an enclave 1006 having a protected execution environment within a cloud-based service (e.g., a cloud parent instance 1004). For example, an enclave may be configured to execute a predetermined confidential computing workload, and provide assurances that the enclave code cannot be modified and that enclave data cannot be accessed outside of the protected execution environment, even by the operating system, other applications, and privileged users of the device hosting the enclave. These entities, which are unable to access the cryptographic materials within enclave 1006, are collectively referred to as untrusted application/operating system 1008 in FIG. 10. Accordingly, it should be understood that data privacy can be improved through the implementation of an in-transit protocol for protecting data, as a client of a cloud service provider can be provided with assurance that content provided over such a protocol will be kept confidential and that the cloud service provider is able to use the customer's contents to perform various useful services that are authorized by the customer, all the while still providing cryptographically verifiable assurances that the content is kept confidential and inaccessible to the service provider for purposes beyond what the customer has explicitly authorized.

Various privacy goals may be implemented, in accordance with one or more embodiments described herein. A privacy goal that can be implemented is that the user (e.g., customer) has sole access to content—that is, the user's content (e.g., past and present) can only be accessed by the user and/or participants that the user has granted authorization to. These authorized participants may include devices, other users, or authorized cloud-based services/workloads. A privacy goal that can be implemented is sole authorization and/or revocation control by the user—that is, access control to content by participants can only be authorized or revoked by the content owner. A privacy goal that can be implemented is that when a participant's access to content is revoked, the revoked participant will no longer have access to the content. A privacy goal that can be implemented is minimization in time, such that the user's authorized participants will only have access to content on an as-needed basis. Outside of this need, they will not have access to the content. A privacy goal that can be implemented is minimization in space, such that the user's authorized participants will only have access to the content and they will never store or send the accessed content in any manner that could be accessible by unauthorized entities. A privacy goal that can be implemented is transparency, such that the user will always be able to find out why, when, and who has access to the content. A privacy goal that can be implemented is privacy compromise mitigation, such that if any of the participants authorized by the user is compromised, the user is able to revoke content access from them remotely.

According to at least one embodiment of the present disclosure, an in-transit content protection protocol is implemented to ensure that sensitive cryptographic material is able to be transmitted securely from a sender 1002 (e.g., data producer) to a receiver (e.g., privacy control component). The cryptographic material may be a symmetric key that is used to encrypt content generated by data producers. This symmetric key may, throughout this disclosure, be referred to as a content encryption key (CEK). Generally speaking, the CEK 1026 is to be utilized by a cloud-based privacy control component (e.g., enclave 1006) to apply privacy controls. A robust server side fan out strategy may be implemented to efficiently deliver messages to multiple recipients from a single sender. In various embodiments, a data producer can refer to a device, such as a home security camera, that produces sensitive content (e.g., video feed). In various embodiments, a data producer can refer to a cloud-based service or software (e.g., a facial recognition software that determines identities of individuals from a video feed). Various information generated by data producers can be considered sensitive content. For example, a video feed of individuals that are at an organization's facility may be considered sensitive content produced by a security camera, as well as the identities of individuals in the video feed that are determined by a facial recognition software and/or service. These examples are illustrative in nature and non-limiting.

An in-transit content protection protocol, as described in greater detail below, may be utilized to establish a protected communications channel 1030 that one-way communication from a sender to cloud-based receiver that is end-to-end encrypted such that no intermediate entities—even those within the cloud service environment such as API gateways, load balancers, etc. can gain access to content (e.g., CEK) protected using the in-transit content protection protocol. In various embodiments, an in-transit content protection protocol provides cryptographically verifiable assurances of confidentiality, integrity, and/or authenticity. In various embodiments, confidentiality refers to assurances that only authorized entity (e.g., sender and receiver) are able to determine the contents transferred via such communications channels, authenticity refer to assurances that a message was created by a party purporting to be the author of the message and integrity refers to assurances that a received message was not modified either intentionally (e.g., by a malicious party) or unintentionally (e.g., as a result of signal loss during transmission) from its original form when the message was transmitted. A mutual authentication process may be used to ensure the confidentiality and integrity of communications between the parties, for example, using identity key 1020 and identity key 1022. In various embodiments, the identity keys are implemented as asymmetric key pairs, wherein the public key of the asymmetric key pair can be made public and used for verifying signatures and/or signatories and the private key of the asymmetric key pair should be kept private and used for generating digital signatures. In various embodiments, enclave 1006 is provisioned with a server identity key that is protected by data key 1024. In various embodiments, the data key is stored in cryptography service 1010 and made available to enclave 1006 through an enclave attestation process. In various embodiments, the server's identity key 1022 is determined through a trusted retrieval process (e.g., as described in connection with FIG. 3). In various embodiments, the in-transit content protection protocol provides for assurances of post-compromise security through the use of ephemeral keys (e.g., sender ephemeral private key 1012; sender ephemeral public key 1014; receiver ephemeral private key 1016; and receiver ephemeral public key 1018), so that if an adversary is somehow able to compromise one of the participants and obtain access to confidential key material, that future communications can still be secure (e.g., through the different ephemeral keys in future communications sessions). In various embodiments, the in-transit content protection protocol provides for forward secrecy, such that past communications are secure from an adversary that is somehow able to compromise the secret key material. In various embodiments, the in-transit content protection protocol provides for resiliency, such that the output of the protocol is computationally indistinguishable from random bit.

In various embodiments, identity keys (e.g., data producer's identity key 1020 and CPC's identity key 1022) are long term keys. For example, identity key 1020 may refer to a long term, elliptic curve (EC) key type asymmetric key that is established at the sender device. In various embodiments, the asymmetric key comprises a private key that is kept secret by the sender 1002 and a public key that can be freely distributed. In some embodiments, a digital certificate is issued by a trusted certificate authority (CA) that provides a way of cryptographically verifying that the public key is associated with sender 1002. Likewise, identity key 1022 may refer to a long term, elliptic curve (EC) key type asymmetric key that is established at enclave 1006. In various embodiments, the asymmetric key comprises a private key that is kept secret by enclave 1006 and a public key that can be freely distributed. In some embodiments, a digital certificate is issued by a trusted certificate authority (CA) that provides a way of cryptographically verifying that the public key is associated with enclave 1006. In contrast to long term identity keys, the ephemeral keys depicted in FIG. 10 may be intended for use over a limited number of sessions and/or limited duration. For example, ephemeral keys may be generated on a per session basis.

Figure 11:
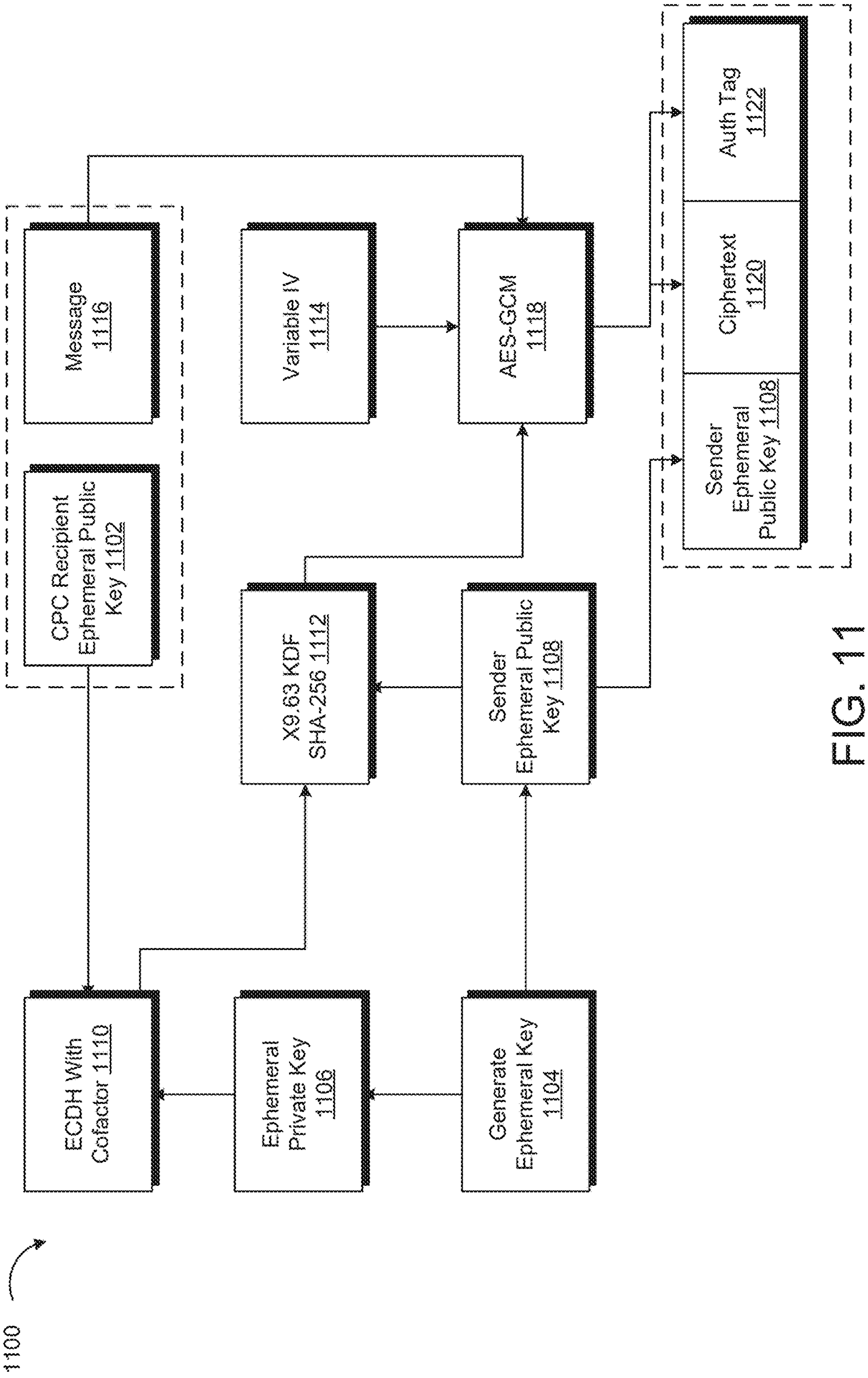
FIG. 11 illustrates a computing environment 1100 depicting encryption of sensitive data (e.g., content encryption key) at a sender for an in-transit content protection protocol, in accordance with one or more example embodiments of the present disclosure.

FIG. 11 illustrates a computing environment 1100 depicting encryption of sensitive data (e.g., content encryption key) at a sender for an in-transit content protection protocol, in accordance with one or more example embodiments of the present disclosure.

According to at least one embodiment of the present disclosure, an in-transit content protection protocol is implemented using Elliptic Curve Integrated Encryption Scheme (ECIES) With Ciphertext Attestation and Extended Triple Diffie-Hellman (X3DH).

In various embodiments, computing environment 1100 is implanted in the context of a sender or data producer, for example, as discussed in connection with FIG. 10. In various embodiments, the sender wishes to securely transmit cryptographic material (e.g., a content encryption key) to a cloud privacy control. To this end, various steps in connection with FIG. 11 may be performed.

In various embodiments, a data producer will send a request to a cloud privacy control (CPC) for the CPC to provide an ephemeral public key. The receiver (CPC in this case) will, in various embodiments, will generate an ephemeral key pair comprising a CPC ephemeral public key and CPC ephemeral private key. In various embodiments, the key pair is an elliptic curve (EC) key pair. In various embodiments, the CPC will generate a digital signature over the CPC ephemeral public key using the CPC's identity private key. These receiver (e.g., CPC) instructions may be described in the following manner:

```
// Receiver Side—Generates an Ephemeral Key Pair and
    Creates a Signature using the IdentityKey)
rec_ec_ephemeral_key:=create_ec_asymmetric_key( );
signature:=ecdsa_do_sign(rec_ec_ephemeral_key,
    re_identity_privateKey);
```

In various embodiments, the ephemeral public key and signature may be transmitted from CPC to the sender via an insecure communications channel without cryptographically verifiable assurances of confidentiality, integrity and authenticity. Generally speaking, an insecure channel is a communications channel is one in which the contents may be altered in transit. To that end, the data producer (e.g., sender) may receive the CPC ephemeral public key and signature and (i) validate the signature and (ii) validate the signatory using the CPC's identity public key. Validating the signature may involve determining whether the ephemeral public key was altered in transit, whereas validating the signatory may involve determining that the digital signature was generated by the CPC and not another entity. In various embodiments, validating the signatory involves validating the identity of the CPC, winch may involve the use of a digital certificate issued by a trusted central authority (e.g., a cloud-based certificate authority). Assuming that the sender is able to successfully validate the signature and signatory, the received public key may be accepted as box 1102, the CPC recipient ephemeral public key.

Next, at box 1104, the sender may generate a sender ephemeral key pair. The sender ephemeral key pair may comprise a sender ephemeral private key (represented by box 1106) and a sender ephemeral public key (represented by box 1108). In various embodiments, a shared secret is computed based at least in part on the CPC recipient ephemeral public key and the sender ephemeral private key. In various embodiments, the shared secret is computed according to an Elliptic Curve Diffie-Hellman (ECDH) algorithm. In some embodiments, the shared secret is computed according to ECDH with cofactor, represented by box 1110. In various embodiments, a symmetric key is derived based at least in part on the output of box 1110. In some embodiments, the symmetric key is simply the output of box 1110. In other embodiments, further processing is performed. For instance, a symmetric key may be generated from a key derivation procedure. In at least one embodiment, a key derivation procedure comprises an X9.63 Key Derivation Function (KDF) that uses a hash function, such as SHA-256, which is depicted as box 1112 in FIG. 11. In various embodiments, the sender ephemeral public key 1108 is provided as an input to the key derivation function as additional shared information that provides context-specific data for the output key material. In various embodiments, the output of box 1112 may be referred to as a symmetric key, which is used as the key for an authenticated encryption (AE) algorithm. In various embodiments, an AE algorithm receives, as inputs: an encryption key, a unique value (e.g., nonce or initialization vector), and a message. In various embodiments, the encryption key is represented by the output of box 1112, the unique value is represented by initialization vector at box 1114, and the message is represented by box 1116. In various embodiments the message comprises cryptographic key material (e.g., content encryption key) to be shared with the recipient. In various embodiments, the AE encryption algorithm is represented by box 1118. An example of an AE algorithm is AES-GCM. In various embodiments, an AE encryption algorithm produces, as outputs, a ciphertext (represented by box 1120) and an authentication tag (represented by box 1122). In various embodiments, a payload comprising the sender ephemeral public key, ciphertext, and authentication tag are transmitted to the recipient (e.g., CPC). The payload may, in various embodiments, be transmitted over an insecure communications channel without cryptographically verifiable assurances of confidentiality, integrity and authenticity. It should be noted that while the payload (e.g., comprising sender ephemeral public key, ciphertext, and authentication tag) may be viewed by unauthorized parties, those parties will not be able to view the underly contents of the message, as they would lack sufficient cryptographic material to decipher the ciphertext.

According to at least one embodiment of the present disclosure, sender-side authenticated encryption can be implemented based on the following instructions:

```
// Sender Side—Validates the Signature and authenticates
    the receiver before encrypting the sensitive content
validate_signature(signature, re_identity_publicKey);
validate_signatory(re_identity_publicKey);
sn_ec_ephemeral_key:=create_ec_asymmetric_key( );
shared_secret:=dh(sn_ec_ephemeral_key,rec_ec_ephem-
    eral_key);
sensitive_content_cipher:=encrypt(sensitive_content,
    shared_secret);
signature=ecdsa_do_sign(sensitive_content_cipher,
    sn_identity_privateKey);
```

In various embodiments, a payload comprising a sender ephemeral public key, ciphertext encoding a message comprising a content encryption key, and an authentication tag generated over at least the message is transmitted by the sender of computing environment 1100 to a recipient—that is, the CPC that owns the private key corresponding to the CPC recipient ephemeral public key of box 1108. The recipient may perform a decryption procedure to determine the underlying contents of the message, for example, as discussed below in connection with FIG. 12.

Figure 12:
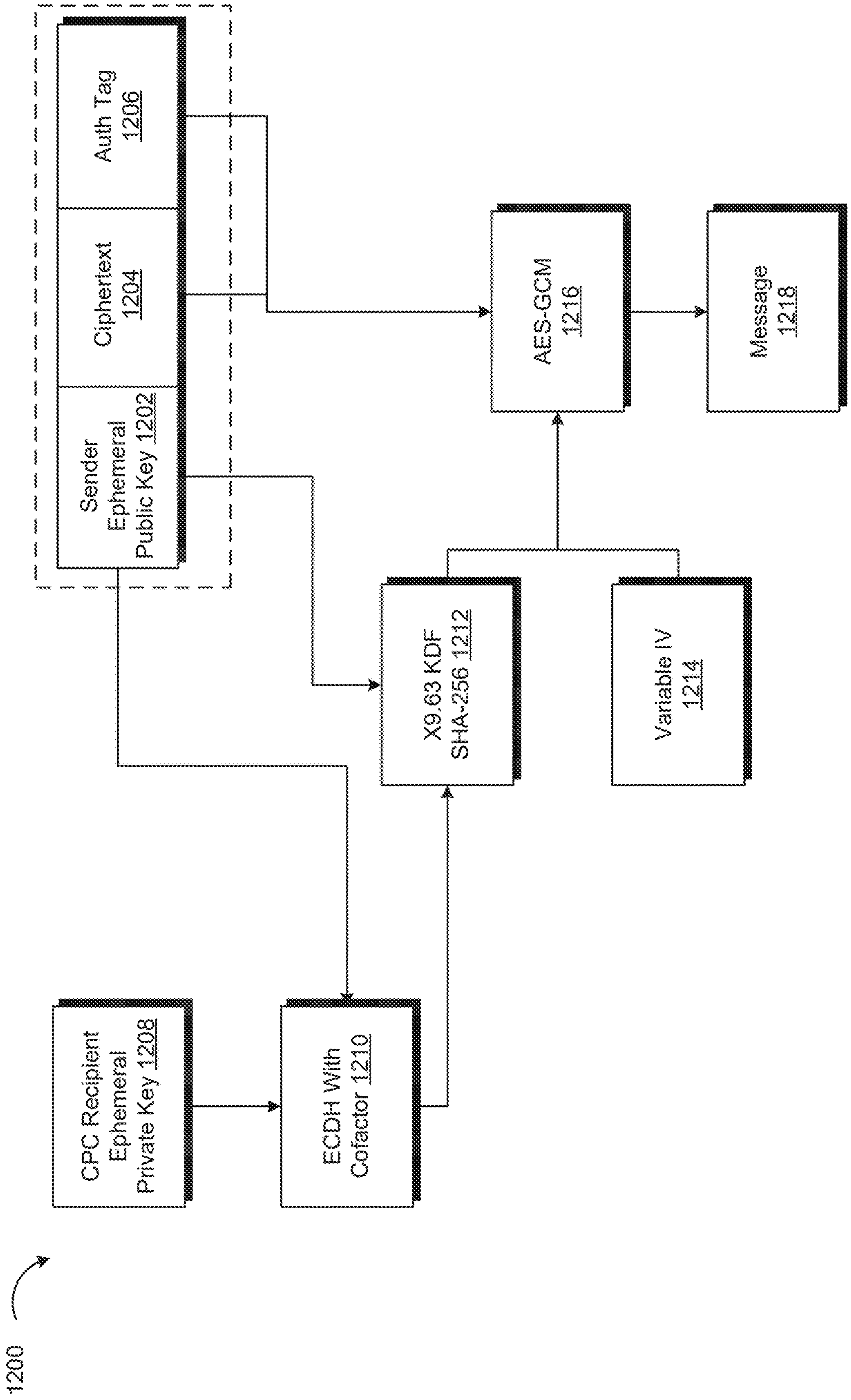
FIG. 12 illustrates a computing environment 1200 depicting decryption of sensitive data (e.g., content encryption key) at a receiver for an in-transit content protection protocol, in accordance with one or more example embodiments of the present disclosure.

FIG. 12 illustrates a computing environment 1200 depicting decryption of sensitive data (e.g., content encryption key) at a receiver for an in-transit content protection protocol, in accordance with one or more example embodiments of the present disclosure. In various embodiments, the receiver is a cloud-based privacy control system (e.g., CPC).

According to at least one embodiment of the present disclosure, an in-transit content protection protocol is implemented using Elliptic Curve Integrated Encryption Scheme (ECIES) With Ciphertext Attestation and Extended Triple Diffie-Hellman (X3DH). In various embodiments, ECIES combines symmetric encryption (e.g., AES) with elliptic curve cryptography to provide secure encryption and decryption. ECIES leverages the EC public key to establish a shared secret between the sender and the recipient. The actual data to be protected is encrypted using a symmetric encryption algorithm, such as AES, with the derived shared secret as the key. Furthermore, ECIES can provide authentication and integrity assurance through the incorporation of digital signatures or message authentication codes (MACs).

In various embodiments, a payload comprising a sender ephemeral public key, ciphertext encoding a message comprising a content encryption key, and an authentication tag generated over at least the message is transmitted by the sender to a recipient in accordance with computing environment 1200. In various embodiments, the recipient is a cloud privacy control system operating within the confines of a protected execution environment (e.g., cloud-based enclave). The sender ephemeral key (depicted as box 1202), ciphertext (depicted as box 1204), and authentication tag (depicted as box 1206) may be generated in accordance with an in-transit content protection protocol, for example, as discussed in connection with FIG. 11 above.

In various embodiments, an ephemeral public key and signature may be transmitted from sender to the CPC of computing environment 1200 via an insecure communications channel without cryptographically verifiable assurances of confidentiality, integrity and authenticity. Generally speaking, an insecure channel is a communications channel is one in which the contents may be altered in transit. To that end, the CPC (e.g., recipient) may receive the sender ephemeral public key and signature, and (i) validate the signature and (ii) validate the signatory using the sender's identity public key. Validating the signature may involve determining whether the ephemeral public key was altered in transit, whereas validating the signatory may involve determining that the digital signature was generated by the expected entity (e.g., sender of FIG. 11) and not another entity. In various embodiments, validating the signatory involves validating the identity of the sender, winch may involve the use of a digital certificate issued by a trusted central authority (e.g., a cloud-based certificate authority). Assuming that the recipient of computing environment 1200 is able to successfully validate the signature and signatory, the received public key may be accepted as box 1202, the sender ephemeral public key.

In various embodiments, the recipient has previously generated a CPC recipient ephemeral key pair comprising a CPC recipient ephemeral private key (depicted as box 1208) and a CPC recipient ephemeral public key that was previously provided to the sender of the payload. In various embodiments, the secret value that was used to generate ciphertext 1204 and protect an underlying message is determined by the recipient of computing environment 1200. In various embodiments, the same secret that was used to produce ciphertext 1204 is computed based at least in part on the CPC recipient ephemeral private key and the sender ephemeral public key. In various embodiments, the shared secret is computed according to an Elliptic Curve Diffie-Hellman (ECDH) algorithm. In some embodiments, the shared secret is computed according to ECDH with cofactor, represented by box 1210. In various embodiments, a symmetric key is derived based at least in part on the output of box 1210. In some embodiments, the symmetric key is simply the output of box 1210. In other embodiments, further processing is performed. For instance, a symmetric key may be generated from a key derivation procedure. In at least one embodiment, a key derivation procedure comprises an X9.63 Key Derivation Function (KDF) that uses a hash function, such as SHA-256, which is depicted as box 1212 in FIG. 12. In various embodiments, the sender ephemeral public key 1202 is provided as an input to the key derivation function as additional shared information that provides context-specific data for the output key material. In various embodiments, the output of box 1212 may be referred to as a symmetric key, which is used as the key for an authenticated encryption (AE) algorithm. In various embodiments, an AE decryption algorithm receives, as inputs: a decryption key, a unique value (e.g., nonce or initialization vector), a ciphertext, and an authentication tag. In various embodiments, the decryption key is represented by the output of box 1212, the unique value is represented by initialization vector at box 1214, the ciphertext is represented by box 1204, and the authentication tag is represented by box 1206. In various embodiments the ciphertext comprises cryptographic key material (e.g., content encryption key) to be shared with the recipient. In various embodiments, the AE decryption algorithm is represented by box 1216. An example of an AE algorithm is AES-GCM. In various embodiments, an AE decryption algorithm uses the decryption key to validate the authentication tag and decrypt the ciphertext, thereby producing a plaintext message (represented as box 1218). In various embodiments, the message comprises a CEK that can be used by the CPC to perform various confidential computing workloads.

According to at least one embodiment of the present disclosure, receiver-side authenticated decryption can be implemented based on the following instructions:

According to at least one embodiment of the present disclosure, sender-side encryption can be implemented based on the following instructions:

```
// Receiver Side—Validates the Signature and authenticates the sender before decrypting the sensitive content
validate_signature(signature, sn_identity_publicKey);
validate_signatory(sn_identity_publicKey);
shared_secret:=dh(rec_ec_ephemeral_key, sn_ec_ephemeral_key);
sensitive_content:=decrypt(sensitive_content_cipher, shared_secret);
```

In various embodiments, a payload comprising a sender ephemeral public key, ciphertext encoding a message comprising a content encryption key, and an authentication tag generated over at least the message is transmitted to a recipient of computing environment 1200 by a sender according to techniques discussed in connection FIG. 11.

Figure 13:
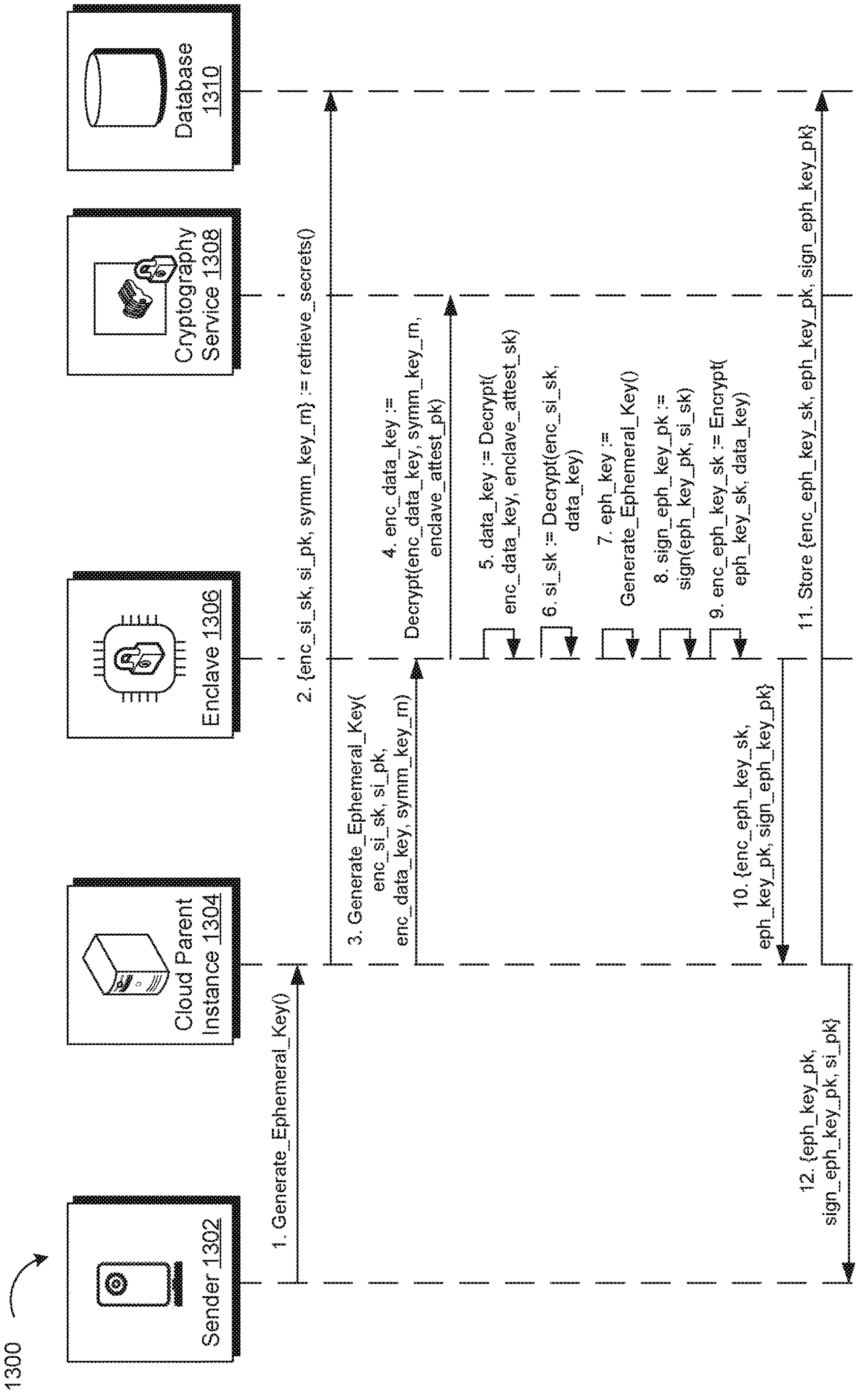
FIG. 13 illustrates a diagram 1300 depicting an ephemeral key generation process, in accordance with one or more example embodiments of the present disclosure.

FIG. 13 illustrates a diagram 1300 depicting a key exchange procedure for an in-transit content protection protocol, in accordance with one or more example embodiments of the present disclosure. In various embodiments, FIGS. 13-15 may be collectively implemented for establishing a protected communications session by which one-way secure communications are established for a sender to provide sensitive content (e.g., a content encryption key) to a cloud-based recipient).

According to at least one embodiment of the present disclosure, an ephemeral key generation process in accordance with diagram 1300 involves the following entities: sender 1302; cloud parent instance 1304; enclave 1306; cryptography service 1308; and database 1310. FIG. 13 depicts an illustrative, non-limiting, example of a computing environment, and various other embodiments comprising greater or fewer components relative to those depicts in FIG. 13 are also contemplated within the scope of this disclosure.

In various embodiments, sender 1302 refers to a data producer device that is owned and/or controlled by a customer. In connection with various embodiments, the customer may wish to utilize a cloud-based privacy control system to apply privacy controls to various data consumers that will securely receive content generated by data producers in the customer's ecosystem. Cloud parent instance 1304 may comprise, from the customer's perspective, untrusted applications and/or operating systems. For example, within the context of a cloud service, there may be systems, services, etc. that are not explicitly authorized or otherwise privileged to access content generated by sender 1302. Enclave 1306 may comprise code for running a cloud privacy control system that is authorized by the customer. In various embodiments, enclave 1306 is hosted on cloud parent instance 1304.

According to at least one embodiment of the present disclosure, sender 1302 transmits a request to generate an ephemeral key. The request may be transmitted over an insecure communications channel without cryptographically verifiable assurances of confidentiality, integrity and authenticity. Generally speaking, an insecure channel is a communications channel is one in which the contents may be altered in transit. For example, sender 1302 may transmit a request to a cloud privacy control (CPC) system that is routed through one or more untrusted entities, such as cloud parent instance 1304. In various embodiments, enclave 1306 is configured to run a confidential computing workload for apply cloud-based privacy controls. In some cases, the enclave 1306 is has previously been provisioned with an identity key pair {si_sk, si_pk}, for example, according to a trusted setup process (e.g., according to one or more embodiments described in connection with FIG. 2) and/or a trusted retrieval process (e.g., according to one or more embodiments described in connection with FIG. 3). In such cases, various steps depicted in FIG. 13 regarding retrieval and determination of si_sk may be omitted or skipped.

FIG. 13 depicts an illustrative workflow in which the secret si_sk is retrieved. At step 2, cloud parent instance 1304 may submit to database 1310 a request to retrieve secrets, which are stored in database 1310. For instance, the database 1310 may store an encrypted identity private key enc_si_sk, identity public key si_pk, and a symmetric key identifier symm_key_rn. In various embodiments the CPC identity public key is signed by a trusted certificate authority (CA). In various embodiments, the request to generate an ephemeral key will include identity private key enc_si_sk, identity public key si_pk, a symmetric key identifier symm_key_rn, and an encrypted data key enc_data_key. In various embodiments, the enclave's public key and encrypted private key are stored in database 1310 and associated with an ephemeral public key identifier, which can be used later to retrieve the ephemeral public key. In various embodiments, enclave 1306 submits a request to cryptography service 1308 to decrypt enc_data_key, the request comprising an enclave attestation public key. Cryptography service 1308 may be configured to validate that enclave 1306 is an authorized entity with respect to having direct access to the data key, and then determine a second encrypted data key that is encrypted under the enclave attestation private key. In some embodiments, the decrypt request of step 4 causes the cryptography service to re-encrypt the encrypted data key under the enclave attestation private key, which is returned to the enclave 1306.

In various embodiments, the enclave 1306 will decrypt the encrypted data key using the enclave attestation private key (denoted as "enclave_attest_sk") to produce a plaintext data key (denoted as "data_key). In various embodiments, enclave 1306 generates an ephemeral key pair. In various embodiments, the ephemeral private key will be kept private within the enclave. In various embodiments, the enclave will generate signature over the ephemeral public key using the enclave's identity private key. This can serve as a chain of trust—for example, an entity may be able to validate that the signature was generated using the enclave's identity private key, and a digital certificate issued by a trusted certificate authority may be used to validate that the corresponding identity public key is owned by the enclave. In various embodiments, the ephemeral private key is encrypted using the data key.

In various embodiments, enclave 1306 emits the following quantities, which are allowed to leave the confines of the enclave's protected execution environment: CPC encrypted ephemeral private key (enc_eph_key_sk); CPC ephemeral public key (eph_key_pk); signature over the ephemeral public key (sign_eph_key_pk). In various embodiments, CPC encrypted ephemeral private key (enc_eph_key_sk);

CPC ephemeral public key (eph_key_pk); signature over the ephemeral public key (sign_eph_key_pk) are stored in database 1310. For instance, additional enclave instances may be provisioned to allow for parallelized processing of CPC-based workloads using the stored quantities. In various embodiments, CPC ephemeral public key (eph_key_pk); signature over the ephemeral public key (sign_eph_key_pk); and CPC identity public key (si_pk) are provided to sender 1302. In various embodiments the CPC identity public key is signed by a trusted certificate authority (CA).

Figure 14:
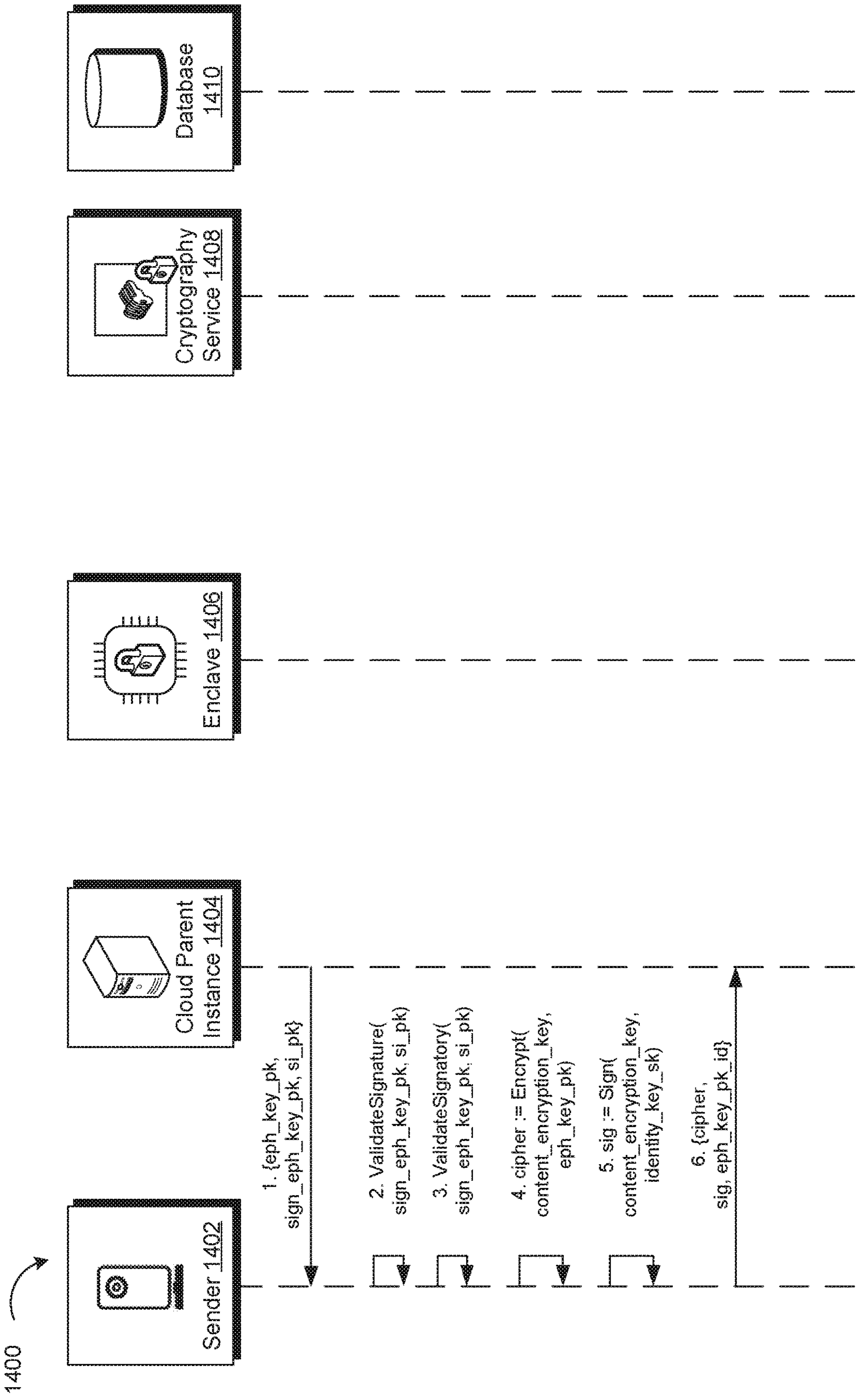
FIG. 14 illustrates a diagram 1400 depicting a key exchange procedure for an in-transit content protection protocol, in accordance with one or more example embodiments of the present disclosure.

FIG. 14 illustrates a diagram 1400 depicting a key exchange procedure for an in-transit content protection protocol, in accordance with one or more example embodiments of the present disclosure. In various embodiments, FIGS. 13-15 may be collectively implemented for establishing a protected communications session by which one-way secure communications are established for a sender to provide sensitive content (e.g., a content encryption key) to a cloud-based recipient).

According to at least one embodiment of the present disclosure, a key exchange procedure in accordance with diagram 1400 involves the following entities: sender 1402; cloud parent instance 1404; enclave 1406; cryptography service 1408; and database 1410. FIG. 14 depicts an illustrative, non-limiting, example of a computing environment, and various other embodiments comprising greater or fewer components relative to those depicts in FIG. 14 are also contemplated within the scope of this disclosure.

In various embodiments, a key exchange protocol between sender 1402 and a cloud-based policy control system hosted within enclave 1406 is initiated by sender 1402. In various embodiments, enclave 1406 is hosted by cloud parent instance 1404 and, as part of the key change protocol, enclave 1406 generates the following: CPC ephemeral public key (eph_key_pk); signature over the ephemeral public key (sign_eph_key_pk); and CPC identity public key (si_pk) are provided to sender 1402. In various embodiments the CPC identity public key is signed by a trusted certificate authority (CA). In various embodiments, the ephemeral public key and signature may be transmitted from CPC to the sender via an insecure communications channel without cryptographically verifiable assurances of confidentiality, integrity and authenticity. Generally speaking, an insecure channel is a communications channel is one in which the contents may be altered in transit. To that end, the data producer (e.g., sender 1402) may receive the CPC ephemeral public key and signature and (i) validate the signature and (ii) validate the signatory using the CPC's identity public key. Validating the signature may involve determining whether the ephemeral public key was altered in transit, whereas validating the signatory may involve determining that the digital signature was generated by the CPC and not another entity. In various embodiments, validating the signatory involves validating the identity of the CPC, winch may involve the use of a digital certificate issued by a trusted central authority (e.g., a cloud-based certificate authority). Assuming that the sender is able to successfully validate the signature and signatory, the received public key may be accepted as the CPC recipient ephemeral public key for a communications session between sender 1402 and enclave 1406.

In various embodiments, sender 1402 will encrypt a content encryption key or other sensitive content that is to be securely shared with enclave 1406. In various embodiments, an authenticated encryption (AE) procedure is performed on the sensitive content (e.g., CEK) using a shared secret. In various embodiments, the shared secret is computed according to an Elliptic Curve Diffie-Hellman (ECDH) algorithm. In some embodiments, the shared secret is computed according to ECDH with cofactor. In some embodiments, a signature is generated over the sensitive content (e.g., CEK) using the sender's identity private key.

In various embodiments, the following data elements are transmitted by the sender 1402 to cloud parent instance 1404 hosting enclave 1406: a ciphertext of a CEK; a signature of the CEK signed with the sender's identity private key; and eph_key_pk_id. In various embodiments, the sender's identity public key is provided to cloud parent instance 1404. In various embodiments, the sender's identity public key is signed by a trusted certificate authority.

Figure 15:
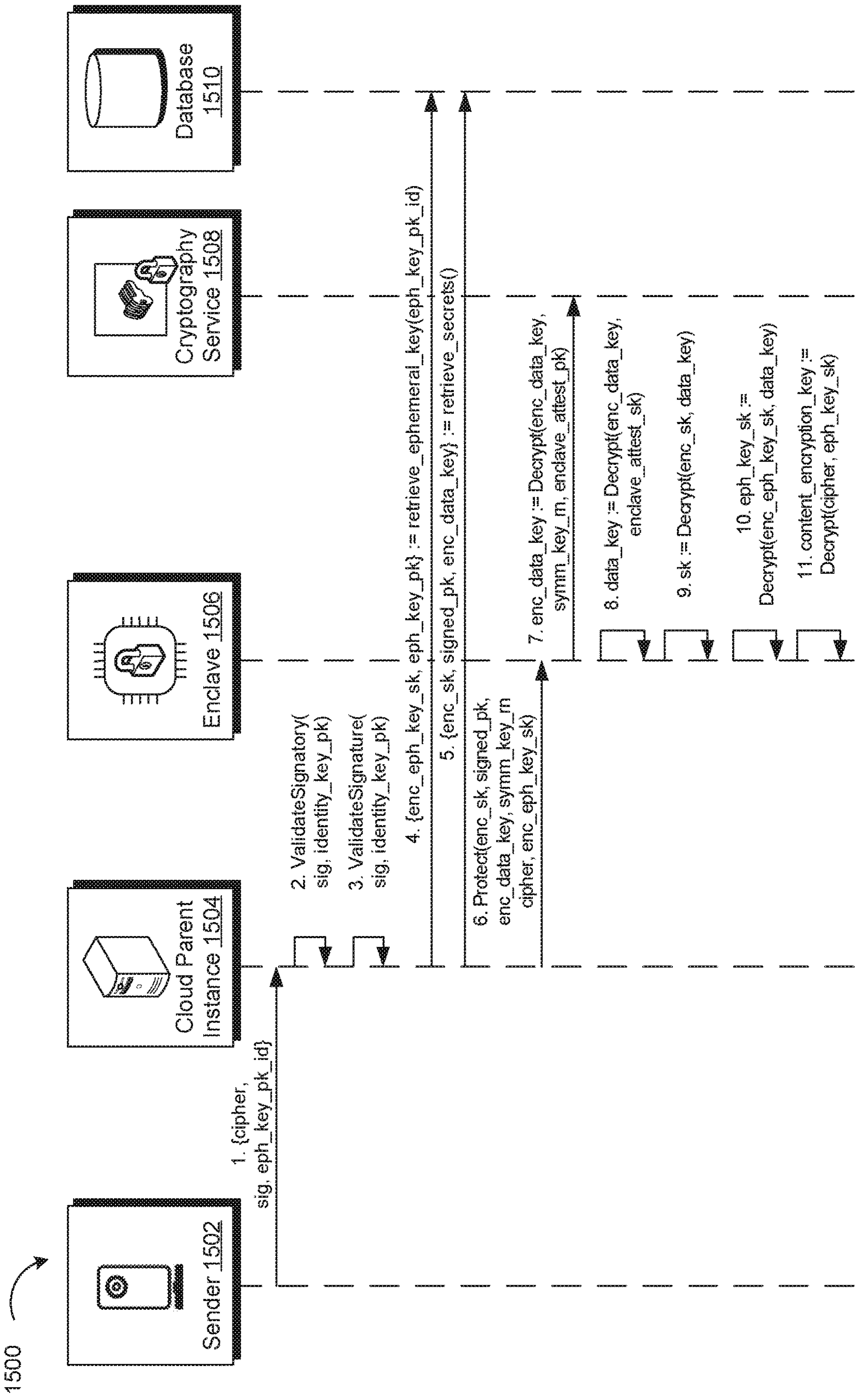
FIG. 15 illustrates a diagram 1500 depicting a key exchange procedure for an in-transit content protection protocol, in accordance with one or more example embodiments of the present disclosure.

FIG. 15 illustrates a diagram 1500 depicting a key exchange procedure for an in-transit content protection protocol, in accordance with one or more example embodiments of the present disclosure. In various embodiments, FIGS. 13-15 may be collectively implemented for establishing a protected communications session by which one-way secure communications are established for a sender to provide sensitive content (e.g., a content encryption key) to a cloud-based recipient).

According to at least one embodiment of the present disclosure, a protected transfer of sensitive content from sender 1502 to enclave 1506 performed in accordance with diagram 1500 involves the following entities: sender 1502; cloud parent instance 1504; enclave 1506; cryptography service 1508; and database 1510. FIG. 15 depicts an illustrative, non-limiting, example of a computing environment, and various other embodiments comprising greater or fewer components relative to those depicts in FIG. 15 are also contemplated within the scope of this disclosure.

In various embodiments, quantities such as a ciphertext (denoted as "cipher" in FIG. 15) and a signature (denoted as "sig" in FIG. 15) are cryptographically generated by sender 1502, for example, as described in connection with FIG. 14. In various embodiments, the sender 1502 provides to cloud parent instance 1504 an identifier for the CPC's ephemeral public key.

In various embodiments, one or more validations are performed at cloud parent instance 1504. In various embodiments, the validations are performed in enclave 1506. Cloud parent instance 1504 may receive the sender ephemeral public key and signature, and (i) validate the signature and (ii) validate the signatory using the sender's identity public key. Validating the signature may involve determining whether the ephemeral public key was altered in transit, whereas validating the signatory may involve determining that the digital signature was generated by the expected entity (e.g., sender of FIG. 11) and not another entity. In various embodiments, validating the signatory involves validating the identity of the sender, winch may involve the use of a digital certificate issued by a trusted central authority (e.g., a cloud-based certificate authority). Assuming that cloud parent instance 1504 is able to successfully validate the signature and signatory, the received public key may be accepted and downstream steps (e.g., steps 4-11) may be performed.

In some embodiments, enclave 1505 hosts a cloud-based privacy control system and sender 1502 wishes to securely transmit sensitive content (e.g., in the form of a content encryption key) to enclave 1505. In various embodiments, enclave 1506 is configured to run a confidential computing workload for apply cloud-based privacy controls. In some cases, the enclave 1506 is has previously been provisioned with an identity key pair {si_sk, si_pk} and/or a session ephemeral key eph_key_pk_id, for example, according to a trusted setup process (e.g., according to one or more embodiments described in connection with FIG. 2) and/or a trusted retrieval process (e.g., according to one or more embodiments described in connection with FIG. 3). In such cases, various steps depicted in FIG. 15 regarding retrieval and determination of si_sk may be omitted or skipped.

In various embodiments, the CPC ephemeral public key identifier is used by cloud parent instance 1504 to retrieve the CPC ephemeral key material from database 1510. In various embodiments, the CPC ephemeral public key is referred to as "eph_key_pk" and the encrypted CPC ephemeral private key is referred to as "eph_key_sk". In various embodiments, data elements for determining the enclave's identity private key are retrieved from database 1510, these data elements may comprise: an encrypted CPC identity private key "enc_sk", a signed CPC identity public key "signed_pk", and an encrypted data key "enc_data_key".

In various embodiments, enc_sk, signed_pk, enc_data_key, symm_key_rn, cipher, and enc_eph_key_sk may be provided to enclave 1506 for processing within a protected execution environment. In various embodiments, the encrypted data key is encrypted under a cryptographic key of cryptography service 1508. This may be a symmetric key having an identifier symm_key_rn. In various embodiments, enclave 1506 submits a call to cryptography service 1508 to decrypt the encrypted data key, providing the encrypted data key, the KeyID for the symmetric key used to encrypt the data key, and an enclave attestation document comprising an enclave attestation private key associated with enclave 1506. In various embodiments, cryptography service 1508 will use the enclave attestation to determine that enclave 1506 is authorized to access the data key, decrypt the encrypted data key using symmetric key, and then encrypt it using the enclave attestation public key. This second encrypted data key is then provided to enclave 1506. In various embodiments, enclave 1506 receives the second encrypted data key and decrypts the second encrypted data key using the enclave attestation private key to produce a plaintext data key. In various embodiments, the encrypted CPC identity public key is decrypted using the data key to produce a plaintext CPC identity private key. These steps to determine the CPC identity private key only need to be performed once per enclave, in various embodiments.

In various embodiments, when the CPC's identity private key is known (e.g., by performing steps 7-9 or through other processes that can be used to determine si_sk), the encrypted ephemeral private key may be decrypted using the CPC identity private key to produce a plaintext CPC ephemeral private key. Once the CPC ephemeral private key is known, decryption of the ciphertext may be performed, for example, as discussed in connection with FIG. 12. The result of such decryption is that sensitive content—for example, the content encryption key encpryted according to FIG. 14—is made accessible to enclave 1506, wherein untrusted entities such as the cloud parent instance 1504 hosting enclave 1506, untrusted applications running on the host device, untrusted operating system running on the host device, etc. are unable to access the content encryption key. In this way, an in-transit content protection protocol is able to establish a protected communications session that allows for sensitive content (e.g., content encryption key) to be secure shared from a data producer device (e.g., owned and controlled by a customer) to a cloud-based privacy control system without granting access to other cloud-based entities, such as API gateways, load balancers, or other components that may be involved in the routing of messages from sender 1502 to cloud parent instance 1504. Finally, only trusted enclave code on the system hosting the cloud privacy control system is able to access the content encryption key, and other software on the host system—including the operating system and kernel mode components—are not able to access the content encryption key.

Figure 16:
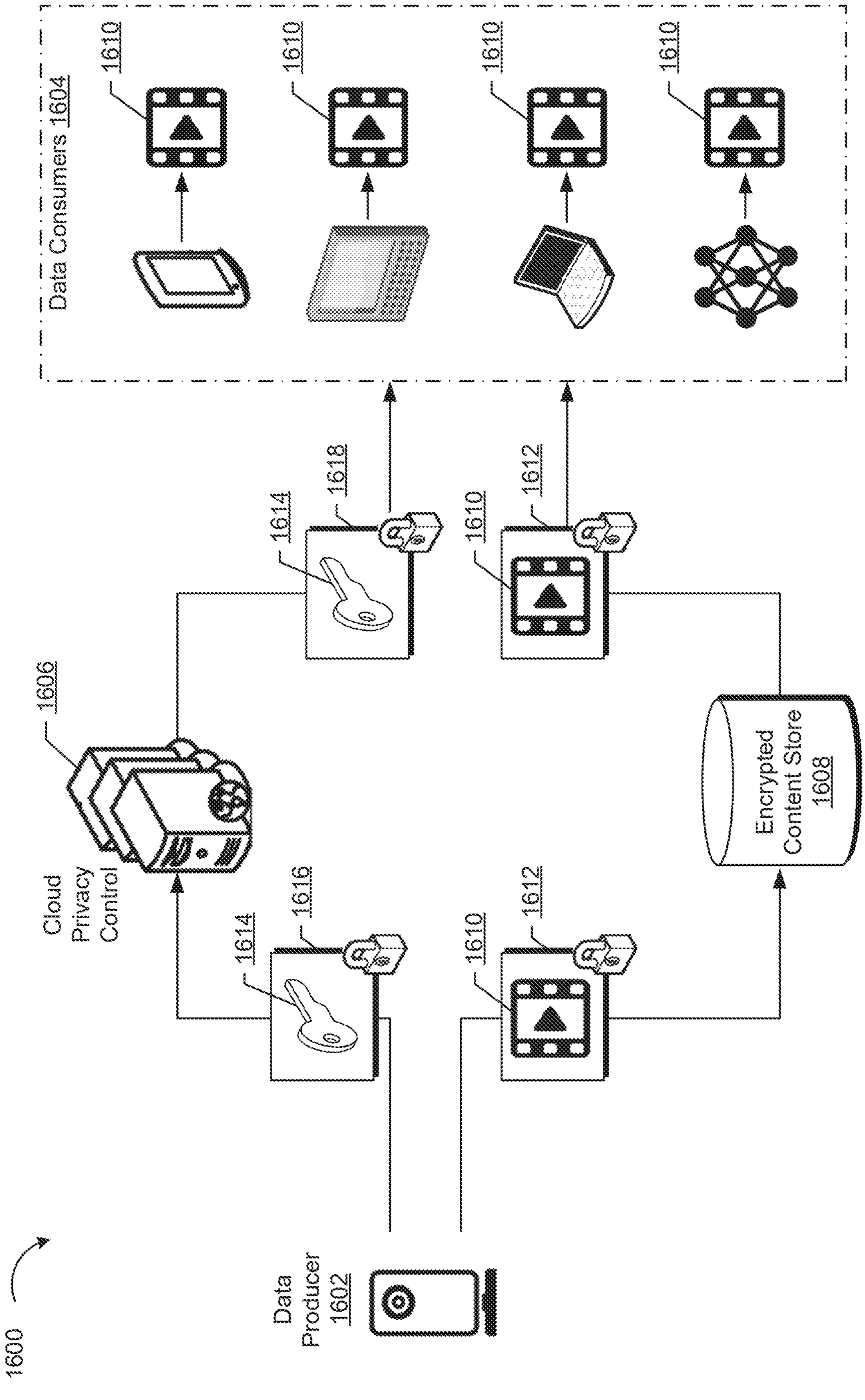
FIG. 16 illustrates a computing environment 1600 depicting the use of an at-rest content protection protocol, in accordance with one or more example embodiments of the present disclosure.

FIG. 16 illustrates a computing environment 1600 depicting the use of an at-rest content protection protocol, in accordance with one or more example embodiments of the present disclosure.

According to at least one embodiment of the present disclosure, a computing environment 1600 for implementing an in-transit content protection protocol that comprises: data producer 1602; data consumers 1604; cloud privacy control 1606; encrypted content store 1608; content 1610 (e.g., sensitive data); encrypted content 1612; content encryption key 1614; first encrypted content encryption key 1616; and second encrypted content encryption key 1618. FIG. 16 depicts an illustrative, non-limiting, example of a computing environment 1600, and various other embodiments comprising greater or fewer components relative to those depicts in FIG. 16 are also contemplated within the scope of this disclosure.

Techniques described herein relate to protocols for cryptographically protecting at-rest content (e.g., content 1610), according to at least one embodiment of the present disclosure. In various embodiments, techniques described herein can be utilized to allow customers to grant authorization to a cloud service to perform various workloads in a confidential manner, such that the cloud service itself—outside of a protected execution environment with a predefined set of capabilities for performing the desired workload—is unable to access the customer's data. As an illustrative, non-limiting example, a customer may have a home security camera that acts as a data producer. The customer can grant authorizations to data consumers 1604 to access content 1610 generated by the data producers. In this example, the home security camera (e.g., data producer 1602) may generate a video feed (e.g., content 1610) that is distributed to the customer's smartphone applications (e.g., a data consumer) where the customer can view the feed, remotely interact with a delivery agent, and more. In various embodiments, cloud-based data consumers 1604 are able to provide various capabilities. For example, within a cloud service provider environment, there may be additional computing resources that can be leveraged to perform various tasks for the customer. One such example is the ability to perform computer vision machine-learning (CVML) workloads, leveraging highly complex artificial intelligence (AI) models to perform various tasks. For instance, a customer's home security camera may send a video feed to a cloud-based data consumer that analyzes the video feed to determine the occurrence of various events, such as to determine if a package has been delivered, if a pet has walked across the lawn, and more. In various embodiments, AI models can be used to identify when a known individual (e.g., a child or relative) has arrived. Accordingly, it may be the case that providing additional context around these events is beneficial—however, customers may also wish to have assurances that when a cloud-based data consumer is authorized, the content 1610 that it receives from data producers is not misused, mishandled, or divulged, either intentionally or by accident. One such way of ensuring the confidentiality of content 1610 is to encrypt the content 1610 using cryptographic material that is kept secret from unauthorized entities.

To this end, this disclosure provides techniques to implement at-rest content protection protocols enhance the protection of data and provide improved privacy within the context of a cloud-based environment. In a cloud-based environment, customers may wish to have greater assurances that any sensitive data controlled by the user is not impermissibly accessed—this may include assurances that the cloud is only able to access the customer's data for authorized purposes. An at-rest content protection protocol described herein may provide cryptographically verifiable assurances that limit the usage of customer content (e.g., sensitive data) within the context of a cloud environment. In various embodiments, customer-defined policies control the access and usage of data. For instance, a cloud-based privacy control system may allow for customers to generate, manage, and use encryption keys in the cloud that enhance the security of data (e.g., sensitive content) that is stored in the cloud.

Customers can define and/or manage the usage of encryption keys used in the context of an at-rest content protection platform. Techniques described herein may be utilized to provide cryptographically verifiable assurances that customer-owned and/or -defined content is securely stored in a cloud service environment, and that the content is only accessible by authorized devices, systems and services. For instance, the customer is able to off-load certain computationally intensive operations—such as data encryption—to the cloud. This can allow for devices with limited compute and/or cryptographic capabilities to implement functionality that they would not otherwise have been able to. For instance, certain devices may be computationally limited, such as Internet-of-Things (IoT) sensors. These sensors may collect data on their surrounding environments and provide a real-time stream of sensor data to several data consumers 1604 that can use this real-time data stream for various purposes. For example, a moisture sensor may be used to determine the presence of water in a desiccator. For example, various types of sensors, vibration, force, and load sensors may be used to monitor an elevator to ensure proper operation. In various embodiments, it is important to receive data streams from such sensors in real-time or near real-time. However, such sensors may be limited in computational abilities, such that they are able to encrypt and transit one stream of sensor data to provide to a data consumer, but may not be capable of generating a large number of parallel encrypted data streams when there are a large number of data consumers.

According to at least one embodiment of the present disclosure, an at-rest content protection protocol performs early binding that enforces privacy controls at the time of data generation. In at least one embodiment, a cloud-based privacy control system obtains or otherwise determines a content encryption key 1614. In various embodiments, a content producer 1602 uses an in-transit content protection protocol to securely transfer a customer-owned content encryption key (CEK) to the cloud privacy control 1606. For instance, techniques described in connection with some or all of FIG. 10 through FIG. 15 may be implemented whereby a first encrypted content encryption key 1616 is determined and transmitted to cloud privacy control 1606 via a protected communications session established according to an in-transit content protection protocol. In various embodiments, the cloud privacy control 1606 is hosted on a cloud parent instance which includes untrusted components. In this context, untrusted components may refer to software and/or hardware that is not authorized to access or otherwise utilize the CEK. Examples of untrusted components may include the host operating system and other applications of the host system that are not explicitly authorized by the customer to use (e.g., read, write, update, delete) the CEK or other customer-related content. In various embodiments, the cloud-based privacy control system is running within a protected execution environment (e.g., enclave) that protects the CEK from unauthorized access.

Continuing with early bind privacy controls, in various embodiments, the cloud privacy control (CPC) will determine a list of authorized data consumers, recipients, receivers, etc. In various embodiments, the CPC determines the list of authorized data consumers 1604 from a policy system of a cloud service provider that records the authorizations that a user has grants. For instance, a user many grant authorizations to multimodal devices, mobile applications, cloud-based services, and more. Upon determination of a list of authorized entities, the CPC may determine, for each of the authorized entities, a corresponding identity key (e.g., public key), thereby producing an encrypted content encryption key (ECEK). Each ECEK may then be again encrypted using a data key associated with the CPC to produce a double encrypted content encryption key (DECEK) for each of the authorized entities. In various embodiments, the data key may be referred to as a key vault key. In some embodiments, the data key has a KeyID and cryptographic operations utilizing the data key are performed by a cryptography service that securely manages the data key. The DECEKs may be persisted in a cipher store, where it can be later retrieved for use by the corresponding authorized entities to gain access to produced content.

In various embodiments data producers will produce content. Content 1610 may refer to videos, audio, phone calls, text messages, sensor data, or any data that a data owner wishes to deem as being sensitive data. In various embodiments, the customer is able to specify entities that are authorized to access the sensitive data. Generally speaking, a deny-by-default posture may be taken so that such data or content is generally inaccessible to an entity or component unless an explicit authorization has been given by the content owner (e.g., customer). In various embodiments, a data producer 1602 encrypts content 1610 (e.g., sensitive data) using the content encryption key 1614 to produce encrypted content 1612. Encrypted content 1612 may be transmitted to a cloud-based data store, where it can be subsequently retrieved. Although the encrypted content 1612 is made available to the cloud environment, the privacy of the underlying content 1610 is still assured—the cloud environment at large (unless explicitly authorized) lacks access to sufficient cryptographic material to decipher the encrypted content 1612. For example, even host machines and host operating systems of the cloud privacy control 1606 lack access to sufficient cryptographic material for determining the underlying content 1610, according to at least one embodiment of the present disclosure. In embodiments, privacy control operations are performed within the confines of a protected execution environment (e.g., enclave) such that untrusted entities—which can even include the operating system of the system hosting the protected execution environment—are unable to access, view, modify, or control the execution of code and/or data of the protected execution environment. In various embodiments, the content encryption key 1614 is known to the data producer 1602, a cloud privacy control 1606 running within a protected execution environment, and one or more data consumers as defined by the customer's control policies. In various embodiments, encrypted content 1612 is persisted in an encrypted content store 1608 where it can be later retrieved, for example, using a resource identifier, locator, name, or other suitable resolution mechanism. Encrypted content store 1608 may be implemented in accordance with various data storage systems, devices, services, etc.

At a subsequent point in time, authorized entities can consume the encrypted content 1612. In various embodiments, a consumer entity submits a request to cloud privacy control 1606 for access to content 1610. In various embodiments, the CPC determines whether the requesting entity is an authorized entity to access the requested content 1610. If a positive determination is made, the CPC may retrieve the DECEK that was encrypted using the requesting entity's identity public key and again encrypted using the CPC's data key. The DECEK may be decrypted using the CPC's data key (e.g., via a Decrypt( ) request being processed by a cryptography service), thereby producing a ECEK that was encrypted using the requesting entity's public key. The ECEK (depicted as second encrypted content encryption key 1618 in FIG. 16) may be provided to the requestor. In various embodiments, a manifest or other information regarding where to retrieve the encrypted content 1612 is also provided by CPC to the requesting consumer. In various embodiments, the requesting entity decrypts the ECEK using its identity private key, thereby producing a plaintext CEK. The consumer may retrieve the encrypted content 1612 and then decrypt the encrypted content 1612 using the CEK, thereby producing plaintext content 1610 that is accessible by the consumer.

According to at least one embodiment of the present disclosure, an at-rest content protection protocol performs late binding privacy that enforces privacy controls at the time of data consumption. In at least one embodiment, a cloud-based privacy control system obtains or otherwise determines a content encryption key 1614. In various embodiments, a content producer 1602 uses an in-transit content protection protocol to securely transfer a customer-owned content encryption key (CEK) to the cloud privacy control 1606. For instance, techniques described in connection with some or all of FIG. 10 through FIG. 15 may be implemented whereby a first encrypted content encryption key 1616 is determined and transmitted to cloud privacy control 1606 via a protected communications session established according to an in-transit content protection protocol. In various embodiments, the cloud privacy control 1606 is hosted on a cloud parent instance which includes untrusted components. In this context, untrusted components may refer to software and/or hardware that is not authorized to access or otherwise utilize the CEK. Examples of untrusted components may include the host operating system and other applications of the host system that are not explicitly authorized by the customer to use (e.g., read, write, update, delete) the CEK or other customer-related content. In various embodiments, the cloud-based privacy control system is running within a protected execution environment (e.g., enclave) that protects the CEK from unauthorized access.

Continuing with late bind privacy controls, in various embodiments, the cloud privacy control (CPC) encrypts the CEK using a data key associated with the CPC to produce a double encrypted content encryption key (DECEK) for each of the authorized entities. In various embodiments, the data key may be referred to as a key vault key. In some embodiments, the data key has a KeyID and cryptographic operations utilizing the data key are performed by a cryptography service that securely manages the data key. The DECEKs may be persisted in a cipher store, where it can be later retrieved for use by the corresponding authorized entities to gain access to produced content 1610.

In various embodiments data producers will produce content 1610. Content 1610 may refer to videos, audio, phone calls, text messages, sensor data, or any data that a data owner wishes to deem as being sensitive data. In various embodiments, the customer is able to specify entities that are authorized to access the sensitive data. Generally speaking, a deny-by-default posture may be taken so that such data or content is generally inaccessible to an entity or component unless an explicit authorization has been given by the content owner (e.g., customer). In various embodiments, a data producer 1602 encrypts content 1610 (e.g., sensitive data) using the content encryption key 1614 to produce encrypted content 1612. Encrypted content 1612 may be transmitted to a cloud-based data store, where it can be subsequently retrieved. Although the encrypted content 1612 is made available to the cloud environment, the privacy of the underlying content 1610 is still assured—the cloud environment at large (unless explicitly authorized) lacks access to sufficient cryptographic material to decipher the encrypted content 1612. For example, even host machines and host operating systems of the cloud privacy control 1606 lack access to sufficient cryptographic material for determining the underlying content 1610, according to at least one embodiment of the present disclosure. In embodiments, privacy control operations are performed within the confines of a protected execution environment (e.g., enclave) such that untrusted entities—which can even include the operating system of the system hosting the protected execution environment—are unable to access, view, modify, or control the execution of code and/or data of the protected execution environment. In various embodiments, the content encryption key 1614 is known to the data producer 1602, a cloud privacy control 1606 running within a protected execution environment, and one or more data consumers as defined by the customer's control policies. In various embodiments, encrypted content 1612 is persisted in an encrypted content store 1608 where it can be later retrieved, for example, using a resource identifier, locator, name, or other suitable resolution mechanism. Encrypted content store 1608 may be implemented in accordance with various data storage systems, devices, services, etc.

At a subsequent point in time, authorized entities can consume the encrypted content 1612. In various embodiments, a consumer entity submits a request to cloud privacy control 1606 for access to content 1610. In various embodiments, the CPC determines whether the requesting entity is an authorized entity to access the requested content 1610. In various embodiments, the CPC determines a list of authorized data consumers, recipients, receivers, etc. In various embodiments, the CPC determines the list of authorized data consumers 1604 from a policy system of a cloud service provider that records the authorizations that a user has grants. For instance, a user many grant authorizations to multimodal devices, mobile applications, cloud-based services, and more. Upon determination of a list of authorized entities, the CPC may determine, for each of the authorized entities, a corresponding identity key (e.g., public key), thereby producing an encrypted content encryption key (ECEK). If a positive determination is made with respect to the requesting entity, the CPC may retrieve the DECEK that was encrypted using the requesting entity's identity public key and again encrypted using the CPC's data key. The DECEK may be decrypted using the CPC's data key (e.g., via a Decrypt( ) request being processed by a cryptography service), thereby producing a ECEK that was encrypted using the requesting entity's public key. The ECEK (depicted as second encrypted content encryption key 1618 in FIG. 16) may be provided to the requestor. In various embodiments, a manifest or other information regarding where to retrieve the encrypted content 1612 is also provided by CPC to the requesting consumer. In various embodiments, the requesting entity decrypts the ECEK using its identity private key, thereby producing a plaintext CEK. The consumer may retrieve the encrypted content 1612 and then decrypt the encrypted content 1612 using the CEK, thereby producing plaintext content that is accessible by the consumer.

While the terms "consumer" and producer" are described throughout this disclosure in relation to various computing entities (hardware devices, cloud-based services, etc.), it should be noted that such designations are determined based on the entities roles within a particular workflow or process. For instance, a multimodal device can, in some embodiments, simultaneously be a data consumer with respect to one workflow and a data producer with respect to another—as an example, the multimodal device may be a data consumer with respect to a video feed that it securely receives from a home security camera showing a delivery agent arriving with a package for a customer. The multimodal device can simultaneously be a data producer by recording utterances by the customer "Hey Alexa, open my garage door for the delivery agent" to control a smart home device.

Various privacy goals may be implemented, in accordance with one or more embodiments described herein. A privacy goal that can be implemented is that the user (e.g., customer) has sole access to content—that is, the user's content (e.g., past and present) can only be accessed by the user and/or participants that the user has granted authorization to. These authorized participants may include devices, other users, or authorized cloud-based services/workloads. A privacy goal that can be implemented is sole authorization and/or revocation control by the user—that is, access control to content by participants can only be authorized or revoked by the content owner. A privacy goal that can be implemented is that when a participant's access to content is revoked, the revoked participant will no longer have access to the content. A privacy goal that can be implemented is minimization in time, such that the user's authorized participants will only have access to content on an as-needed basis. Outside of this need, they will not have access to the content. A privacy goal that can be implemented is minimization in space, such that the user's authorized participants will only have access to the content and they will never store or send the accessed content in any manner that could be accessible by unauthorized entities. A privacy goal that can be implemented is transparency, such that the user will always be able to find out why, when, and who has access to the content. A privacy goal that can be implemented is privacy compromise mitigation, such that if any of the participants authorized by the user is compromised, the user is able to revoke content access from them remotely.

Figure 17:
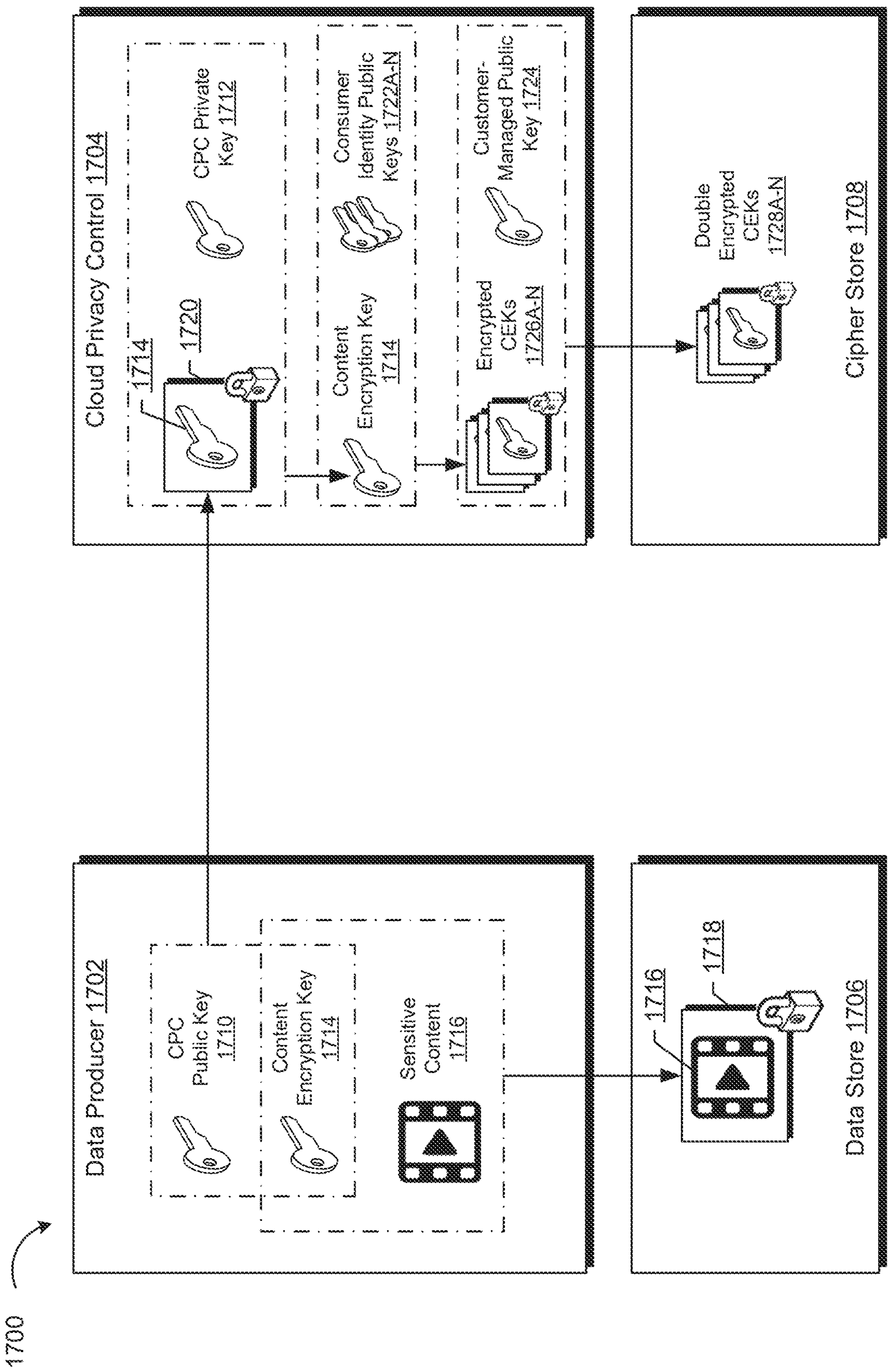
FIG. 17 illustrates a computing environment 1700 depicting data production according to an early binding at-rest content protection protocol, in accordance with one or more example embodiments of the present disclosure.

FIG. 17 illustrates a computing environment 1700 depicting data production according to an early binding at-rest content protection protocol, in accordance with one or more example embodiments of the present disclosure.

According to at least one embodiment of the present disclosure, a computing environment 1700 for implementing an early binding at-rest content protection protocol that comprises: data producer 1702; cloud privacy control 1704; data store 1706; cipher store 1708; cloud privacy control public key 1710 (CPC public key); cloud privacy control private key 1712 (CPC public key); content encryption key 1714 (CEK); sensitive content 1716; encrypted sensitive content 1718; encrypted content encryption key 1720 (ECEK); consumer identity public keys 1722A-N; customer managed public key 1724; encrypted content encryption keys 1726A-N (ECEKs); and double encrypted content encryption keys 1728A-N (DECEKs). FIG. 17 depicts an illustrative, non-limiting, example of a computing environment 1700, and various other embodiments comprising greater or fewer components relative to those depicts in FIG. 17 are also contemplated within the scope of this disclosure. In various embodiments, embodiments described in connection with FIG. 17 may be utilized in connection with data consumption techniques described in connection with FIG. 18.

In various embodiments, data producer 1702 is a device owned, controlled, managed, etc. by a customer. In various embodiments, data producer 1702 generates, produces, or otherwise determines sensitive content 1716. Sensitive content 1716 may be any content whose access is controlled by the customer. An example sensitive content 1716 can be a video feed from a customer's home security system, utterances collected by a multimodal device, or any other data that is collected by the customer's device, which is deemed sensitive by the customer.

In various embodiments, data producer 1702 generates or otherwise determines a content encryption key 1714. In various embodiments, a CEK is generated by data producer 1702 and is securely shared with cloud privacy control 1704. For instance, CEK may be securely shared with cloud privacy control 1704 using an in-transit content protection protocol that is described in accordance with one or more of FIG. 10 to FIG. 16. For instance, an encrypted content encryption key 1720 may be determined based at least in part on CPC public key 1710 and content encryption key 1714 using an Elliptic Curve Diffie-Hellman (ECDH) algorithm. In various embodiments, CPC public key 1710 and CPC private key 1712 are session-based ephemeral keys.

Regardless of the manner in which the CEK is determined, data producer 1702 may transmit the encrypted content encryption key 1720 to cloud privacy control 1704. The encrypted content encrypt key 1720 may be received by cloud privacy control 1704, which is able to perform a decryption operation based at least in part on the CPC private key 1712 to determine the plaintext content encryption key 1714. The CEK may be inaccessible to parties other than authorized entities, such as the cloud privacy control and one or more data producers. In various embodiments, a customer has full control over the list of entities that has control of the CEK and, consequently, the ability to determine sensitive content 1716 from encrypted sensitive content 1718.

Continuing with FIG. 17, cloud privacy control 1704 may determine a list of authorized entities. The authorized entities may be entities that are authorized by the customer to access sensitive content 1716. In various embodiments, a policy system or service is referenced to determine the list of authorized entities. For each authorized entity, a corresponding identity public key may be determined, which is depicted in FIG. 17 as consumer identity public keys 1722A-N. In various embodiments, cloud privacy control 1704 determines a set of consumer identity public keys (e.g., consumer identity public keys 1722A-N depicted in FIG. 17) and performs an encryption operation on the content encryption key 1714 using each public key in the set, thereby producing encrypted content encryption keys 1726A-N. For instance, the CEK may be encrypted using first consumer identity public key 1722A to produce first ECEK 1726A, the CEK may be encrypted using second consumer identity public key 1722B to produce second ECEK 1726B, and so on and so forth. Each of these ECEKs can be decrypted using the corresponding consumer identity private keys.

Returning to FIG. 17, cloud privacy control 1704 will encrypt each of the ECEKs to a customer-managed public key 1724. For instance, cloud privacy control 1704 may submit a first encryption request to cryptography service that causes cryptography service to perform a first encryption operation on first ECEK 1726A using customer-managed public key 1724, thereby producing a first DECEK 1728A, submit a second encryption request to cryptography service that causes cryptography service to perform a second encryption operation on second ECEK 1726B using customer-managed public key 1724, thereby producing a second DECEK 1728B, and so on and so forth. Upon determination of the corresponding set of DECEKs 1728A-N from ECEKs 1726A-N, the DECEKs 1728A-N may be persisted in a cipher store 1708. In various embodiments, the DECEKs 1728A-N can be later retrieved for one or more data consumer to decipher encrypted content 1718.

In various embodiments, a customer-managed private key corresponding to customer-managed public key 1724 can be directly controlled by the customer. For instance, if the customer wishes to revoke access to the sensitive content 1716, the customer can command the cryptography service to electronically shred the private key corresponding to customer-managed public key 1724. As a result, it will be infeasible to determine any of the ECEKs from the DECEKs in cipher store 1708, and as an extension, also infeasible to determine the underly CEK.

Data producer 1702 may generate sensitive content 1716 and encrypt the sensitive content 1716 using content encryption key 1714 to produce encrypted sensitive content 1718. In various embodiments, encrypted sensitive content 1718 is persisted in data store 1706. In various embodiments, encrypted sensitive content 1718 can be later retrieved for one or more data consumer for consumption.

Figure 18:
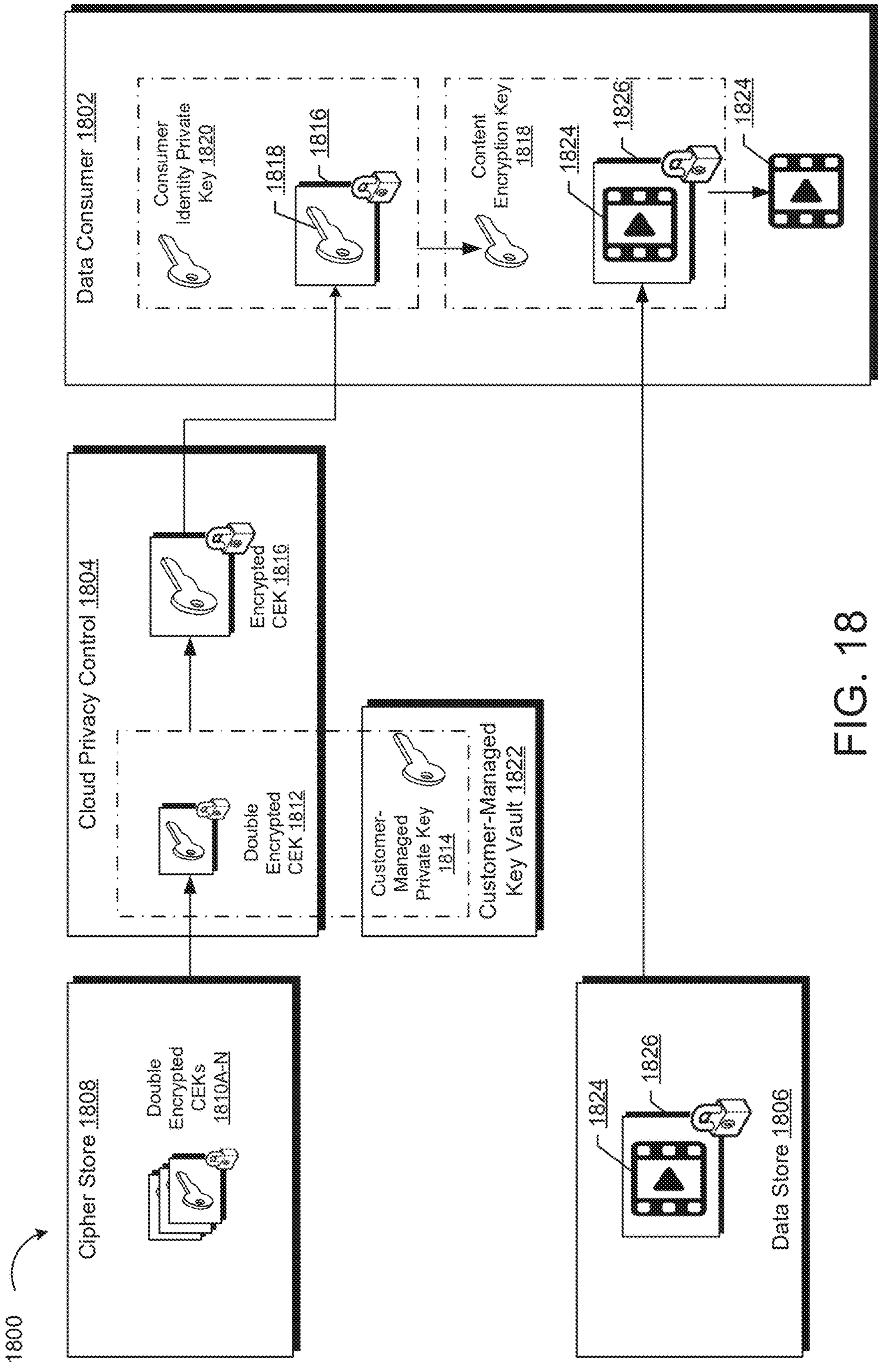
FIG. 18 illustrates a computing environment 1800 depicting data consumption according to an early binding at-rest content protection protocol, in accordance with one or more example embodiments of the present disclosure.

FIG. 18 illustrates a computing environment 1800 depicting data consumption according to an early binding at-rest content protection protocol, in accordance with one or more example embodiments of the present disclosure.

According to at least one embodiment of the present disclosure, a computing environment 1800 for implementing an early binding at-rest content protection protocol that comprises: data consumer 1802; cloud privacy control 1804; data store 1806; cipher store 1808; double encrypted content encryption keys 1810A-N; double encrypted content encryption key 1812 associated with data consumer 1802; customer-managed private key 1814; encrypted content encryption key 1816 associated with data consumer 1802; content encryption key 1818; consumer private key 1820; customer-managed key vault 1822; sensitive content 1824; and encrypted sensitive content 1826. FIG. 18 depicts an illustrative, non-limiting, example of a computing environment 1800, and various other embodiments comprising greater or fewer components relative to those depicts in FIG. 18 are also contemplated within the scope of this disclosure. In various embodiments, embodiments described in connection with FIG. 18 may be utilized in connection with data production techniques described in connection with FIG. 17.

In various embodiments, data consumer 1802 submits a request to cloud privacy control 1804 to access sensitive content. For example, data consumer 1802 may coordinate with cloud privacy control 1804 to obtain sufficient cryptographic material to decipher encrypted content 1826. In some embodiments, data consumer 1802 also coordinates with cloud privacy control 1804 to obtain encrypted sensitive content 1826 (e.g., from a manifest that cloud privacy control 1804 provides to data consumer 1802).

Cloud privacy control 1804 may receive a request from data consumer 1802 to access sensitive content 1824 and validate whether data consumer 1802 is authorized to access to access the content. In various embodiments, an early bind protocol makes the determination as to whether the requesting entity is authorized to access the content based on the authorizations that exist at the time of data generation, rather than when the request is made. Assuming that a positive determination is made, the cloud privacy control 1804 proceeds with obtaining a double encrypted content encryption key 1812 from cipher store 1808. Cipher store 1808 may have a plurality of double encrypted CEKs 1810A-N. Cloud privacy control 1804 may query cipher store 1808 for a particular DECEK that is associated with data consumer 1802. This DECEK is denoted as DECEK 1812. In various embodiments, cloud privacy control 1804 will submit a request to customer-managed key vault 1822 to decrypt the DECEK 1812 using customer-managed private key 1814, thereby producing ECEK 1816. In various embodiments, the customer-managed key vault is an off-site key vault, a service operated, owned, controlled, or otherwise managed by the customer, etc. In various embodiments, the customer can manage access and/or use of customer-managed private key 1814 via customer-managed key vault 1822 directly. For example, a customer can unilaterally shred the customer-managed private key 1814 to revoke access to sensitive content 1824. Electronically shredding customer-managed private key 1814 may be viewed as effectively destroying or shredding a customer-managed key, as doing so effectively makes ciphertexts and other cryptographic data generated by any corresponding customer-managed public key unrecoverable. In various embodiments, customer-managed key vault 1822 can apply its own policies to grant or deny access to the ECEK 1816 and, consequently, the sensitive content 1824. The ECEK 1816 may be provided to data consumer 1802. As discussed above, encrypted content encryption key 1816 is encrypted using the customer's identity public key, which has a corresponding consumer identity private key 1820 that is kept secret by data consumer 1802 and not shared with other entities depicted in FIG. 18. In various embodiments, ECEK 1816 is transmitted to data consumer 1802. Data consumer 1802 uses consumer identity private key 1820 to decrypt ECEK 1816, thereby producing content encryption key 1818.

Sensitive content 1824 may be determined using the content encryption key 1818. In various embodiments, data consumer 1802 obtains, retrieves, or otherwise determines encrypted sensitive content 1826, for example, from data store 1806. Data consumer 1802 may then decrypt the encrypted sensitive content 1826 using content encryption key 1818, thereby producing sensitive content 1824 in plaintext. In various embodiments, data consumer 1802 can then perform various authorized workloads using the plaintext sensitive content 1824, such as to present it to a customer device, perform computer vision machine-learning (CVML) monitoring, and so on and so forth.

Figure 19:
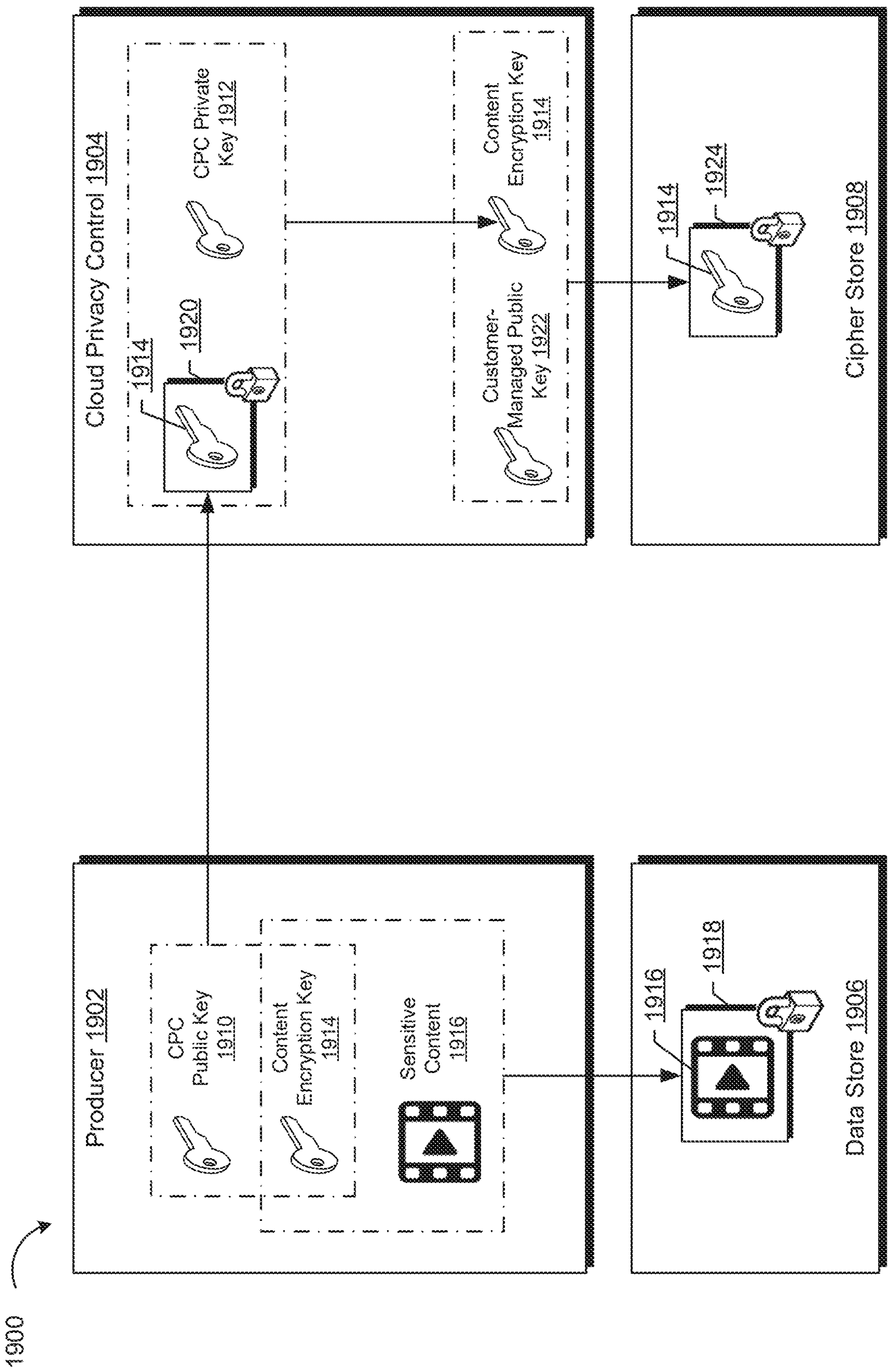
FIG. 19 illustrates a computing environment 1900 depicting data production according to a late binding at-rest content protection protocol, in accordance with one or more example embodiments of the present disclosure.

FIG. 19 illustrates a computing environment 1900 depicting data production according to a late binding at-rest content protection protocol, in accordance with one or more example embodiments of the present disclosure.

According to at least one embodiment of the present disclosure, a computing environment 1900 for implementing a late binding at-rest content protection protocol that comprises: data producer 1902; cloud privacy control 1904; data store 1906; cipher store 1908; cloud privacy control public key 1910 (CPC public key); cloud privacy control private key 1912 (CPC public key); content encryption key 1914 (CEK); sensitive content 1916; encrypted sensitive content 1918; encrypted content encryption key 1920; customer managed public key 1922; encrypted content encryption key 1924 (ECEK). FIG. 19 depicts an illustrative, non-limiting, example of a computing environment 1900, and various other embodiments comprising greater or fewer components relative to those depicts in FIG. 19 are also contemplated within the scope of this disclosure. In various embodiments, embodiments described in connection with FIG. 17 may be utilized in connection with data consumption techniques described in connection with FIG. 18.

In various embodiments, data producer 1902 is a device owned, controlled, managed, etc. by a customer. In various embodiments, data producer 1902 generates, produces, or otherwise determines sensitive content 1916. Sensitive content 1916 may be any content whose access is controlled by the customer. An example sensitive content 1916 can be a video feed from a customer's home security system, utterances collected by a multimodal device, or any other data that is collected by the customer's device, which is deemed sensitive by the customer.

In various embodiments, data producer 1902 generates or otherwise determines a content encryption key 1914. In various embodiments, a CEK is generated by data producer 1902 and is securely shared with cloud privacy control 1904. For instance, CEK may be securely shared with cloud privacy control 1904 using an in-transit content protection protocol that is described in accordance with one or more of FIG. 10 to FIG. 16. For instance, an encrypted content encryption key 1920 may be determined based at least in part on CPC public key 1910 and content encryption key 1914 using an Elliptic Curve Diffie-Hellman (ECDH) algorithm. In various embodiments, CPC public key 1910 and CPC private key 1912 are session-based ephemeral keys.

Regardless of the manner in which the CEK is determined, data producer 1902 may transmit the encrypted content encryption key 1920 to cloud privacy control 1904. The encrypted content encrypt key 1920 may be received by cloud privacy control 1904, which is able to perform a decryption operation based at least in part on the CPC private key 1912 to determine the plaintext content encryption key 1914. The CEK may be inaccessible to parties other than authorized entities, such as the cloud privacy control and one or more data producers. In various embodiments, a customer has full control over the list of entities that has control of the CEK and, consequently, the ability to determine sensitive content 1916 from encrypted sensitive content 1918.

Continuing with FIG. 19, cloud privacy control 1904 may encrypt the content encryption key 1914 to a customer-managed public key 1922. In various embodiments, this is accomplished by submitting a request to cryptography service to encrypt the content encryption key 1914. Upon determination of the corresponding ECEK 1924, cloud privacy control 1904 may persist the ECEK 1924 in data store 1908. In various embodiments, ECEK 1924 can be later retrieved for one or more data consumer to decipher encrypted content 1918.

In various embodiments, a customer-managed private key corresponding to customer-managed public key 1922 can be directly controlled by the customer. For instance, if the customer wishes to revoke access to the sensitive content 1916, the customer can command the key vault or cryptography service that securely stores the customer-managed private key to electronically shred customer-managed private key. As a result, it will be infeasible to determine content encryption key 1914 from ECEK 1924 in cipher store 1908.

Data producer 1902 may generate sensitive content 1916 and encrypt the sensitive content 1916 using content encryption key 1914 to produce encrypted sensitive content 1918. In various embodiments, encrypted sensitive content 1918 is persisted in data store 1906. In various embodiments, encrypted sensitive content 1918 can be later retrieved for one or more data consumer for consumption.

Figure 20:
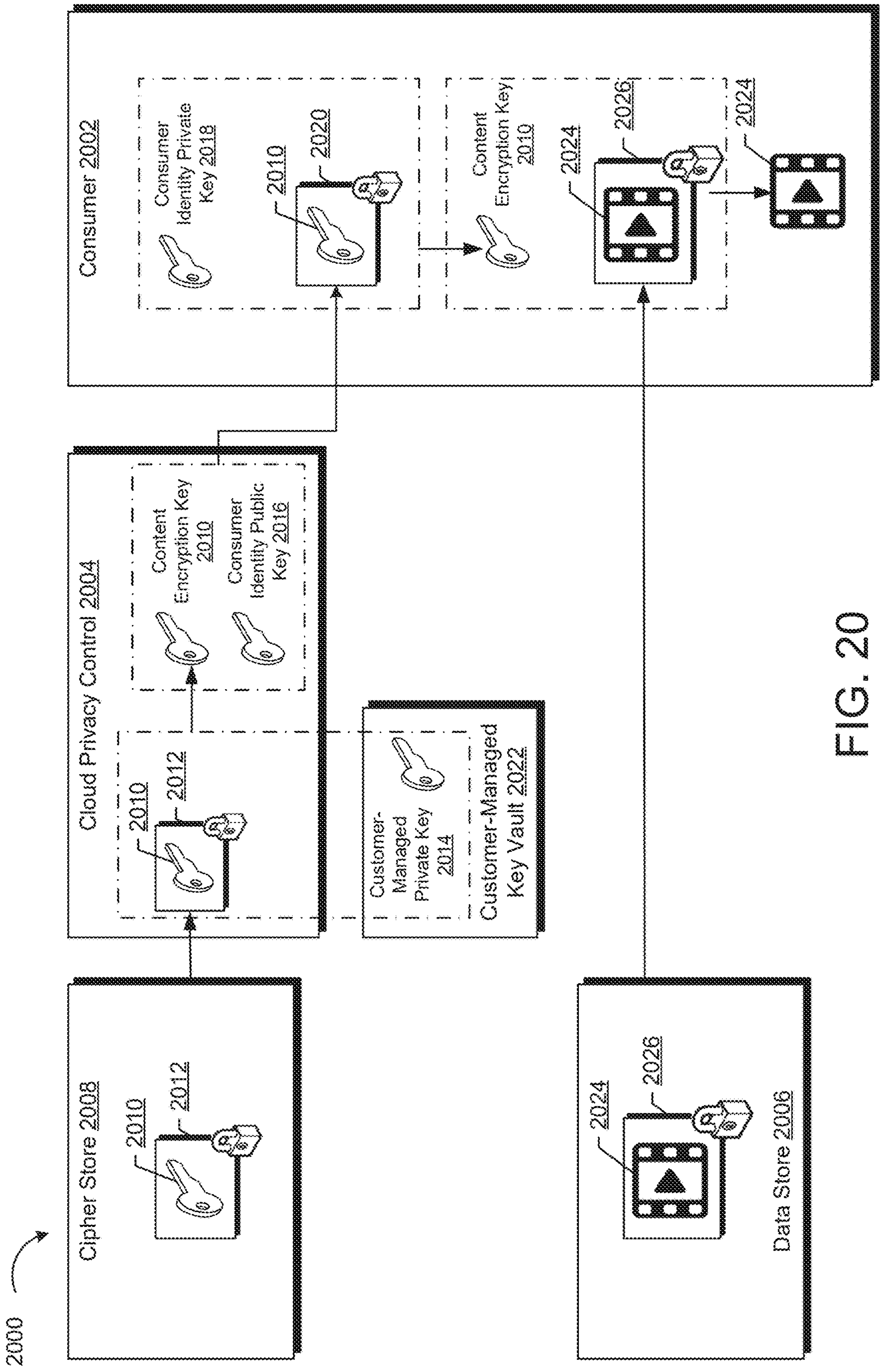
FIG. 20 illustrates a computing environment 2000 depicting data consumption according to a late binding at-rest content protection protocol, in accordance with one or more example embodiments of the present disclosure.

FIG. 20 illustrates a computing environment 2000 depicting data consumption according to a late binding at-rest content protection protocol, in accordance with one or more example embodiments of the present disclosure.

According to at least one embodiment of the present disclosure, a computing environment 2000 for implementing a late binding at-rest content protection protocol that comprises: data consumer 2002; cloud privacy control 2004; data store 2006; cipher store 2008; content encryption key 2010; encrypted content encryption key 2012 (ECEK) associated with data consumer 2002; customer-managed public key 2014; consumer identity public key 2016; consumer identity private key 2018; encrypted content encryption key 2020; customer-managed key vault 2022; sensitive content 2024; and encrypted sensitive content 2026. FIG. 20 depicts an illustrative, non-limiting, example of a computing environment 2000, and various other embodiments comprising greater or fewer components relative to those depicts in FIG. 20 are also contemplated within the scope of this disclosure. In various embodiments, embodiments described in connection with FIG. 20 may be utilized in connection with data production techniques described in connection with FIG. 19.

In various embodiments, data consumer 2002 submits a request to cloud privacy control 2004 to access sensitive content. For example, data consumer 2002 may coordinate with cloud privacy control 2004 to obtain sufficient cryptographic material to decipher encrypted content 2026. In some embodiments, data consumer 2002 also coordinates with cloud privacy control 2004 to obtain encrypted sensitive content 2026 (e.g., from a manifest that cloud privacy control 2004 provides to data consumer 2002).

Cloud privacy control 2004 may receive a request from data consumer 2002 to access sensitive content 2024 and validate whether data consumer 2002 is authorized to access to access the content. In various embodiments, a late binding protocol makes the determination as to whether the requesting entity is authorized to access the content based on the authorizations that exist at the time the consumption request is made, rather than when the content was generated. Assuming that a positive determination is made, the cloud privacy control 2004 proceeds with obtaining encrypted content encryption key 2012 from cipher store 2008. Cipher store 2008 may have a plurality of ECEKs. Cloud privacy control 2004 may query cipher store 2008 for a particular ECEK that is associated with data consumer 2002. This ECEK is denoted as ECEK 2012. CPC 2004 may submit a request to customer-managed key vault 2022 to decrypt the ECEK 2012 using customer-managed private key 2014, thereby producing content encryption key 2010. In various embodiments, the customer-managed key vault is an off-site key vault, a service operated, owned, controlled, or otherwise managed by the customer, etc. In various embodiments, the customer can manage access and/or use of customer-managed private key 2014 via customer-managed key vault 2022 directly. For example, a customer can unilaterally shred the customer-managed private key 2014 to revoke access to sensitive content 2024. Electronically shredding customer-managed private key 2014 may be viewed as effectively destroying or shredding a customer-managed key, as doing so effectively makes ciphertexts and other cryptographic data generated by any corresponding customer-managed public key unrecoverable. In various embodiments, customer-managed key vault 2022 can apply its own policies to grant or deny access to the ECEK 2016 and, consequently, the sensitive content 2024. In various embodiments, content encryption key 2010 is encrypted using consumer identity public key 2016 to produce encrypted content encryption key 2020. The encrypted content encryption key 2020 may be provided to data consumer 2002. As discussed above, encrypted content encryption key 2016 is encrypted using the customer's identity public key, which has a corresponding consumer identity private key 2018 that is kept secret by data consumer 2002 and not shared with other entities depicted in FIG. 20. In various embodiments, encrypted content encryption key 2020 is transmitted to data consumer 2002. Data consumer 2002 uses consumer identity private key 2020 to decrypt encrypted content encryption key 2020, thereby producing content encryption key 2010.

Sensitive content 2024 may be determined using the content encryption key 2010. In various embodiments, data consumer 2002 obtains, retrieves, or otherwise determines encrypted sensitive content 2026, for example, from data store 2006. Data consumer 2002 may then decrypt the encrypted sensitive content 2026 using content encryption key 2010, thereby producing sensitive content 2024 in plaintext. In various embodiments, data consumer 2002 can then perform various authorized workloads using the plaintext sensitive content 2024, such as to present it to a customer device, perform computer vision machine-learning (CVML) monitoring, and so on and so forth.

Variations of the techniques described in connection with FIGS. 16-20 are also contemplated within the scope of this disclosure. For example, various versions of the content encryption keys may be envelope encrypted (e.g., by producer device) using a customer-managed public key. By making this the first layer of encryption, access to the underlying CEK can effectively controlled by a customer-managed key vault that securely stores the corresponding customer-managed private key that is needed to decrypt any ciphertexts generated by the customer-managed public key. There are benefits and drawbacks to such approaches—one technical benefit is that the customer is able to unilaterally control access to sensitive content by any entities within the cloud service provider environment, as said environment would lack access to the private key material needed to decrypt an encrypted CEK generated using customer-managed public key. This would allow a customer-managed key vault to unilaterally apply its own access policies, revocations, grants, etc. However, this procedure would involve an additional service-like component in the form of a customer-managed key vault, and involves an expectation that the CPC or other consumer devices will have network connectivity with the customer-managed key vault.

Figure 21:
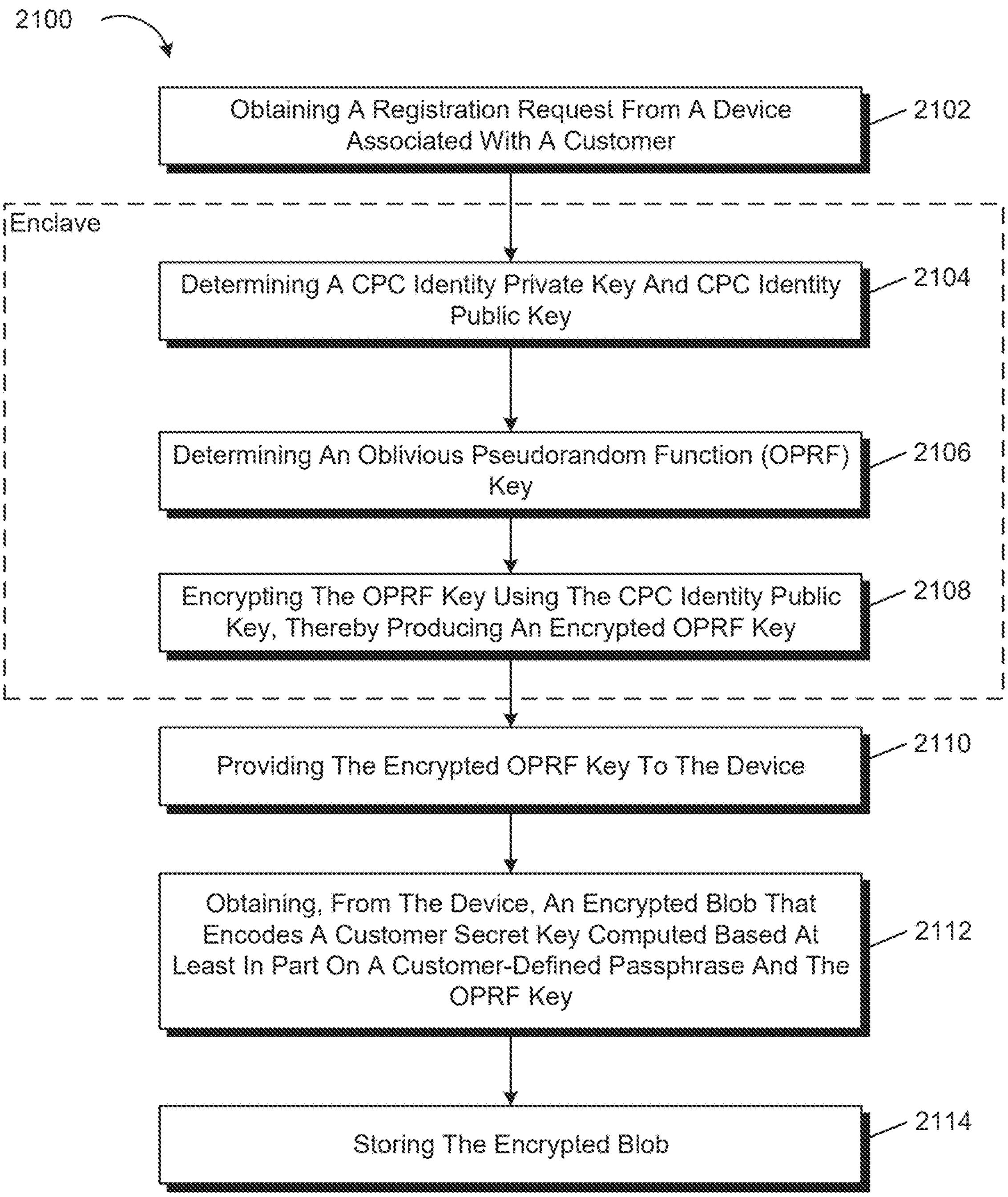
FIG. 21 shows an illustrative example of a process 2100 for an OPAQUE-based account registration process, in accordance with one or more example embodiments of the present disclosure.

FIG. 21 shows an illustrative example of a process 2100 for an OPAQUE-based account registration process, in accordance with one or more example embodiments of the present disclosure. In at least one embodiment, some or all of the process 2100 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 2100 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. In various embodiments, a system comprises one or more processors and memory storing executable instructions that, as a result of execution by the one or more processors, cause the system to perform some or all of the steps of process 2100. Process 2100 may be implemented in the context of various systems and methods described elsewhere in this disclosure, such as those discussed in connection with FIGS. 1-20 and 28. In at least one embodiment, process 2100 or a portion thereof is implemented by a computing resource service provider.

In at least one embodiment, process 2100 comprises a step 2102 for receiving a registration request from a device associated with a customer. In various embodiments, the request is obtained at a cloud parent instance and routed to a cloud privacy control running within a protected execution environment hosted on the cloud parent instance. In various embodiments, the customer chooses a passphrase that will be associated with the account.

In at least one embodiment, process 2100 comprises a step 2104 for determining a CPC identity private key and a CPC identity public key. In various embodiments, the CPC identity keys are determined according to a trusted setup process and/or a trusted retrieval process, for example, as discussed in connection with FIG. 2 and/or FIG. 3. In various embodiments, step 2104 is performed within the context of an enclave or other protected execution environment.

In at least one embodiment, process 2100 comprises a step 2106 for determining an oblivious pseudorandom function (OPRF) key. In various embodiments, an OPRF key is determined consistent with the requirements of an OPAQUE-based protocol, for example, as discussed in connection with FIG. 4. In various embodiments, step 2106 is performed within the context of an enclave or other protected execution environment.

In at least one embodiment, process 2100 comprises a step 2108 for encrypting the OPRF key using the CPC identity public key, thereby producing an encrypted OPRF key. The encrypted OPRF key may be stored for later retrieval by another CPC instance. In various embodiments, step 2108 is performed within the context of an enclave or other protected execution environment.

In at least one embodiment, process 2100 comprises a step 2110 for providing the encrypted OPRF key to the device. In various embodiments, the client constructs an export key form the passphrase and the OPRF key. In various embodiments, a customer secrets key 4 is created by the client and bundled with an enrollment authority CA signing key (EA-SK) in PKCS #12 format. The customer secrets key may then be encrypted using a symmetric export key to yield an encrypted blob. In various embodiments, the export key encrypts a credential (e.g., a randomly generated 256-bit key for the account).

In at least one embodiment, process 2100 comprises a step 2112 for obtaining, from the device, an encrypted blob that encodes a customer secret key computed based at least in part on a customer-defined passphrase and the OPRF key. In various embodiments, the cloud-based system that obtains the encrypted blob lacks sufficient cryptographic material to decipher the encrypted blob, owing to the fact that the passphrase is not known to the system.

In at least one embodiment, process 2100 comprises a step 2114 for storing the encrypted blob. In various embodiments, the encrypted blob is stored in association with a record and can be retrieved later by the same or different CPC instance to perform an account recovery process.

Figure 22:
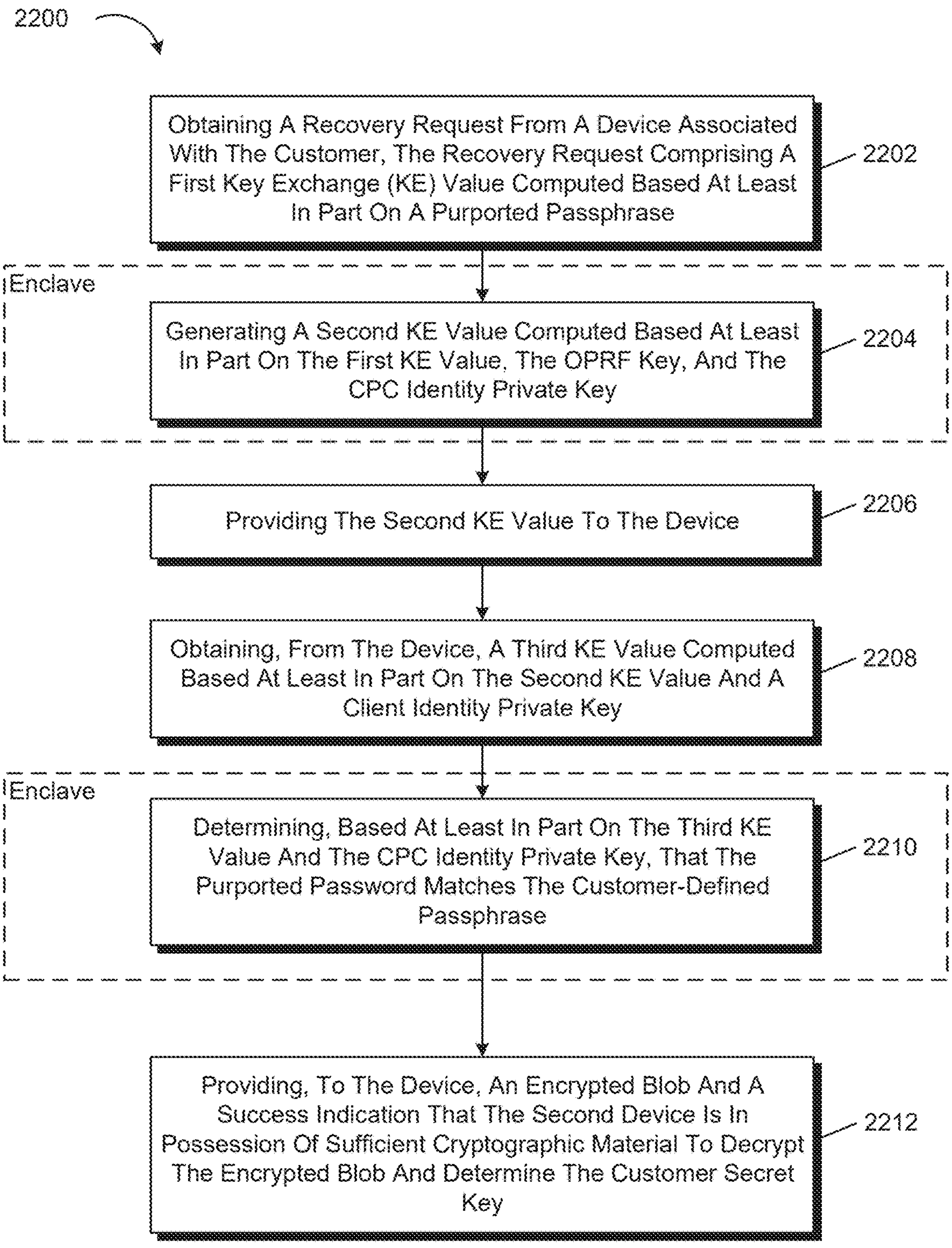
FIG. 22 shows an illustrative example of a process 2200 for an OPAQUE-based account recovery process, in accordance with one or more example embodiments of the present disclosure.

FIG. 22 shows an illustrative example of a process 2200 for an OPAQUE-based account recovery process, in accordance with one or more example embodiments of the present disclosure. In at least one embodiment, some or all of the process 2200 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 2200 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. In various embodiments, a system comprises one or more processors and memory storing executable instructions that, as a result of execution by the one or more processors, cause the system to perform some or all of the steps of process 2200. Process 2200 may be implemented in the context of various systems and methods described elsewhere in this disclosure, such as those discussed in connection with FIGS. 1-20 and 28. In at least one embodiment, process 2200 or a portion thereof is implemented by a computing resource service provider. In various embodiments, process 2200 is performed on a first device different from a second device that performs an account registration process in accordance with FIG. 21.

In at least one embodiment, process 2200 comprises a step 2202 for obtaining a recovery request from a device associated with the customer, the recovery request comprising a first key exchange (KE) value computed based at least in part on a purported passphrase. In various embodiments, an account registration process is performed on a first device of the customer and the account recovery process is performed on a second device of the customer. For example, these may be new devices that the customer purchases and sets up as part of an out-of-box experience (OOBE) and wishes to connect to an existing ecosystem of devices.

In at least one embodiment, process 2200 comprises a step 2204 for generating a second KE value computed based at least in part on the first KE value, the OPRF key, and the CPC identity private key. In various embodiments, step 2204 is performed within the context of an enclave or other protected execution environment. Step 2204 may be performed in accordance with an OPAQUE-based protocol.

In at least one embodiment, process 2200 comprises a step 2206 for providing the second KE value to the device. Step 2206 may be performed in accordance with an OPAQUE-based protocol.

In at least one embodiment, process 2200 comprises a step 2208 for obtaining, from the device, a third KE value computed based at least in part on the second KE value and a client identity private key. Step 2208 may be performed in accordance with an OPAQUE-based protocol.

In at least one embodiment, process 2200 comprises a step 2210 for determining, based at least in part on the third KE value and the CPC identity private key, that the purported password matches the customer-defined passphrase. The enclave may, at this point, determine a session key and furthermore a determination can be made as to whether a first session key derived by the CPC matches a second session key derived by the client device. If these two keys are identical, then it follows that the purported passphrase is equivalent to a legitimate passphrase that was used during account registration. In various embodiments, step 2210 is performed within the context of an enclave or other protected execution environment.

In at least one embodiment, process 2200 comprises a step 2212 for providing, to the device, an encrypted blob and a success indication that the second device is in possession of sufficient cryptographic material to decrypt the encrypted blob and determine the customer secret key.

Figure 23:
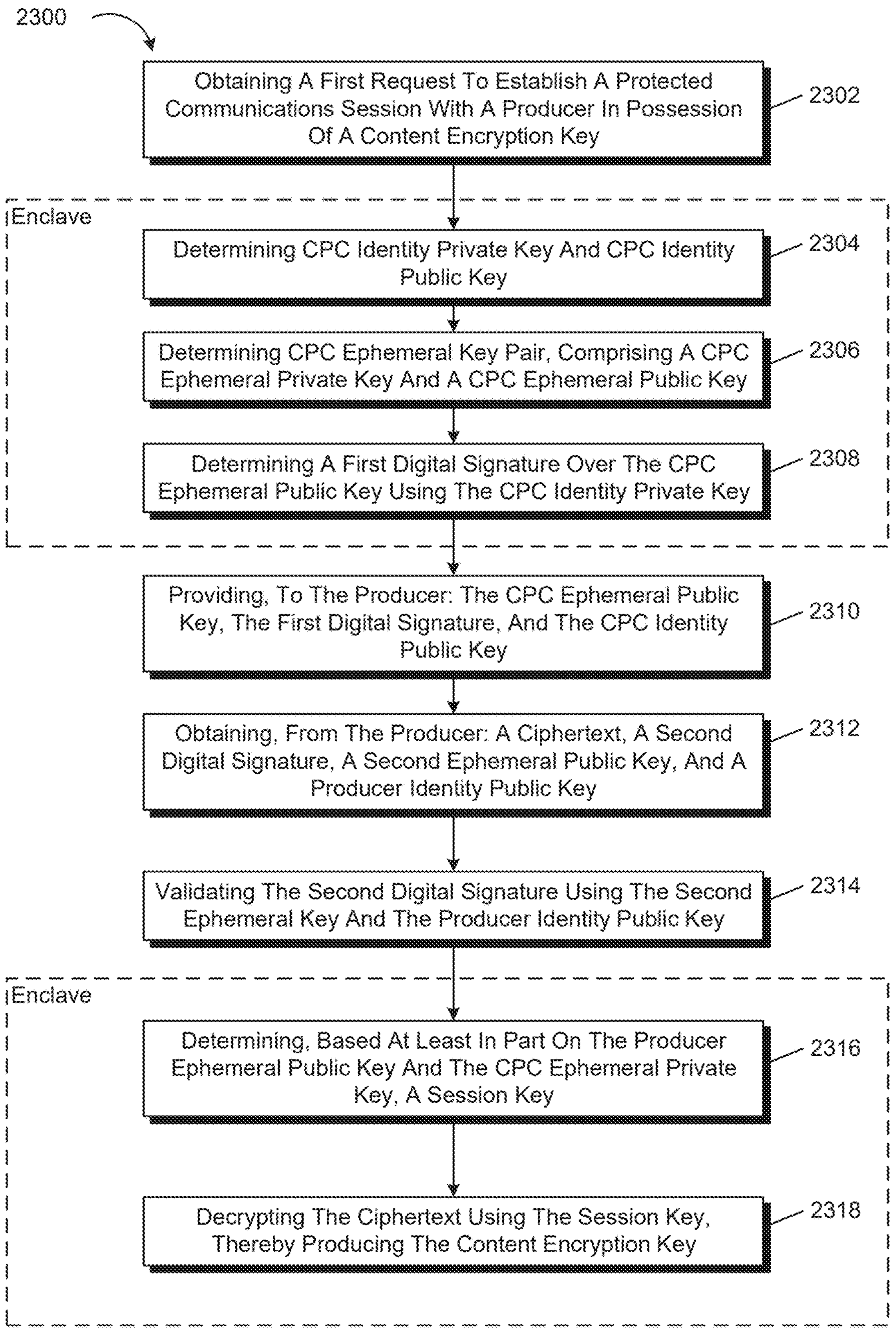
FIG. 23 shows an illustrative example of a process 2300 for implementing an in-transit content protection protocol, in accordance with one or more example embodiments of the present disclosure.

FIG. 23 shows an illustrative example of a process 2300 for implementing an in-transit content protection protocol, in accordance with one or more example embodiments of the present disclosure. In at least one embodiment, some or all of the process 2300 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 2300 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. In various embodiments, a system comprises one or more processors and memory storing executable instructions that, as a result of execution by the one or more processors, cause the system to perform some or all of the steps of process 2300. Process 2300 may be implemented in the context of various systems and methods described elsewhere in this disclosure, such as those discussed in connection with FIGS. 1-20 and 28. In at least one embodiment, process 2300 or a portion thereof is implemented by a computing resource service provider.

In at least one embodiment, process 2300 comprises a step 2302 for obtaining a first request to establish a protected communications session with a producer in possession of a content encryption key. In various embodiments, the system performing process 2300 is a cloud-based privacy control system. In various embodiments, the protected communications session will be used to securely transmit a content encryption key (CEK) that the producer uses to encrypted sensitive content. In various embodiments, the protected communications session is a one-way communications channel from the consumer to the cloud privacy control.

In at least one embodiment, process 2300 comprises a step 2304 for determining CPC identity private key and CPC identity public key. In various embodiments, step 2304 is performed within the context of an enclave or other protected execution environment. In some embodiments, the enclave already has access to its identity private key, for example, by performing a trusted setup process. In some embodiments, the enclave determines the CPC identity keys through a trusted retrieval process, for example, as discussed above in connection with FIGS. 1-6.

In at least one embodiment, process 2300 comprises a step 2306 for determining CPC ephemeral key pair, comprising a CPC ephemeral private key and a CPC ephemeral public key. In various embodiments, the ephemeral key pair is generated in response to the request. In various embodiments, the ephemeral key pair is randomly generated. In some embodiments, an ephemeral key pair is generated per communications session. In various embodiments, step 2306 is performed within the context of an enclave or other protected execution environment.

In at least one embodiment, process 2300 comprises a step 2308 for determining a first digital signature over the CPC ephemeral public key using the CPC identity private key. In various embodiments, the digital signature can be used by other entities to validate that the CPC is the signatory and that the CPC is in possession of the CPC ephemeral private key. In various embodiments, step 2308 is performed within the context of an enclave or other protected execution environment.

In at least one embodiment, process 2300 comprises a step 2310 for providing, to the producer: the CPC ephemeral public key, the first digital signature, and the CPC identity public key. In various embodiments, the system will also encrypt the CPC ephemeral private key and store, to a database, the encrypted CPC ephemeral private key, CPC identity public key, and digital signature over the public key. These quantities may be retrieve by other CPC instances to securely receive the CEK over the protected communications channel that will be established.

In various embodiments, the producer receives the CPC ephemeral public key, the first digital signature, and the CPC identity public key. The producer may determine its own ephemeral key pair. In various embodiments, the CPC ephemeral public key and the producer's ephemeral private key may be used to derive a symmetric session key. In various embodiments, ECDH with cofactor is used. The session key may be used to perform authenticated encryption, for example, using AES-GCM. Authenticated encryption may be performed on a message comprising the content encryption key, thereby producing a ciphertext. In some embodiments, authentication data, such as an authentication tag is also determined. The producer may generate a digital signature over the producer's ephemeral public key to provide a cryptographically verifiable assurance that the public key is associated with the consumer.

In at least one embodiment, process 2300 comprises a step 2312 for obtaining, from the producer: a ciphertext, a second digital signature, a second ephemeral public key, and a producer identity public key. In various embodiments, these quantities are transmitted over an insecure communications channel from the producer to a parent instance of the protected execution environment.

In at least one embodiment, process 2300 comprises a step 2314 for validating the second digital signature using the second ephemeral key and the producer identity public key. In various embodiments, a cloud parent instance of the CPC performs a signature validation and a signatory validation to ensure that the producer is in possession of a second ephemeral private key corresponding to the second ephemeral public key and that the signatory is indeed the producer.

In at least one embodiment, process 2300 comprises a step 2316 to determining, based at least in part on the producer ephemeral public key and the CPC ephemeral private key, a session key.

In at least one embodiment, process 2300 comprises a step 2318 for decrypting the ciphertext using the session key, thereby producing the content encryption key. In various embodiments, the session key is a symmetric key and the same quantity was derived by the producer using the producer ephemeral private key and the CPC ephemeral public key.

Figure 24:
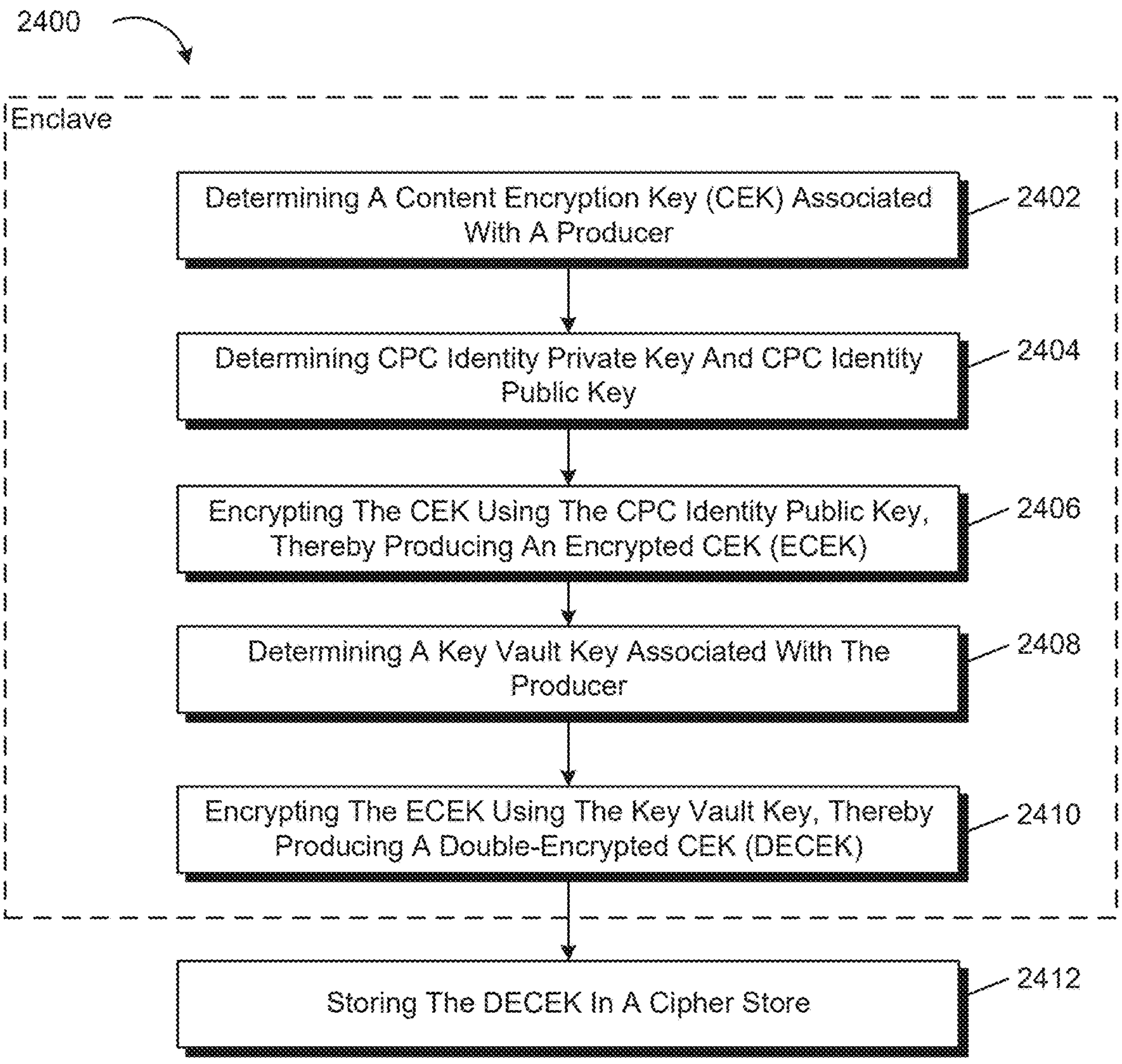
FIG. 24 shows an illustrative example of a process 2400 for a late bind at-rest content protection protocol, in accordance with one or more example embodiments of the present disclosure.

FIG. 24 shows an illustrative example of a process 2400 for a late bind at-rest content protection protocol, in accordance with one or more example embodiments of the present disclosure. In at least one embodiment, some or all of the process 2400 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 2400 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. In various embodiments, a system comprises one or more processors and memory storing executable instructions that, as a result of execution by the one or more processors, cause the system to perform some or all of the steps of process 2400. Process 2400 may be implemented in the context of various systems and methods described elsewhere in this disclosure, such as those discussed in connection with FIGS. 1-20 and 28. In at least one embodiment, process 2400 or a portion thereof is implemented by a computing resource service provider.

In various embodiments, process 2400 comprises a step 2402 for determining a content encryption key (CEK) associated with a producer. For instance, a cloud privacy control (CPC) system may obtain the content encryption key from a producer system using an in-transit content protection protocol as discussed in connection with FIGS. 10-15. In various embodiments, step 2402 is performed within the context of an enclave or other protected execution environment.

In various embodiments, process 2400 comprises a step 2404 for determining a CPC identity private key and CPC identity public key. In various embodiments, the keys are determined within a protected execution environment using a trusted setup process in accordance with FIG. 2 and/or a trusted retrieval process in accordance with FIG. 3. In various embodiments, step 2404 is performed within the context of an enclave or other protected execution environment.

In various embodiments, process 2400 comprises a step 2406 for encrypting the CEK using the CPC identity public key, thereby producing an encrypted CEK (ECEK).

In various embodiments, process 2400 comprises a step 2408 for determining a key vault key associated with the producer. In various embodiments, the key vault key is a customer-managed key. In various embodiments, the key vault key can be unilaterally shredded by the customer providing a command to electronically shred the key. In various embodiments, electronically shredding the key vault key revokes all entities' access to the CEK. In various embodiments, policy updates can be used to change access rights to various entities on a custom basis.

In various embodiments, process 2400 comprises a step 2410 for encrypting the ECEK using the key vault key, thereby producing a double-encrypted CEK (DECEK). In various embodiments, process 2400 comprises a step 2412 for storing the DECEK in a cipher store.

Figure 25:
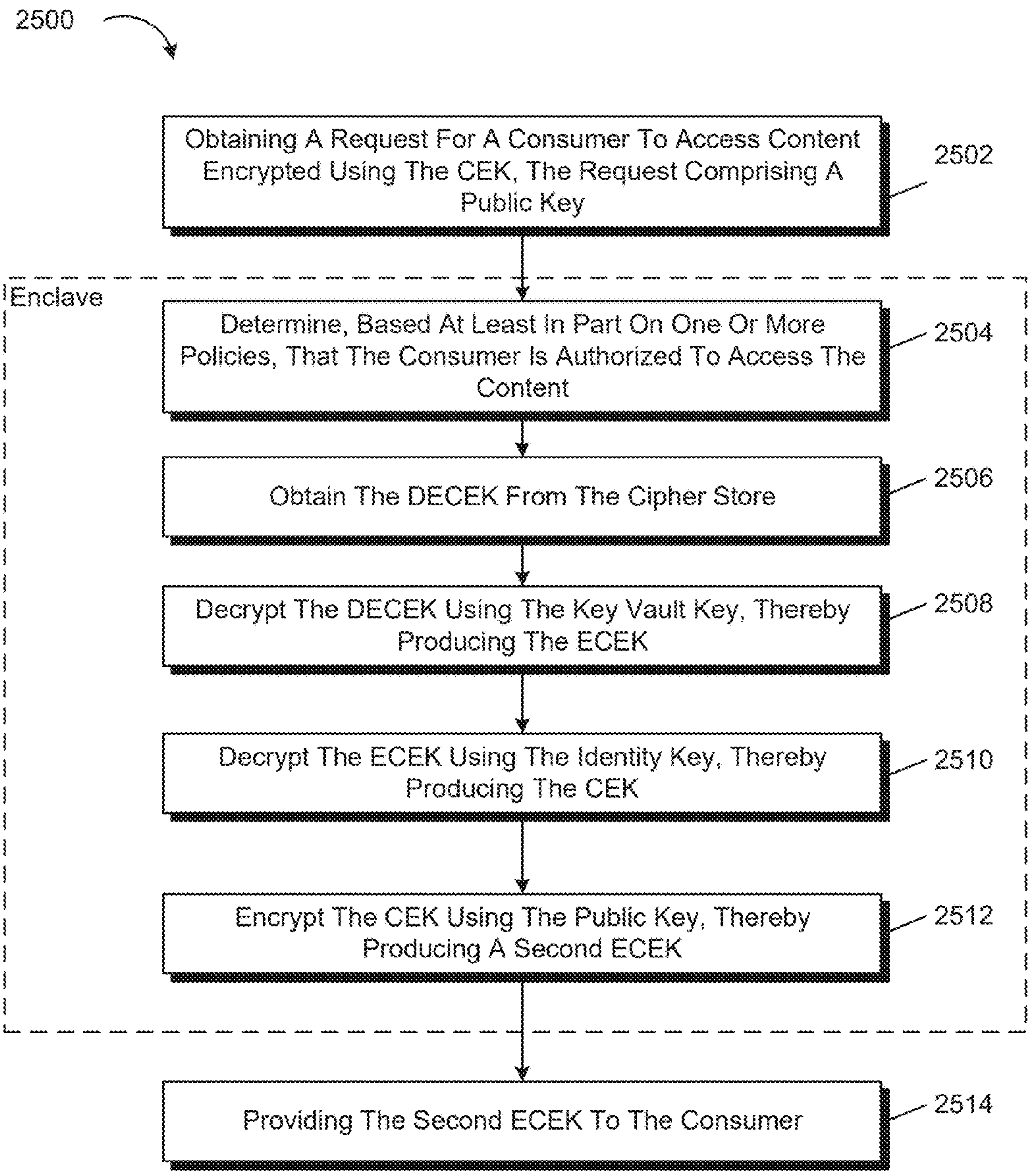
FIG. 25 shows an illustrative example of a process 2500 for late binding at-rest content protection protocol, in accordance with one or more example embodiments of the present disclosure.

FIG. 25 shows an illustrative example of a process 2500 for late binding at-rest content protection protocol, in accordance with one or more example embodiments of the present disclosure. In at least one embodiment, some or all of the process 2500 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 2500 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. In various embodiments, a system comprises one or more processors and memory storing executable instructions that, as a result of execution by the one or more processors, cause the system to perform some or all of the steps of process 2500. Process 2500 may be implemented in the context of various systems and methods described elsewhere in this disclosure, such as those discussed in connection with FIGS. 1-20 and 28. In at least one embodiment, process 2500 or a portion thereof is implemented by a computing resource service provider.

In various embodiments, process 2500 comprises a step 2502 for obtaining a request for a consumer to access content encrypted using the CEK, the request comprising a public key. In various embodiments, data consumer submits a request to cloud privacy control to access sensitive content. For example, data consumer may coordinate with cloud privacy control to obtain sufficient cryptographic material to decipher encrypted content. In some embodiments, data consumer also coordinates with cloud privacy control to obtain encrypted sensitive content (e.g., from a manifest that cloud privacy control provides to data consumer).

In various embodiments, process 2500 comprises a step 2504 for determine, based at least in part on one or more policies, that the consumer is authorized to access the content. One or more policy evaluations may be made as to determine whether the requestor is authorized to access the content. Cloud privacy control may receive a request from data consumer to access sensitive content and validate whether data consumer is authorized to access to access the content. In various embodiments, a late binding protocol makes the determination as to whether the requesting entity is authorized to access the content based on the authorizations that exist at the time the consumption request is made, rather than when the content was generated. Assuming that a positive determination is made, the cloud privacy control proceeds with process 2500.

In various embodiments, process 2500 comprises a step 2506 for obtain the DECEK from the cipher store. In various embodiments, the DECEK is associated with the requestor. For instance, an identifier or public key associated with the requestor may be used to find the DECEK in a cipher store. Cipher store may have a plurality of DECEKs. Cloud privacy control may query cipher store for a particular ECEK that is associated with data consumer.

In various embodiments, process 2500 comprises a step 2508 for decrypt the DECEK using the key vault key, thereby producing the ECEK. In various embodiments, process 2500 comprises a step 2510 for decrypt the ECEK using the identity key, thereby producing the CEK.

In various embodiments, process 2500 comprises a step 2512 for encrypt the CEK using the public key, thereby producing a second ECEK. In various embodiments, process 2500 comprises a step 2514 for providing the second ECEK to the consumer. Sensitive content may be determined using the content encryption key. In various embodiments, data consumer obtains, retrieves, or otherwise determines encrypted sensitive content, for example, from data store. Data consumer may then decrypt the encrypted sensitive content using content encryption key, thereby producing sensitive content in plaintext. In various embodiments, data consumer can then perform various authorized workloads using the plaintext sensitive content, such as to present it to a customer device, perform computer vision machine-learning (CVML) monitoring, and so on and so forth.

Figure 26:
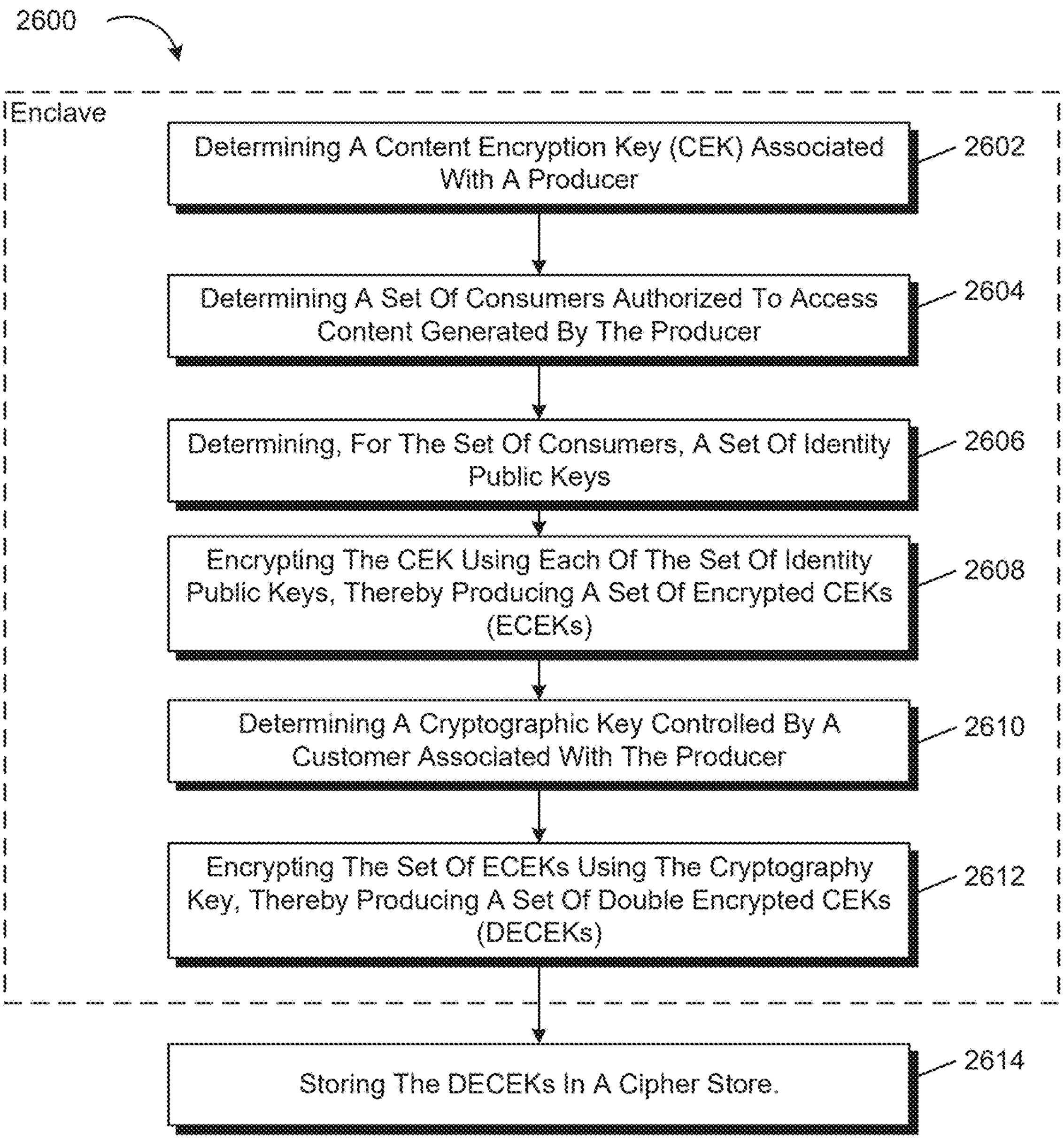
FIG. 26 shows an illustrative example of a process 2600 for an early bind at-rest content protection protocol, in accordance with one or more example embodiments of the present disclosure.

FIG. 26 shows an illustrative example of a process 2600 for an early bind at-rest content protection protocol, in accordance with one or more example embodiments of the present disclosure. In at least one embodiment, some or all of the process 2600 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 2600 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. In various embodiments, a system comprises one or more processors and memory storing executable instructions that, as a result of execution by the one or more processors, cause the system to perform some or all of the steps of process 2600. Process 2600 may be implemented in the context of various systems and methods described elsewhere in this disclosure, such as those discussed in connection with FIGS. 1-20 and 28. In at least one embodiment, process 2600 or a portion thereof is implemented by a computing resource service provider.

In various embodiments, process 2600 comprises a step 2602 for determining a content encryption key (CEK) associated with a producer. In various embodiments, a data producer is a device owned, controlled, managed, etc. by a customer and provides the CEK according to an in-transit content protection protocol. In various embodiments, data producer generates, produces, or otherwise determines sensitive content which is encrypted using the CEK. Sensitive content may be any content whose access is controlled by the customer. An example sensitive content can be a video feed from a customer's home security system, utterances collected by a multimodal device, or any other data that is collected by the customer's device, which is deemed sensitive by the customer.

In various embodiments, process 2600 comprises a step 2604 for determining a set of consumers authorized to access content generated by the producer. The system may determine a list of authorized entities. The authorized entities may be entities that are authorized by the customer to access sensitive content. In various embodiments, a policy system or service is referenced to determine the list of authorized entities.

In various embodiments, process 2600 comprises a step 2606 for determining, for the set of consumers, a set of identity public keys. For each authorized entity, a corresponding identity public key may be determined as consumer identity public keys. In various embodiments, cloud privacy control determines a set of consumer identity public keys and performs an encryption operation on the content encryption key using each public key in the set, thereby producing encrypted content encryption keys.

In various embodiments, process 2600 comprises a step 2608 for encrypting the CEK using each of the set of identity public keys, thereby producing a set of encrypted CEKs (ECEKs). For instance, the CEK may be encrypted using first consumer identity public key to produce first ECEK, the CEK may be encrypted using second consumer identity public key to produce second ECEK, and so on and so forth. Each of these ECEKs can be decrypted using the corresponding consumer identity private keys.

In various embodiments, process 2600 comprises a step 2610 for determining a cryptographic key controlled by a customer associated with the producer.

In various embodiments, process 2600 comprises a step 2612 for encrypting the set of ECEKs using the cryptography key, thereby producing a set of double encrypted CEKs (DECEKs). Cloud privacy control may encrypt each of the ECEKs to a customer-managed key. For instance, cloud privacy control may submit a first encryption request to cryptography service that causes cryptography service to perform a first encryption operation on first ECEK using customer-managed key, thereby producing a first DECEK, submit a second encryption request to cryptography service that causes cryptography service to perform a second encryption operation on second ECEK using customer-managed key, thereby producing a second DECEK, and so on and so forth.

In various embodiments, process 2600 comprises a step 2614 for storing the DECEKs in a cipher store. Upon determination of the corresponding set of DECEKs from ECEKs, the DECEKs may be persisted in a cipher store. In various embodiments, the DECEKs can be later retrieved for one or more data consumer to decipher encrypted content. Data producer may generate sensitive content and encrypt the sensitive content using content encryption key to produce encrypted sensitive content. In various embodiments, encrypted sensitive content is persisted in data store. In various embodiments, encrypted sensitive content can be later retrieved for one or more data consumer for consumption.

Figure 27:
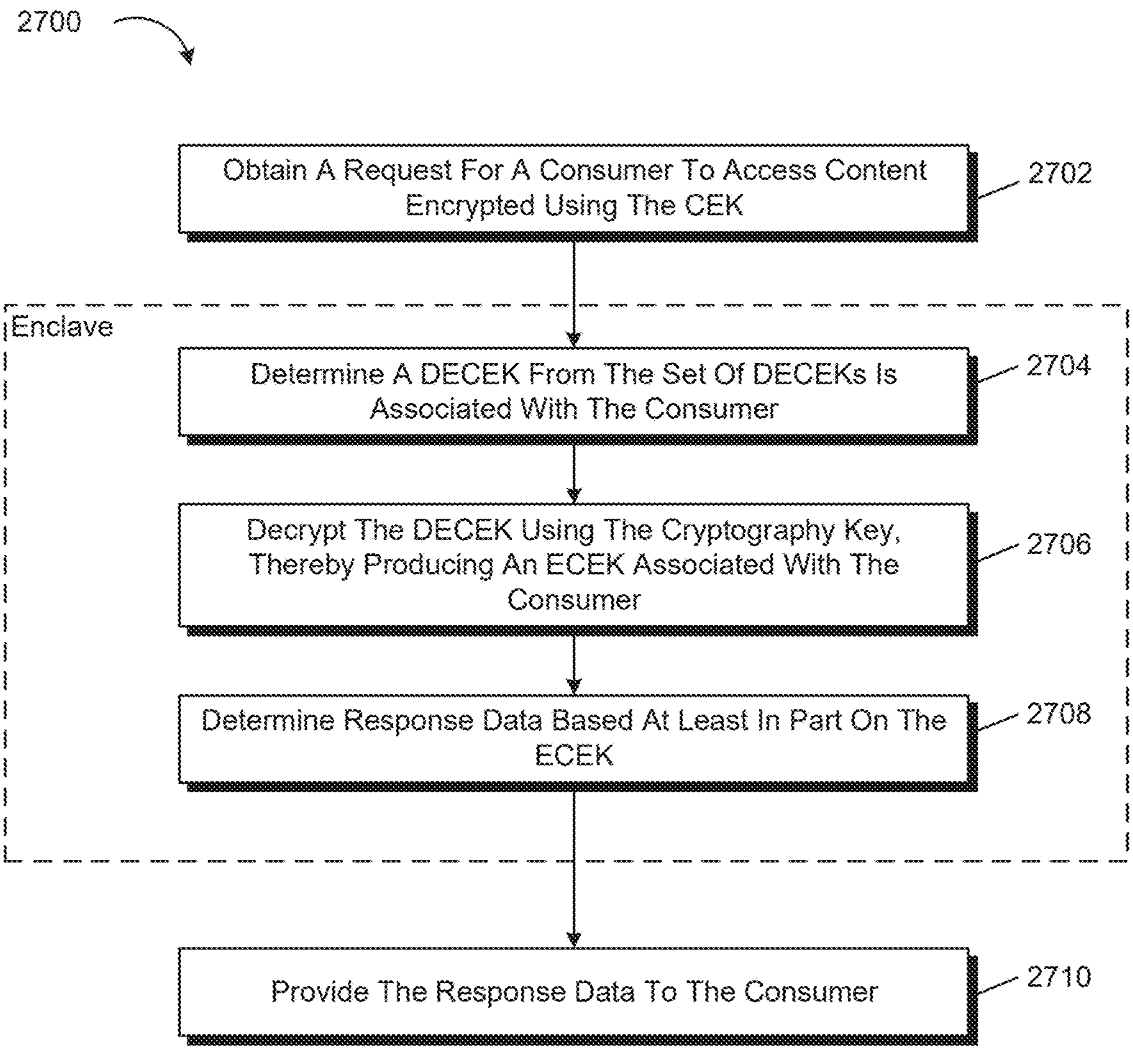
FIG. 27 shows an illustrative example of a process 2700 for an early bind at-rest content protection protocol, in accordance with one or more example embodiments of the present disclosure.

FIG. 27 shows an illustrative example of a process 2700 for an early bind at-rest content protection protocol, in accordance with one or more example embodiments of the present disclosure. In at least one embodiment, some or all of the process 2700 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 2700 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. In various embodiments, a system comprises one or more processors and memory storing executable instructions that, as a result of execution by the one or more processors, cause the system to perform some or all of the steps of process 2700. Process 2700 may be implemented in the context of various systems and methods described elsewhere in this disclosure, such as those discussed in connection with FIGS. 1-20 and 28. In at least one embodiment, process 2700 or a portion thereof is implemented by a computing resource service provider.

In various embodiments, process 2700 comprises a step 2702 to obtain a request for a consumer to access content encrypted using the CEK. A data consumer may coordinate with cloud privacy control to obtain sufficient cryptographic material to decipher encrypted content. In some embodiments, data consumer also coordinates with cloud privacy control to obtain encrypted sensitive content (e.g., from a manifest that cloud privacy control provides to data consumer). Cloud privacy control may receive a request from data consumer to access sensitive content and validate whether data consumer is authorized to access to access the content. In various embodiments, an early bind protocol makes the determination as to whether the requesting entity is authorized to access the content based on the authorizations that exist at the time of data generation, rather than when the request is made. Assuming that a positive determination is made, the cloud privacy control proceeds with process 2700.

In various embodiments, process 2700 comprises a step 2704 to determine a DECEK from the set of DECEKs is associated with the consumer. In various embodiments, a cloud privacy control obtains a double encrypted content encryption key from cipher store. Cipher store may have a plurality of double encrypted CEKs. Cloud privacy control may query cipher store for a particular DECEK that is associated with the requestor.

In various embodiments, process 2700 comprises a step 2706 to decrypt the DECEK using the cryptography key, thereby producing an ECEK associated with the consumer. In various embodiments, cloud privacy control will decrypt the DECEK using customer-managed key, thereby producing ECEK.

In various embodiments, process 2700 comprises a step 2708 to determine response data based at least in part on the ECEK. In various embodiments, the response data is the ECEK. In various embodiments, the ECEK is encrypted using a consumer ephemeral public key to produce the response data. In various embodiments, process 2700 comprises a step 2710 to provide the response data to the consumer.

It should be noted that throughout this disclosure, references to a "once" or "twice" encrypted quantity may refer simply to the minimum number of layers of encryption rather than an exact number of layers and that a "single" encrypted quantity may be encrypted once, but may also be encrypted twice, thrice, or more times. Likewise, a "double" encrypted quantity may be encrypted twice, thrice, or more times using different sets of cryptographic material.

One or more operations of the methods, process flows, or use cases of FIGS. 1-28 may have been described above as being performed by a user device, or more specifically, by one or more program module(s), applications, or the like executing on a device. It should be appreciated, however, that any of the operations of the methods, process flows, or use cases of FIGS. 1-28 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-28 may be described in the context of the illustrative devices, it should be appreciated that such operations may be implemented in connection with numerous other device configurations.

The operations described and depicted in the illustrative methods, process flows, and use cases of FIGS. 1-28 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-28 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

The examples presented herein are not meant to be limiting.

Figure 28:
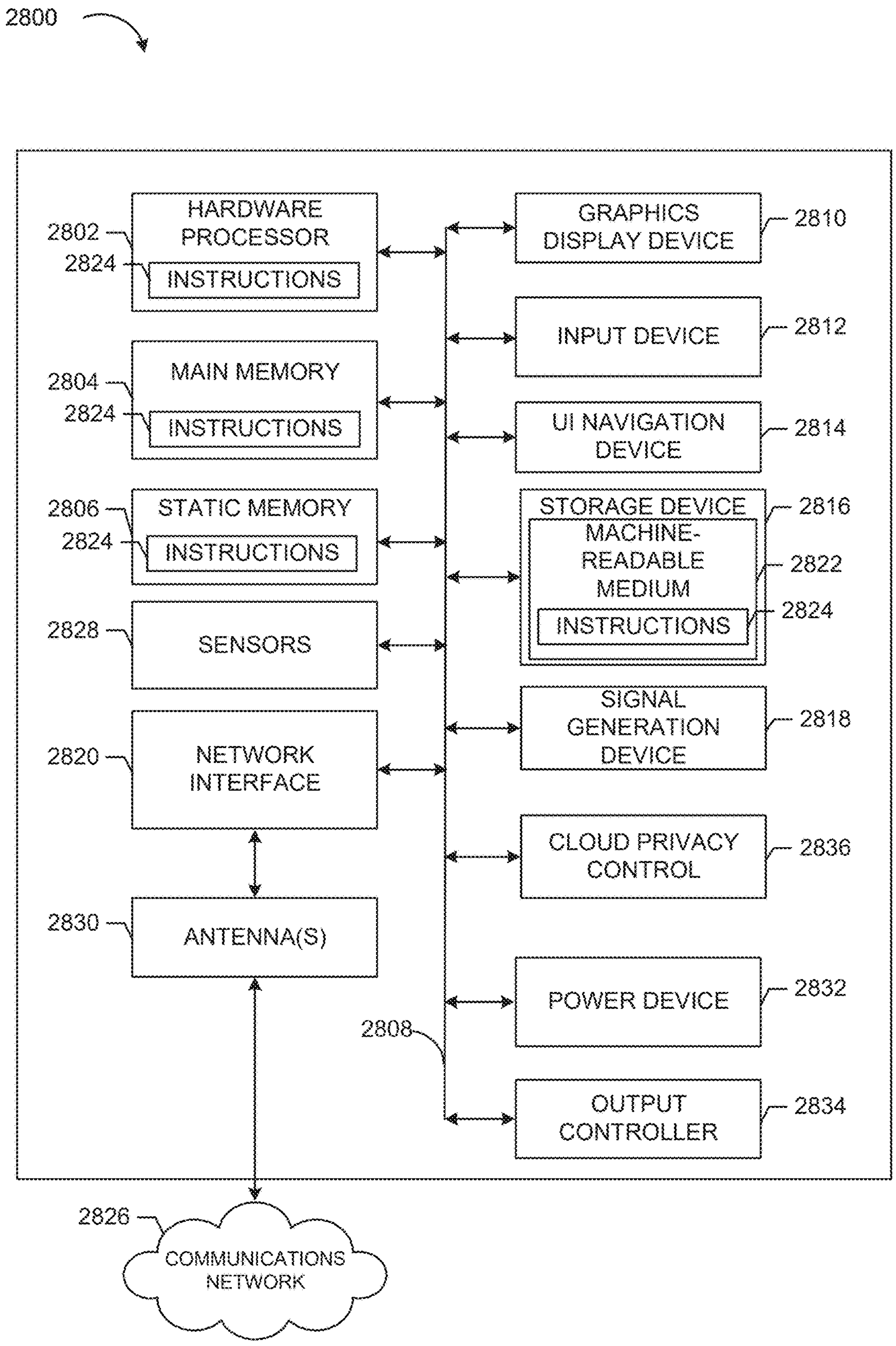
FIG. 28 illustrates a block diagram of an example machine upon which any of one or more techniques (e.g., methods) may be performed, in accordance with one or more example embodiments of the present disclosure.

FIG. 28 illustrates a block diagram of an example of a machine 2800 (e.g., implemented in whole or in part in the context of embodiments described in connection with other figures. In some embodiments, the machine 2800 may operate as a standalone device or may be connected (e.g., networked) to other machines. In a networked deployment, the machine 2800 may operate in the capacity of a server machine, a client machine, or both in server-client network environments. In an example, the machine 2800 may act as a peer machine in Wi-Fi direct, peer-to-peer (P2P) (or other distributed) network environments. The machine 2800 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 2800 may include any combination of the illustrated components. For example, the machine 2800 may include a hardware processor 2802 (e.g., a central processing unit (CPU), a graphics processing unit (GPU), a hardware processor core, or any combination thereof), a main memory 2804 and a static memory 2806, some or all of which may communicate with each other via an interlink (e.g., bus) 2808. The machine 2800 may further include a power management device 2832, a graphics display device 2810, an alphanumeric input device 2812 (e.g., a keyboard), and a user interface (UI) navigation device 2814 (e.g., a mouse). In an example, the graphics display device 2810, alphanumeric input device 2812, and UI navigation device 2814 may be a touch screen display. The machine 2800 may additionally include a storage device (e.g., drive unit) 2816, a signal generation device 2818, and a network interface device/transceiver 2820 coupled to antenna(s) 2830. The machine 2800 may include an output controller 2834, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 2816 may include a machine readable medium 2822 on which is stored one or more sets of data structures or instructions 2824 (e.g., software) embodying or utilized by any one or more of the techniques or functions described herein. The instructions 2824 may also reside, completely or at least partially, within the main memory 2804, within the static memory 2806, or within the hardware processor 2802 during execution thereof by the machine 2800. In an example, one or any combination of the hardware processor 2802, the main memory 2804, the static memory 2806, or the storage device 2816 may constitute machine-readable media.

While the machine-readable medium 2822 is illustrated as a single medium, the term "machine-readable medium" may include a single medium or multiple media (e.g., a centralized or distributed database, and/or associated caches and servers) configured to store the one or more instructions 2824.

In various embodiments, a cloud privacy control 2836 is implemented in the context of machine 2800. For instance, various techniques described in connection with a cloud-based privacy control system may be implemented using hardware, software, or a combination there of and in connection with FIG. 28. An enclave or other suitable protected execution environment may be provisioned to implement cloud privacy control 2836. Various techniques described in connection with some or all of FIGS. 1-27 may be implemented in the context of machine 2800.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 2800 and that cause the machine 2800 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

In various embodiments, machine 2800 implements a cloud privacy control. For example, various techniques described in connection with FIGS. 1-27 may be implemented in the context of machine 2800.

The instructions 2824 may further be transmitted or received over a communications network 2826 using a transmission medium via the network interface device/transceiver 2820 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 2820 may include one or more physical jacks (e.g., Ethernet, coaxial, or phone jacks) or one or more antennas to connect to the communications network 2826. In an example, the network interface device/transceiver 2820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 2800 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word “exemplary” is used herein to mean “serving as an example, instance, or illustration.” Any embodiment described herein as “exemplary” is not necessarily to be construed as preferred or advantageous over other embodiments. The terms “computing device,” “user device,” “communication station,” “station,” “handheld device,” “mobile device,” “wireless device” and “user equipment” (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term “communicate” is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as “communicating,” when only the functionality of one of those devices is being claimed. The term “communicating” as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives “first,” “second,” “third,” etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, biomedical sensors, wearable devices or sensors, cellular radiotelephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which may be used to store the information and which may be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Additionally, features of various system and methods described herein that are implemented "by" or "based on" performing a step are to be construed or may be synonymous to "by at least" or "based at least in part on" performing said step rather than "by solely" or "based solely on" performing said step, unless it is explicitly stated or clear from the context. For example, a system that implements specific features "by" performing a particular step may be described in a manner that is not exclusive of the performance of other steps, some of which may be related to said particular step.

In some cases, other steps may omitted from various discussions for the sake of clarity.

What is claimed is:

1. A computer-implemented method, comprising:

obtaining, by one or more processors of a computer system, a first request to establish a protected communications session with a client in possession of a content encryption key;

causing, by the one or more processors of the computer system, a protected execution environment to fulfill the first request by at least:

determining a first identity private key and a first identity public key;

determining a first ephemeral key pair, comprising a first ephemeral private key and a first ephemeral public key;

determining a first digital signature over the first ephemeral public key using the first identity private key; and exporting the first ephemeral public key and the first digital signature from the protected execution environment;

providing, by the one or more processors of the computer system, the first identity public key, the first digital signature, and the first ephemeral public key to the client;

obtaining, by the one or more processors of the computer system and from the client: a ciphertext, a second digital signature, and a second ephemeral public key associated with the client;

validating, by the one or more processors of the computer system, the second digital signature using the second ephemeral public key;

causing, by the one or more processors of the computer system, the protected execution environment to:

determine, based at least in part on the second ephemeral public key and the first ephemeral private key, a session key; and decrypt the ciphertext using the session key to produce the content encryption key.

2. The computer-implemented method of claim 1, further comprising:

causing, by the one or more processors of the computer system, the protected execution environment to fulfill the first request by at least:

determining a data key;

encrypting the first ephemeral private key to produce an encrypted first ephemeral private key; and exporting the encrypted first ephemeral private key from the protected execution environment; and storing, by the one or more processors of the computer system, the encrypted first ephemeral private key, the first ephemeral public key, and the first digital signature.

3. The computer-implemented method of claim 2, wherein:

the protected execution environment is a first instance of a cloud privacy control system; and the method further comprises:

causing a second instance of the cloud privacy control system executed within a second protected execution environment to:

obtain the encrypted first ephemeral private key, the first ephemeral public key, and the first digital signature;

validate the first digital signature using the first identity public key;

determine the data key; and decrypt the encrypted first ephemeral private key using the data key to produce the first ephemeral private key.

4. The computer-implemented method of claim 1, wherein validating, the second digital signature using the second ephemeral public key comprises a signature validation process and a signatory validation process.

5. A system, comprising:

one or more processors; and memory storing executable instructions that, as a result of execution by the one or more processors, cause the system to implement a cloud privacy control in a protected execution environment of the system to:

obtain a first ciphertext encoding a data key and a second ciphertext encoding a first identity private key associated with the cloud privacy control;

provide the first ciphertext and an attestation document comprising a public key associated with the protected execution environment to a cryptography service;

obtain, from the cryptography service, a third ciphertext;

decrypt the third ciphertext using a private key associated with the protected execution environment to produce the data key;

decrypt the second ciphertext using the data key to produce the first identity private key associated with the cloud privacy control;

determine an ephemeral key pair comprising a first ephemeral public key and a first ephemeral private key;

determine a first digital signature over the first ephemeral public key using the first identity private key;

export the first digital signature and a first identity public key from the protected execution environment;

obtain a second ephemeral public key and a fourth ciphertext encoding a content encryption key for a client of the cloud privacy control;

determine, based at least in part on the second ephemeral public key and the first ephemeral private key, a session key; and decrypt the fourth ciphertext using the session key to produce the content encryption key.

6. The system of claim 5, wherein the executable instructions to determine the ephemeral key pair include instructions that, as a result of execution by the one or more processors, further cause the protected execution environment to:

retrieve an encrypted first ephemeral private key, the first ephemeral public key, and a second digital signature over the first ephemeral public key that was generated by another instance of the cloud privacy control;

validate the second digital signature using the first identity public key; and decrypt the encrypted first ephemeral private key to produce the first ephemeral private key.

7. The system of claim 5, wherein the executable instructions include further instructions that, as a result of execution by the one or more processors, further cause the protected execution environment to:

determine the session key based at least in part on an Elliptic Curve Integration Encryption Scheme (ECIES).

8. The system of claim 5, wherein the executable instructions include further instructions that, as a result of execution by the one or more processors, further cause the protected execution environment to:

obtain a second digital signature;

determine a second identity public key associated with the client of the cloud privacy control; and validate the second digital signature based at least in part on the second identity public key.

9. The system of claim 5, wherein the first ciphertext and the second ciphertext obtained by the cloud privacy control were generated by a different instance of the cloud privacy control.

10. The system of claim 5, wherein the protected execution environment is an enclave.

11. The system of claim 5, wherein the fourth ciphertext is determined according to an authenticated encryption (AE) algorithm.

12. The system of claim 5, wherein the first ephemeral private key is programmatically unexportable from the protected execution environment.

13. A non-transitory computer-readable storage medium storing executable instructions that, as a result of being executed by one or more processors of a computer system, cause the computer system to implement a cloud privacy control in a protected execution environment of the computer system to at least:

obtain a first ciphertext encoding a data key and a second ciphertext encoding a first identity private key associated with the cloud privacy control;

provide the first ciphertext and an attestation document comprising a public key associated with the protected execution environment to a cryptography service;

obtain, from the cryptography service, a third ciphertext;

decrypt the third ciphertext using a private key associated with the protected execution environment, to produce the data key;

decrypt the second ciphertext using the data key to produce the first identity private key associated with the cloud privacy control;

determine an ephemeral key pair comprising a first ephemeral public key and a first ephemeral private key;

determine a first digital signature over the first ephemeral public key using the first identity private key;

export the first digital signature and a first identity public key from the protected execution environment;

obtain a second ephemeral public key and a fourth ciphertext encoding a content encryption key for a client of the cloud privacy control;

determine, based at least in part on the second ephemeral public key and the first ephemeral private key, a session key; and decrypt the fourth ciphertext using the session key to produce the content encryption key.

14. The non-transitory computer-readable storage medium of claim 13, wherein the instructions to determine the ephemeral key pair, as a result of being executed by the one or more processors of the computer system, cause the protected execution environment to:

retrieve an encrypted first ephemeral private key, the first ephemeral public key, and a second digital signature over the first ephemeral public key that was generated by another instance of the cloud privacy control;

validate the second digital signature using the first identity public key; and decrypt the encrypted first ephemeral private key to produce the first ephemeral private key.

15. The non-transitory computer-readable storage medium of claim 13, wherein the executable instructions include further instructions that, as a result of execution by the one or more processors, further cause the protected execution environment to:

determine the session key based at least in part on an Elliptic Curve Integration Encryption Scheme (ECIES).

16. The non-transitory computer-readable storage medium of claim 13, wherein the instructions, as a result of being executed by the one or more processors of the computer system, further cause the protected execution environment to:

obtain a second digital signature;

determine a second identity public key associated with the client of the cloud privacy control; and validate the second digital signature based at least in part on the second identity public key.

17. The non-transitory computer-readable storage medium of claim 13, wherein the first ciphertext and the second ciphertext obtained by the cloud privacy control were generated by a different instance of the cloud privacy control.

18. The non-transitory computer-readable storage medium of claim 13, wherein the protected execution environment is an enclave.

19. The non-transitory computer-readable storage medium of claim 13, wherein the fourth ciphertext is determined according to an authenticated encryption (AE) algorithm.

20. The non-transitory computer-readable storage medium of claim 13, wherein the first ephemeral private key is programmatically unexportable from the protected execution environment.

* * * * *